US010779514B2

(12) United States Patent
Sugiyama et al.

(10) Patent No.: US 10,779,514 B2
(45) Date of Patent: Sep. 22, 2020

(54) SHELLFISH MOUNTING METHOD AND SHELLFISH MOUNTING APPARATUS

(71) Applicant: Mutsu Kaden Tokki Co., Ltd., Mutsu-shi, Aomori (JP)

(72) Inventors: Hiroaki Sugiyama, Mutsu (JP); Yukikatsu Toyosawa, Kawasaki (JP)

(73) Assignee: MUTSU KADEN TOKKI CO., LTD., Mutsu (JP)

( * ) Notice: Subject to any disclaimer, the term of this patent is extended or adjusted under 35 U.S.C. 154(b) by 200 days.

(21) Appl. No.: 15/901,587

(22) Filed: Feb. 21, 2018

(65) Prior Publication Data

US 2019/0098877 A1    Apr. 4, 2019

(30) Foreign Application Priority Data

Sep. 29, 2017  (JP) .................................. 2017-191933

(51) Int. Cl.
*A01K 61/00* (2017.01)
*A01K 61/54* (2017.01)
*G08B 21/18* (2006.01)
*A01K 61/65* (2017.01)

(52) U.S. Cl.
CPC .............. *A01K 61/54* (2017.01); *G08B 21/18* (2013.01); *A01K 61/65* (2017.01)

(58) Field of Classification Search
CPC ................................ A01K 61/54; A01K 61/50
USPC ......................................................... 119/234
See application file for complete search history.

(56) References Cited

U.S. PATENT DOCUMENTS

| 4,441,853 | A | * | 4/1984 | Kosugi | ............. H01L 21/67787 |
| | | | | | 198/394 |
| 5,494,482 | A | * | 2/1996 | Sakamoto | ............... A01K 61/54 |
| | | | | | 452/185 |
| 5,836,266 | A | * | 11/1998 | Watanabe | ............... A01K 61/54 |
| | | | | | 119/234 |

FOREIGN PATENT DOCUMENTS

| JP | S64-30107 U | 2/1989 |
| JP | H02-051050 U | 4/1990 |
| JP | H03-107109 U | 11/1991 |
| JP | H04-299929 A | 10/1992 |
| JP | 06098660 A | * 4/1994 |
| JP | H06-153737 A | 6/1994 |
| JP | 06261648 A | * 9/1994 |
| JP | 2000-134857 A | 5/2000 |

(Continued)

OTHER PUBLICATIONS

English-language translation of JP 2007-124940 (Year: 2007).*

(Continued)

*Primary Examiner* — Lisa L Tsang
(74) *Attorney, Agent, or Firm* — Oliff PLC

(57) ABSTRACT

A method and an apparatus are capable of automatically performing an operation of mounting shellfishes to a pin inserted in a vertical rope. Insertion holes are formed in ears of two shellfishes in parallel. While each pin is cut out one by one from a series of pins formed of a large number of continuous pins, the cut-out pins are inserted through the vertical rope at substantially equal intervals. A pipe-shaped guide is inserted through the insertion hole of each of the two shellfishes, and an end portion of the guide inserted through the insertion hole is put on each end portion of the pin. The pin and the two guides are arranged in a straight line. The shellfishes are transferred and mounted onto the pin by sliding the two shellfishes along the respective guides beyond shellfish locking protrusions of the pin.

3 Claims, 36 Drawing Sheets

(56) References Cited

FOREIGN PATENT DOCUMENTS

| JP | 2007124940 A | * | 5/2007 |
| JP | 2008-154405 A | | 7/2008 |
| JP | 5052118 B2 | | 10/2012 |
| JP | 2016-154514 A | | 9/2016 |
| JP | 2017-140009 A | | 8/2017 |

OTHER PUBLICATIONS

English-language translation of JP H06-261648 A (Year: 1994).*
English-language translation of JP H06-98660 A (Year: 1994).*
Nov. 20, 2019 Office Action issued in Japanese Patent Application No. 2017-191933.
"Pinsetters PS-1000"; Pinsetters; (http://www.mutsukaden.com/?page_id=477).
Mar. 29, 2019 Office Action issued in Japanese Patent Application No. 2017-191933.

* cited by examiner

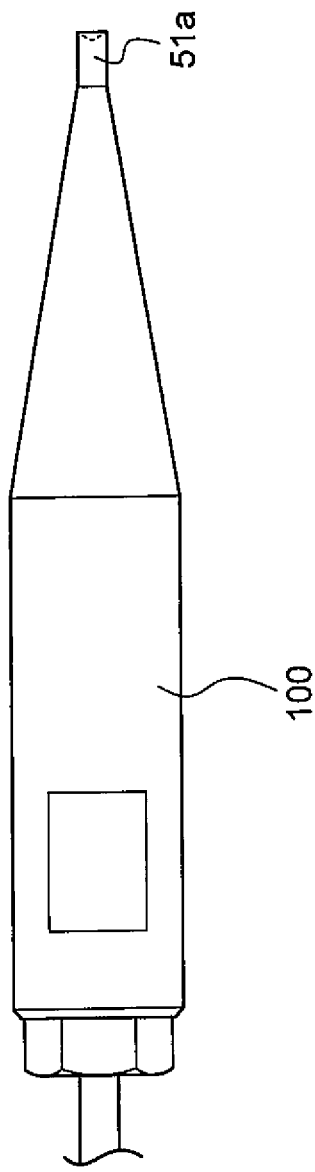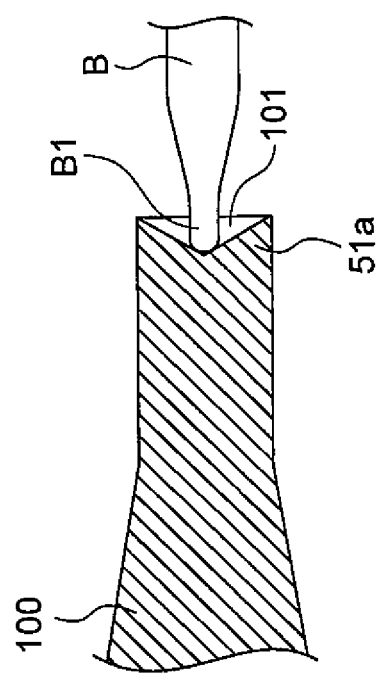
FIG. 24A
FIG. 24B

SHELLFISH MOUNTING METHOD AND SHELLFISH MOUNTING APPARATUS

BACKGROUND OF THE INVENTION

1. Field of the Invention

The present invention relates to a shellfish mounting method and a shellfish mounting apparatus capable of automatically and sequentially performing a series of operations of inserting a shellfish locking tool (hereinafter referred to as "pin") into a vertical rope for ear hanging aquaculture, forming a hole in a shellfish, and mounting the shellfish to the pin inserted in the vertical rope.

2. Description of the Related Art

As a method of cultivating shellfishes, ear hanging aquaculture has been known. When scallops (hereinafter referred to as "shellfishes") are cultivated by the ear hanging aquaculture, as illustrated in FIG. 35A to FIG. 35C, each end of a resin pin B inserted through a vertical rope A is inserted into an insertion hole F formed in an ear J of a shellfish C, and thus the shellfish C is mounted in the vertical rope A. The shellfish C is cultivated under a state in which the vertical rope A is hung in the sea. A large number of vertical ropes A are mounted to a horizontal rope E, and are hung in the sea. The horizontal rope E is floated on the surface of the sea by buoys D mounted to both ends of the horizontal rope E.

As illustrated in FIG. 35B and FIG. 35C, the pin B includes shellfish locking protrusions H formed on both axial ends of an elongate shank portion G thereof, and two rope locking protrusions I are formed on an inner side of each of the shellfish locking protrusions H. The rope locking protrusions I and the shellfish locking protrusions H protrude from an outer peripheral surface of the shank portion G in the same direction. Recessed portions b (FIG. 36) are formed in an upper surface of the shank portion G and below the shellfish locking protrusions H. The shellfish locking protrusions H are formed to prevent the shellfishes C from slipping away from the shank portion G, and the rope locking protrusions I are formed to prevent the pin B from slipping away from the vertical rope A. When the pin B is inserted into the insertion hole F of the shellfish C, each of the shellfish locking protrusions H is bent to the shank portion G side and superposed on the recessed portion b. Each of the shellfish locking protrusions H is superposed on the recessed portion b, with the result that the pin B is easily inserted into the insertion hole F. As illustrated in FIG. 36, a large number of continuous pins B are formed of a resin. The pin B is cut out one by one from a series of shellfish locking tools 91 wound into a roll as illustrated in FIG. 2 and FIG. 3, and is inserted into the vertical rope A as illustrated in FIG. 35B. The series of pins 91 wound into a roll is obtained by forming the large number of pins B of a resin integrally with two flexible coupling cords a, and is wound into a roll around a drum 90 as illustrated in FIG. 3. The pin is drawn out from the drum 90, is cut out one by one, and is inserted into the vertical rope A.

An operation of forming a hole in the ear J of the shellfish C is automatically performed using a perforator (disclosed in Japanese Patent Application Laid-open No. 2008-154405). An operation of inserting the pin B into the vertical rope A is automatically performed using a pin setter (disclosed in a webpage of product introduction of "pin inserting means" on the website of Mutsu Kaden Tokki Co., Ltd. However, there is no apparatus for automatically inserting the pin B, which is inserted in the vertical rope A, into the insertion hole F of the shellfish C. Accordingly, a worker manually performs the inserting operation. One worker performs the inserting operation several thousand times in a day, and thus is required to do significantly heavy labor. Further, the operation of forming the hole in the shellfish, the operation of inserting the pin into the vertical rope, and the operation of inserting the pin into the shellfish are performed separately. Thus, working efficiency is poor.

The inventors of the present invention have developed an automatic shellfish mounting apparatus capable of sequentially and automatically performing the above-mentioned operations (disclosed in Japanese Patent Application Laid-open No. 2016-154514 and Japanese Patent Application Laid-open No. 2017-140009). The automatic shellfish mounting apparatus can simultaneously form holes in two shellfishes, and can simultaneously mount the two shellfishes to both end sides of one pin inserted in the vertical rope. Accordingly, labor imposed on a worker is greatly reduced, and working efficiency is significantly increased.

However, the shank portion G of the pin B is thin (in general, the shank portion G has a diameter of approximately from 1.5 mm to 1.6 mm). In addition, the pin B is formed of a resin, and has the recessed portions b. Accordingly, when a force is applied to push an end portion of the shank portion G in an axial direction of the pin, the pin may be bent (buckled) from the recessed portions b. Consequently, there arises such a trouble that an end portion B1 of the pin B is not smoothly inserted into the insertion hole F of the shellfish C. The automatic shellfish mounting apparatus automatically stops the operations when a trouble arises, and hence the automatic shellfish mounting apparatus has a disadvantage in that much time is required to handle the trouble and working efficiency is reduced.

SUMMARY OF THE INVENTION

It is an object of the present invention to enable an operation of mounting a shellfish to a vertical rope A to be performed more efficiently than heretofore.

A shellfish mounting method according to one embodiment of the present invention is a method of mounting two shellfishes to one pin simultaneously or substantially simultaneously (both phrases are hereinafter represented as "substantially simultaneously"). The shellfish mounting method includes: holding both end sides of one pin; inserting elongate guides through insertion holes of two shellfishes, respectively; putting end portions of both the guides on both end portions of the pin, respectively; arranging the guides and the one pin in a straight line; and transferring the shellfishes onto the pin by sliding the shellfishes, through which the guides are inserted, along the respective guides beyond shellfish locking protrusions of the pin, to thereby mount the shellfishes to both the end portions of the pin substantially simultaneously in parallel.

A shellfish mounting apparatus according to one embodiment of the present invention is an apparatus capable of sequentially and automatically performing operations of: substantially simultaneously forming insertion holes in two shellfishes; cutting out a pin one by one from a series of pins formed of a large number of continuous pins; inserting the cut-out pin into a vertical rope; substantially simultaneously inserting guides into the insertion holes of the two shellfishes, respectively; arranging the one pin and the guides, which are put on both end portions of the pin, in a straight line; and transferring the shellfishes onto the pin by substantially simultaneously sliding the shellfishes, through which the guides are inserted, along the respective guides beyond shellfish locking protrusions of the pin.

The shellfish mounting method according to the present invention of mounting the shellfishes to the pin has the following effects.

(1) Both ends of the pin are grasped. Thus, even when the guides are put on the pin or even when the shellfishes are transferred onto the pin, the pin is less likely to buckle. Accordingly, the shellfishes can be reliably mounted to the pin.

(2) The shellfishes are slid along the guides that are put on the pin so as to be aligned with the pin. Accordingly, the shellfishes are easily transferred onto the pin.

(3) An operation of forming holes in the shellfishes, an operation of inserting the pin into the vertical rope, and an operation of transferring the shellfishes onto the pin are all performed automatically. Further, the operations are performed on two shellfishes substantially simultaneously in parallel. Accordingly, the operations of mounting the shellfishes to the vertical rope are facilitated. As a result, working efficiency is increased, and significant labor saving can be achieved.

(4) Both end portions of the pin inserted in the vertical rope are held, and the guides are put on both ends of the held pin, respectively. Further, the shellfishes are transferred onto the pin by sliding the shellfishes along the guides. Accordingly, the shellfishes are easily mounted to both ends of the pin.

The shellfish mounting apparatus according to the present invention, which is configured to mount the shellfishes to the vertical rope, can fully automatically and sequentially mount the shellfishes to both end portions of the one pin substantially simultaneously in parallel. Accordingly, the operations of mounting the shellfishes to the vertical rope are facilitated, and working efficiency is increased.

BRIEF DESCRIPTION OF THE DRAWINGS

FIG. 24A is a plan view for illustrating a pin position adjusting tool.

FIG. 24B is a sectional view for illustrating the pin position adjusting tool.

FIG. 28A to FIG. 28D are explanatory views for illustrating operations of the shellfish aligning unit of FIG. 27B, in which FIG. 28A is an explanatory view for illustrating a state before rotation of the pushing tool, FIG. 28B is an explanatory view for illustrating a state after rotation of the pushing tool, FIG. 28C is an explanatory view for illustrating a state in which the rotated pushing tool is moved horizontally or substantially horizontally, and FIG. 28D is an explanatory view for illustrating operations of the pushing tool of FIG. 28A to FIG. 28C.

FIG. 29A to FIG. 29D are explanatory views for illustrating operations of the shellfish aligning unit of FIG. 27C, in which FIG. 29A is an explanatory view for illustrating a state before rotation of the pushing tool, FIG. 29B is an explanatory view for illustrating a state after rotation of the pushing tool, FIG. 29C is an explanatory view for illustrating a state in which the rotated pushing tool is moved horizontally or substantially horizontally, and FIG. 29D is an explanatory view for illustrating operations of the pushing tool of FIG. 29A to FIG. 29C.

FIG. 30A and FIG. 30B are partial schematic views for illustrating an insertion hole forming apparatus in the present invention, in which FIG. 30A is an explanatory perspective view for illustrating the insertion hole forming apparatus, and FIG. 30B is an explanatory plan view for illustrating the insertion hole forming apparatus.

DESCRIPTION OF THE EMBODIMENTS

First Embodiment

Figure 3:
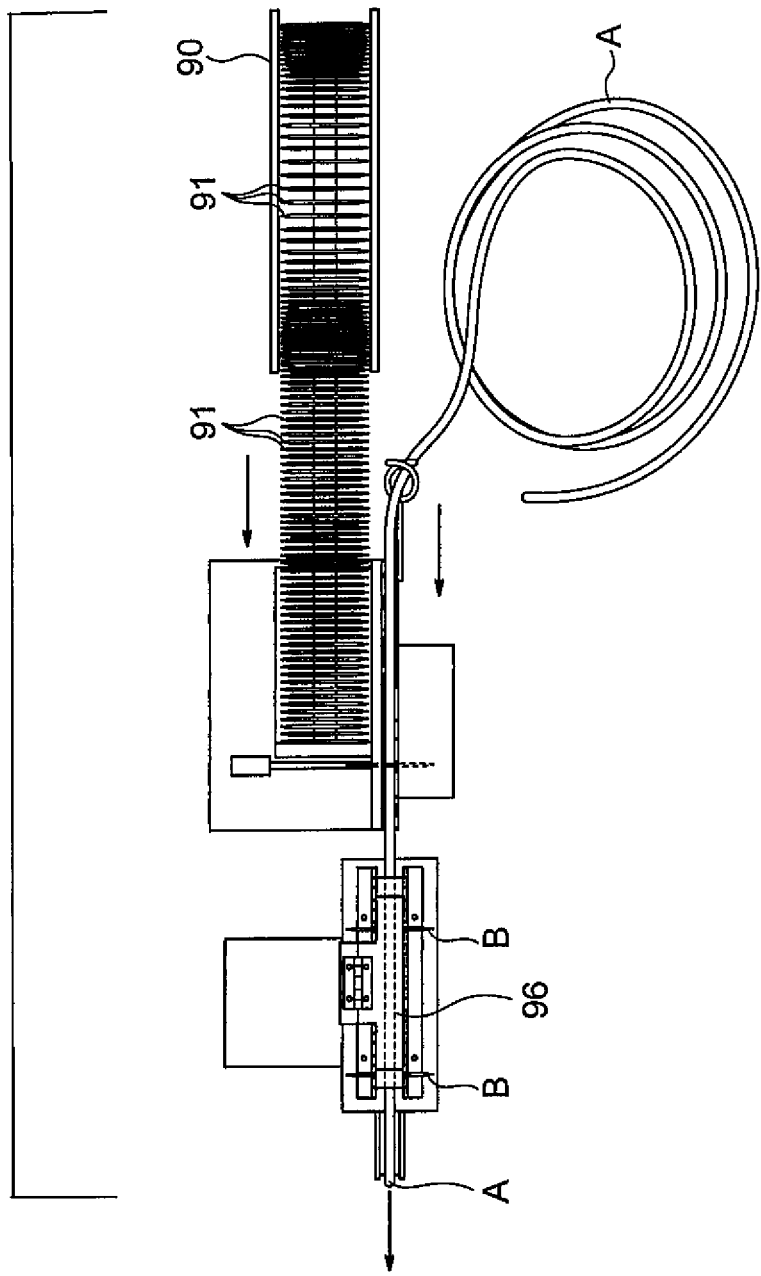
FIG. 3 is a plan view for illustrating another example of the shellfish mounting apparatus of the present application.
Figure 4:
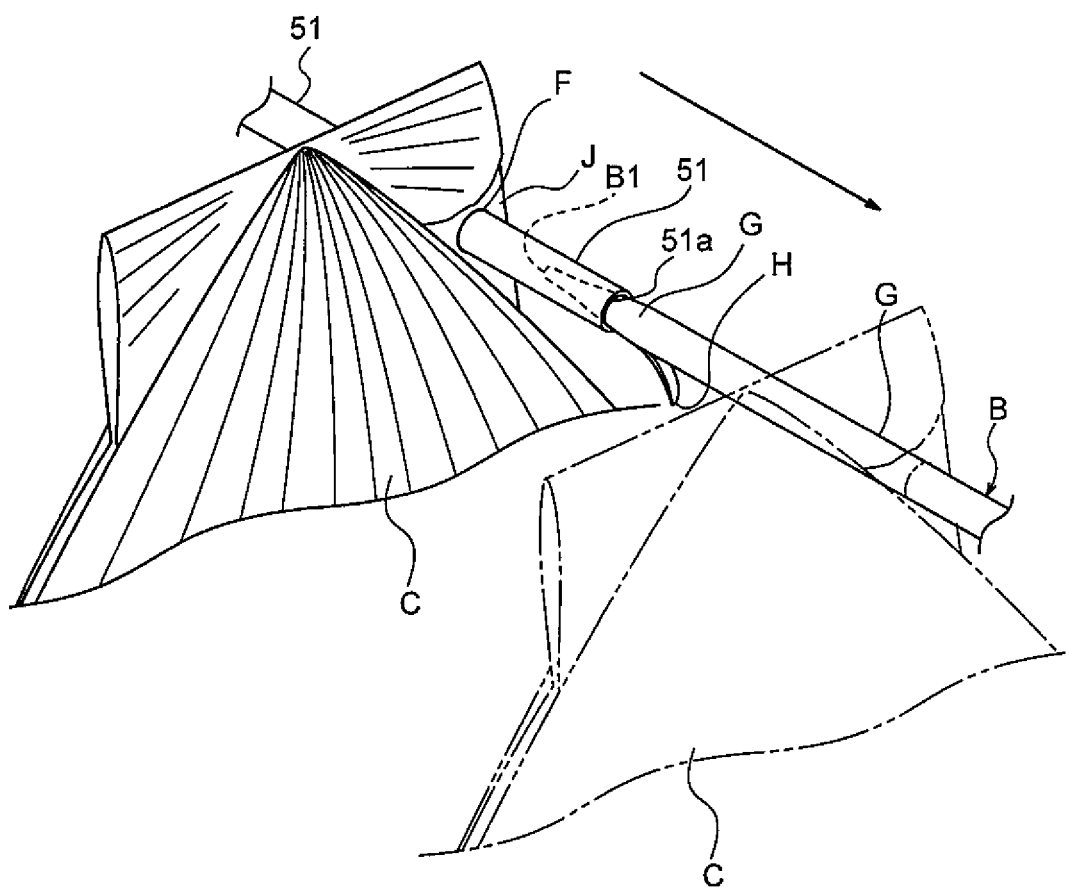
FIG. 4 is an explanatory view for illustrating how to mount a pin to a shellfish.
Figure 5A:
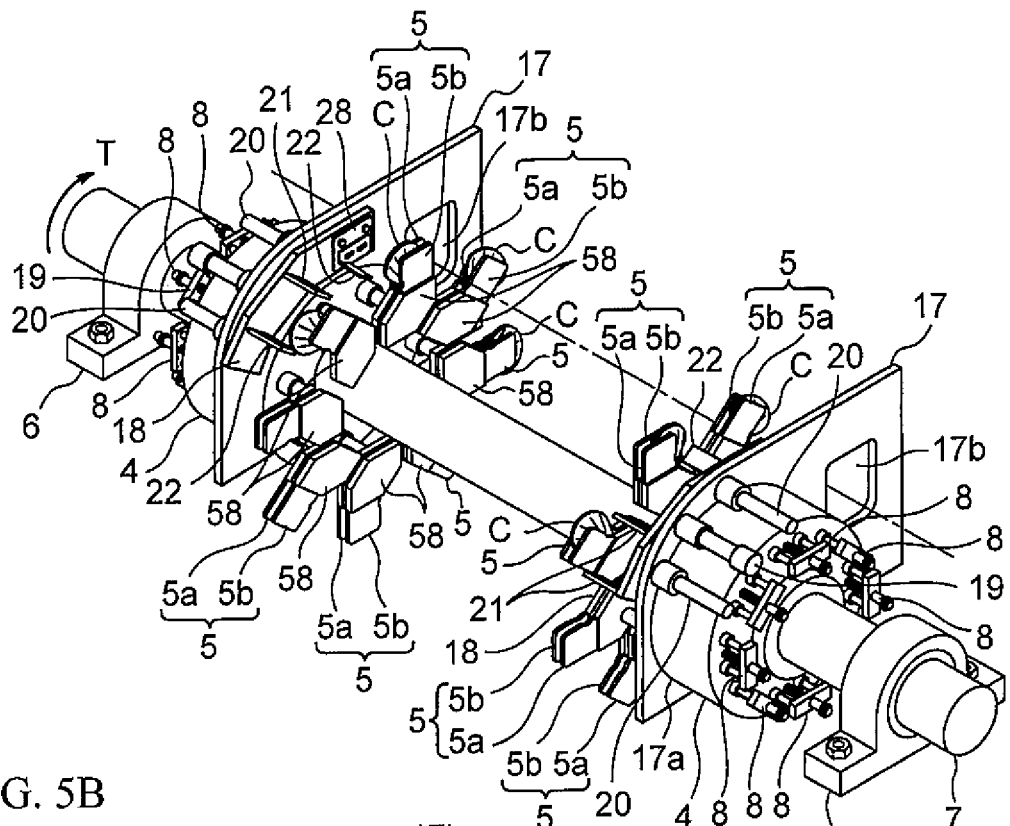
FIG. 5A is a perspective view for illustrating a state in which each moving body is away from a shellfish grasping body.
Figure 5B:
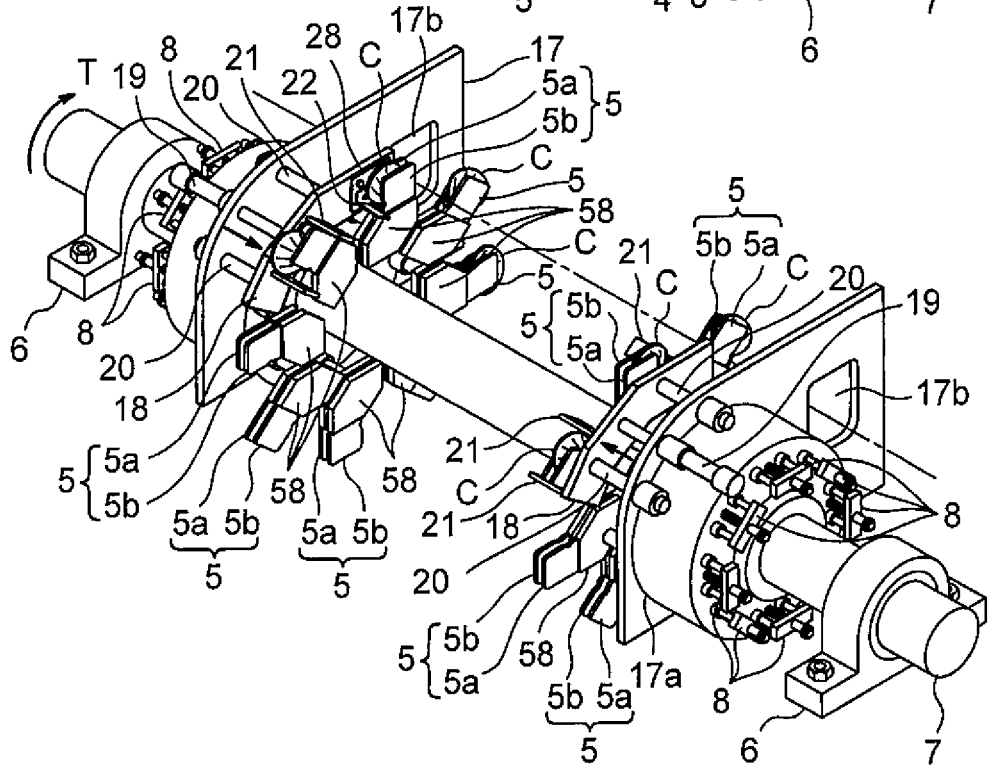
FIG. 5B is a perspective view for illustrating a state in which each moving body is close to the shellfish grasping body.

Examples of a shellfish mounting method and a shellfish mounting apparatus according to the present invention are described with reference to the drawings. A shellfish mounting apparatus illustrated in FIG. 1 to FIG. 3 is configured to: form an insertion hole F in an ear J of each shellfish C as illustrated in FIG. 4; insert an elongate tubular guide 51 into the insertion hole F; put an end portion 51a of the guide 51 on an outer periphery of an end portion B1 of one pin B; and transfer and mount the shellfish C onto the pin B by sliding the shellfish C along the guide 51 in a direction indicated by the arrow of FIG. 4.

Figure 1:
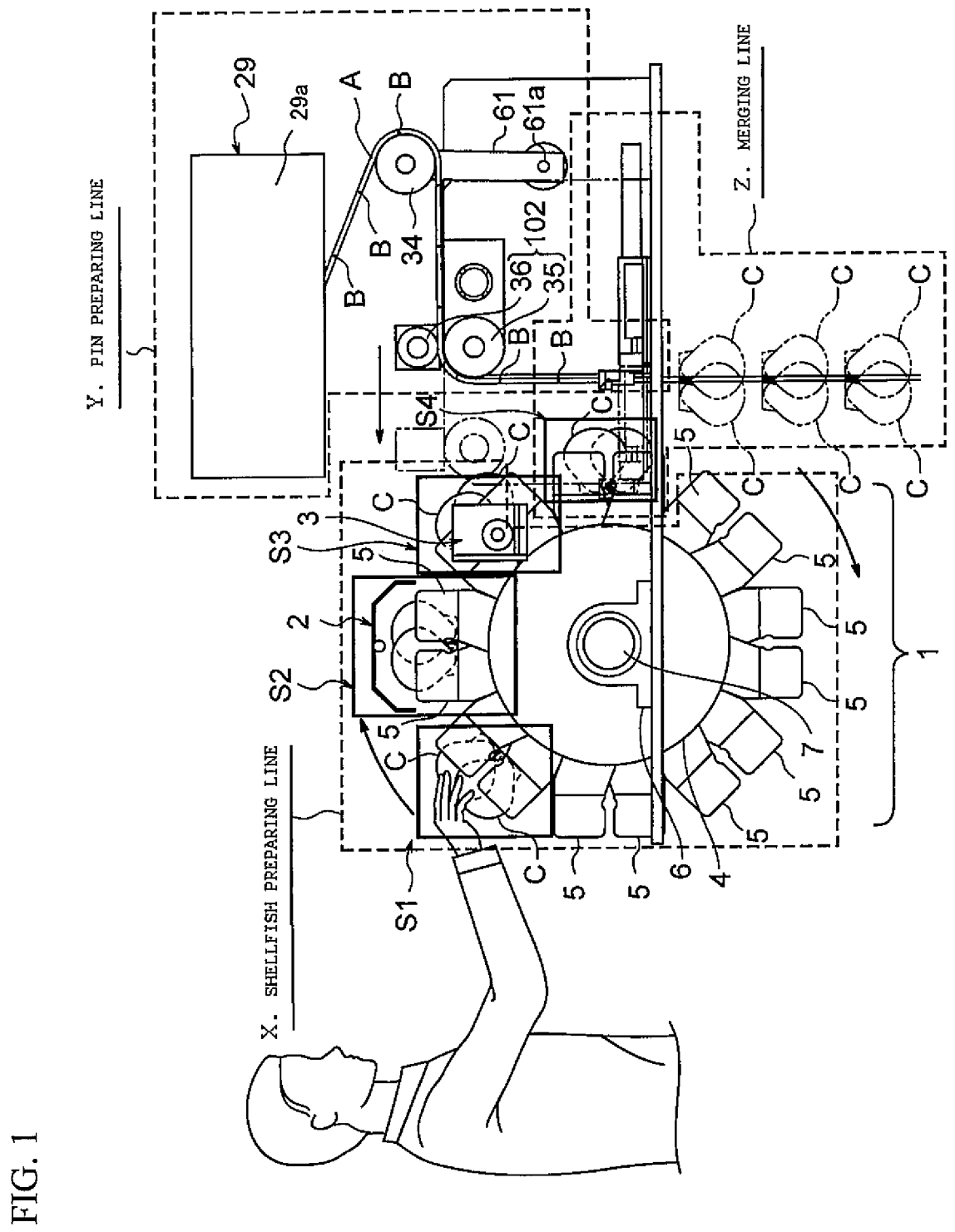
FIG. 1 is a schematic view for illustrating an example of a shellfish mounting apparatus of the present application.
Figure 2:
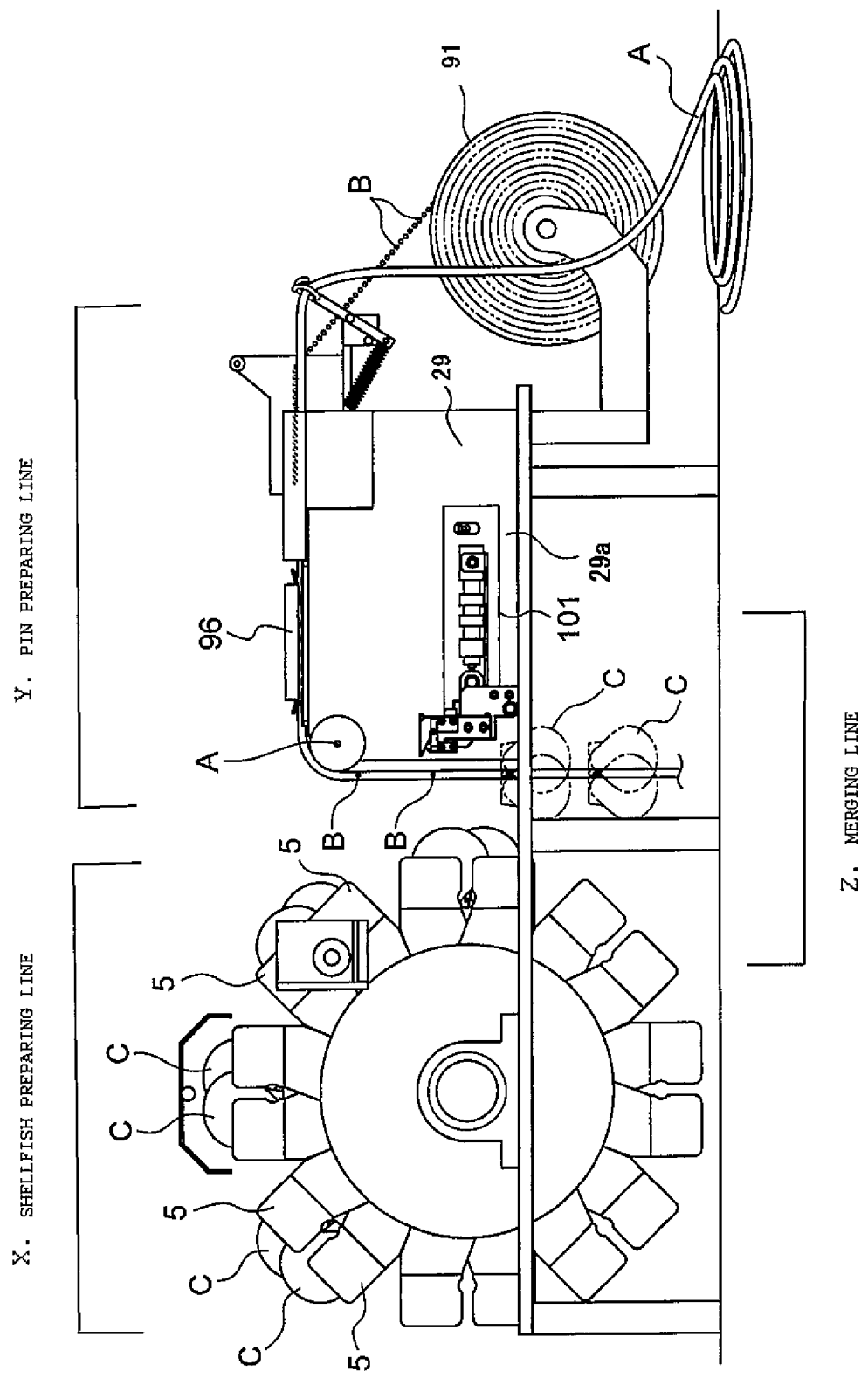
FIG. 2 is a side view for illustrating another example of the shellfish mounting apparatus of the present application.

As illustrated in FIG. 1 and FIG. 2, the shellfish mounting apparatus according to the present invention includes a shellfish preparing line X, a pin preparing line Y, and a merging line Z. On the shellfish preparing line X, after the shellfish is set, the shellfish is conveyed along with intermittent rotation, and the insertion hole is formed in the shellfish during temporary halt. On the pin preparing line Y, the pin B is inserted into a vertical rope A. On the merging line Z, the shellfish C having the insertion hole F formed therein on the shellfish preparing line X is mounted to the pin B inserted in the vertical rope A.

A hole forming operation to be performed on the shellfish preparing line X, and a pin inserting operation to be performed on the pin preparing line Y are performed separately.

The shellfish C having the insertion hole F formed therein, and the vertical rope A having the inserted pin B are sent into the merging line Z. On the merging line Z, the shellfish C is mounted to the pin B that is mounted in the vertical rope A.

[Shellfish Preparing Line X]

The shellfish preparing line X includes a shellfish conveying unit 1 capable of conveying the shellfishes C, an aligning unit 2 configured to align, to hole forming positions, the shellfishes C conveyed by the shellfish conveying unit 1, and a hole forming unit 3 configured to form the insertion holes F in the shellfishes C aligned by the aligning unit 2.

[Shellfish Conveying Unit]

The shellfish conveying unit 1 illustrated in FIG. 1 and FIG. 2 includes a plurality of shellfish grasping bodies 5 provided on each rotator 4 that is thick and formed into a disc shape as illustrated in FIG. 5A, FIG. 5B, FIG. 6A, and FIG. 6B. Two opposed shellfish grasping bodies 5 respectively arranged on the right and left rotators 4 are paired with each other, and a plurality of pairs of shellfish grasping bodies 5 are provided. The two rotators 4 are mounted at an interval to a long shaft 7 that has each end held by a bearing 6. The long shaft 7 is rotated by a driving source (not shown), thereby rotating the rotators 4 in a direction indicated by the arrow T of FIG. 5A and FIG. 5B.

As illustrated in FIG. 1, the shellfish conveying unit 1 includes a shellfish setting section S1 in which the shellfishes C are set in the shellfish grasping bodies 5, an aligning section S2 in which the shellfishes C are aligned at predetermined positions, and a hole forming section S3 in which the insertion holes F are formed in the shellfishes C, which are provided in the stated order from a backward side in the rotating direction of the rotators 4 to a forward side in the rotating direction thereof. When the rotators 4 are rotated, the shellfish grasping bodies 5 are sent to the shellfish setting section S1, the aligning section 52, and the hole forming section S3 in the stated order. A shellfish mounting section 54 is arranged on the forward side of the hole forming section 53. The shellfish mounting section 54 is positioned on the merging line Z.

The rotators 4 are not rotated when the shellfish C is set in only one of the paired two shellfish grasping bodies 5. The rotators 4 are rotated by a unit pitch only after the shellfishes C are set in both of the shellfish grasping bodies 5. A sensor (not shown) can detect whether or not the shellfishes C are set in the shellfish grasping bodies 5. The unit pitch described herein corresponds to a movement distance of the pair of shellfish grasping bodies 5 from the shellfish setting section S1 to the subsequent aligning section S2, or a movement distance of the pair of shellfish grasping bodies 5 from the aligning section S2 to the subsequent hole forming section 53. The rotators 4 convey, to the shellfish mounting section S4, the shellfishes C each having the insertion hole F formed in the hole forming section S3. The rotators 4 convey the shellfishes C so that the insertion hole F of each of the shellfishes C conveyed to the shellfish mounting section 54 is opposed to the end portion B1 of the pin B positioned at the shellfish mounting section S4.

As illustrated in FIG. 5A, FIG. 5B, FIG. 6A, and FIG. 6B, eight pairs of shellfish grasping bodies 5 are provided in a radial pattern at equal intervals or substantially equal intervals (description of "equal intervals" hereinafter encompasses both meanings). Each of the shellfish grasping bodies 5 includes two grasping pieces 5a and 5b arranged in an opposed manner at an interval, and the interval between both of the grasping pieces 5a and 5b is wide enough for one shellfish C to be set. Of the two grasping pieces 5a and 5b, the outer grasping piece 5a has a cutout portion 5x (FIG. 11) formed to allow passage of a drill blade 25 of the hole forming unit 3 illustrated in FIG. 7. The respective grasping pieces 5a and 5b are supported by a grasping body support unit 8 mounted to the outer side of the rotator 4. The grasping body support unit 8 illustrated in FIG. 8 includes a base 9, a support bar 10, and push bars 11 provided on both sides of the support bar 10. One end of the support bar 10 is protruded through the rotator 4 to the inner side of the rotator 4. The outer grasping piece 5a, which is closer to the rotator 4 than the inner grasping piece 5b, and another inner grasping piece 5b are coupled to the protruded end portion of the support bar 10. Another end of the support bar 10 is protruded through the base 9 to the outer side of the base 9, and an annular locking flange 12 is provided on the protruded portion.

Figure 8:
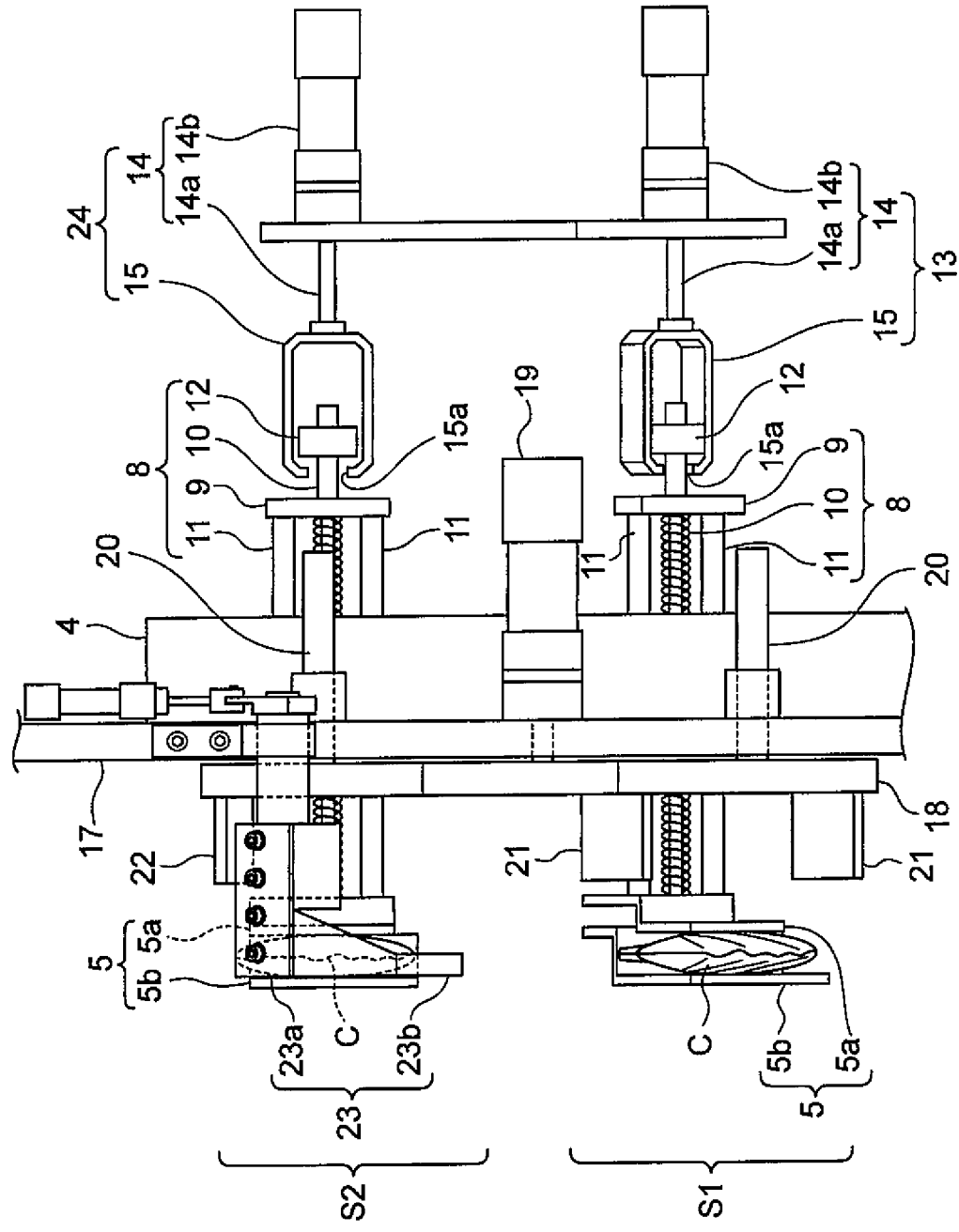
FIG. 8 is a plan view for illustrating a shellfish setting section and an aligning section.
Figure 9A:
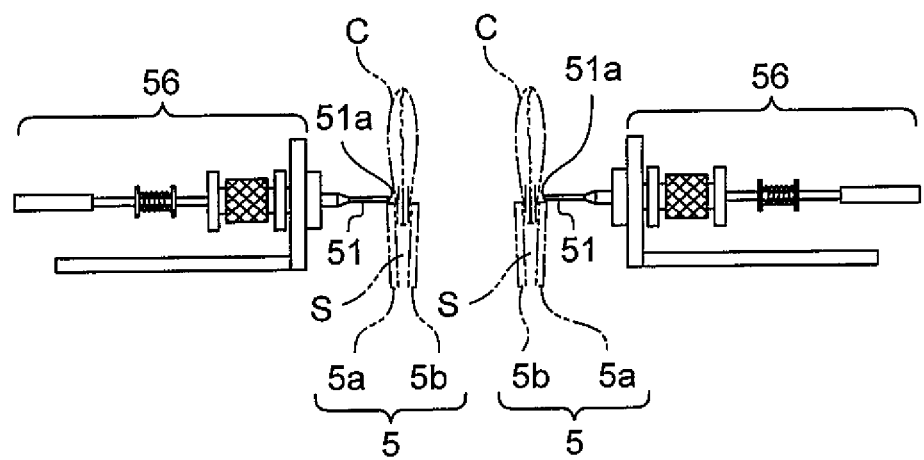
FIG. 9A is an explanatory view for illustrating how to insert each guide into an insertion hole of the shellfish.

A first pulling mechanism 13 configured to pull the support bar 10 outward is provided on the outer side of the grasping body support unit 8 (FIG. 8). The first pulling mechanism 13 includes an air cylinder 14, and a locking ring 15 mounted to a rod 14a of the air cylinder 14. The locking ring 15 has a cutout 15a formed to allow passage of the support bar 10. The locking flange 12 of the grasping body support unit 8 (FIG. 5A, FIG. 5B, FIG. 6A, and FIG. 6B) is arranged inside the locking ring 15. When the rod 14a of the air cylinder 14 illustrated in FIG. 8 is retreated into a cylinder tube 14b, the outer grasping piece 5a coupled to the support bar 10 is pulled outward, thereby increasing a space S (FIG. 9A) between both the grasping pieces 5a and 5b. When pulling performed by the first pulling mechanism 13 illustrated in FIG. 8 is cancelled, the space S is reduced. The first pulling mechanism 13 is not provided for each shellfish grasping body 5, but is provided for shared use among all of the shellfish grasping bodies 5. Every time one of the shellfish grasping bodies 5 is shifted to a pulling position, the first pulling mechanism 13 can pull the support bar 10 for the shifted shellfish grasping body 5.

The push bars 11 are provided on both sides of the support bar 10 (FIG. 8). One ends of the push bars 11 are protruded through the rotator 4 to the inner side of the rotator 4, and both the grasping pieces 5a and 5b are coupled to the protruded end portions, respectively. Another ends of the push bars 11 are fixed to the base 9. When the base 9 of the grasping body support unit 8 is pushed inward by a pusher 16 (FIG. 10), the push bars 11 are moved inward along with movement of the base 9, and both the grasping pieces 5a and 5b (FIG. 10) fixed to distal ends of the push bars 11 are slid inward while holding the shellfish C. A push bar guide (not shown) is provided on the outer periphery of each of the push bars 11 so as to prevent the shellfish grasping body 5 pushed by the push bars 11 from slipping laterally.

As illustrated in FIG. 5A, FIG. 5B, FIG. 6A, and FIG. 6B, a partition body 17 having a flat plate shape is provided on an outer peripheral side of each rotator 4. The inner side of the rotator 4 is exposed from an opening portion 17a formed in the partition body 17. A moving body 18 is provided on the inner side of each partition body 17 so as to be movable in a reciprocating manner in a direction of moving close to the shellfish grasping bodies 5 and a direction of moving away from the shellfish grasping bodies 5. The moving body 18 is a plate member having a length extending from the shellfish setting section S1 to the aligning section S2 in the rotator 4, and is moved in a reciprocating manner by an air cylinder 19 (FIG. 8) provided on the partition body 17. Guide bars 20 (FIG. 8), which are connected to the moving body 18 at one end sides thereof, are provided on both sides of the air cylinder 19, respectively. The guide bars 20 prevent the moving body 18 from being misaligned or tilted.

Side support tools 21 (FIG. 5A, FIG. 5B, FIG. 6A, and FIG. 6B) are provided on the moving body 18 to protrude inward. The side support tools 21 are allocated to sides (representing herein the forward side and the backward side in the rotating direction of the rotator 4) of the shellfish grasping body 5 positioned at the shellfish setting section S1, and support sides of the shellfish C set in the shellfish grasping body 5. The side support tools 21 are two plate members arranged at an interval, and the shellfish grasping body 5 is accommodated between the two plate members. When supporting the sides of the shellfish C by the side support tools 21, the moving body 18 is moved close to the shellfish grasping body 5. When the rotator 4 is rotated, the moving body 18 is restored to an original position so as not to hinder rotation of the rotator 4.

[Shellfish Aligning Unit]

Figure 11:
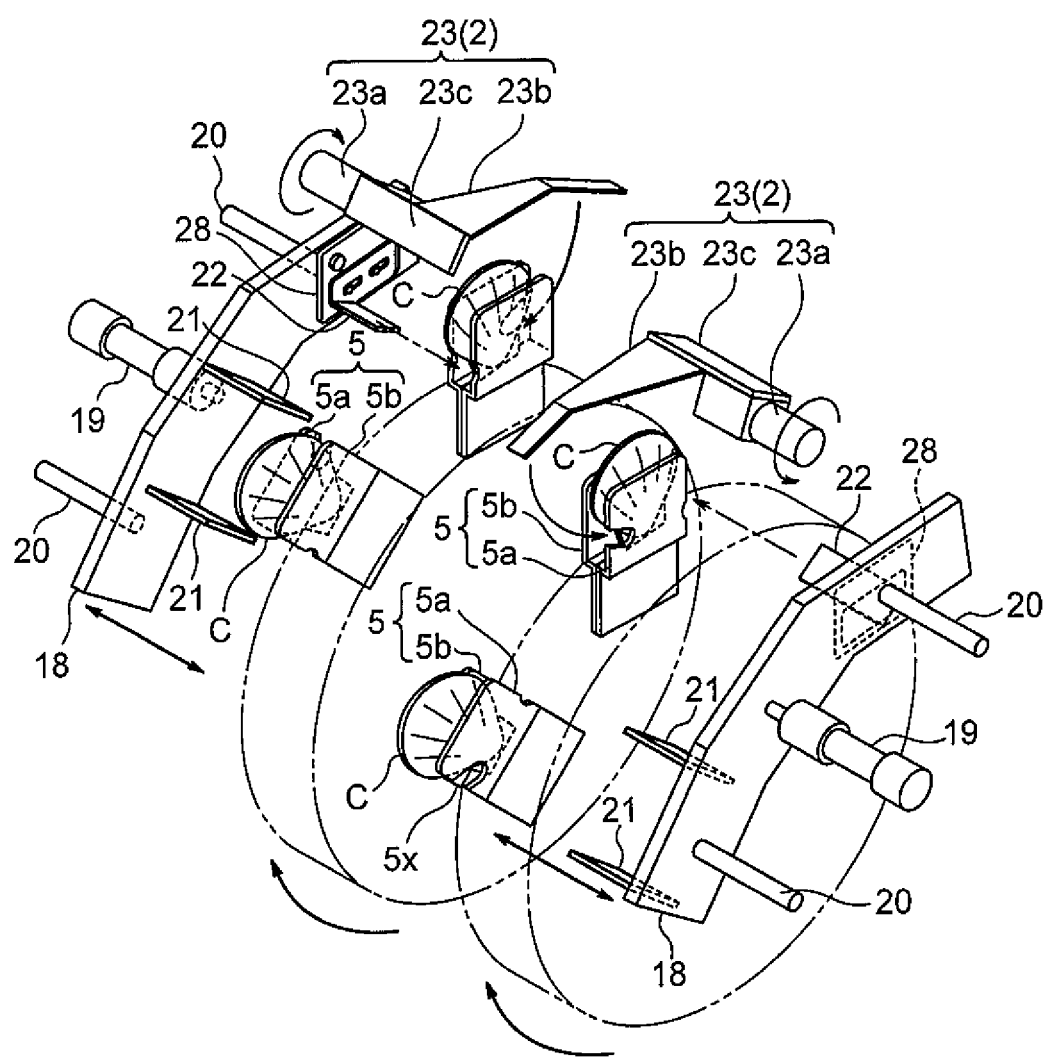
FIG. 11 is a perspective view for illustrating positional relationships between the shellfish grasping bodies and side support tools and positional relationships between pushing tools and assist plates.

The shellfish aligning unit 2 illustrated in FIG. 1 is a unit configured to align, to the hole forming positions, the shellfishes C that have reached the aligning section S2. The aligning unit 2 illustrated in FIG. 11 and FIG. 12 includes assist plates 22 each provided to protrude in the same direction as the protruding direction of the side support tools 21 of the moving body 18, and pushing tools 23. Each assist plate 22 is provided upright on a support plate 28 that has a flat plate shape and is fixed to the moving body 18. When the moving body 18 is moved close to the shellfish grasping body 5, the assist plate 22 is allocated to one side of the shellfish grasping body 5 positioned at the aligning section S2 (FIG. 1). Specifically, the assist plate 22 provided on the near side of FIG. 11 is allocated to one side (forward side in the rotating direction of the rotator 4) of the shellfish grasping body 5 positioned at the aligning section S2 under a state in which the moving body 18 is close to the shellfish grasping body 5. Under a state in which the moving body 18 is away from the shellfish grasping body 5, the assist plate 22 can support another side (backward side in the rotating direction of the rotator 4) of the shellfish grasping body 5 positioned at the aligning section S2. When supporting one side of the shellfish C by the assist plate 22, the moving body 18 is moved close to the shellfish grasping body 5. When the rotator 4 is rotated, the moving body 18 is restored from the shellfish grasping body 5 side to the original position so as not to hinder rotation of the rotator 4.

Figure 12:
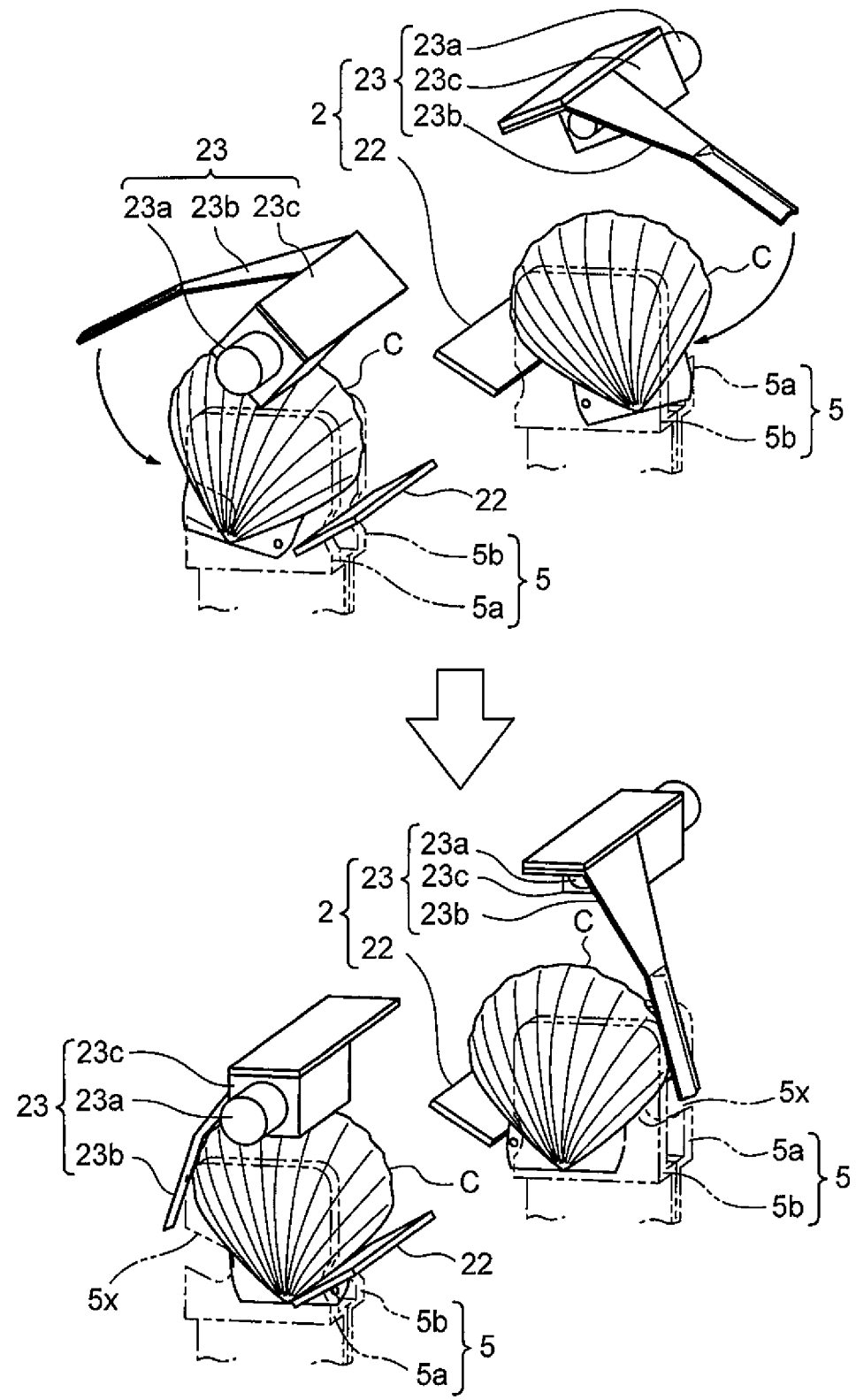
FIG. 12 is a perspective view for illustrating an aligning unit.

As illustrated in FIG. 11 and FIG. 12, each pushing tool 23 includes a support shaft 23a supported so as to be rotatable, a rotary block 23c provided on the support shaft 23a, and a pushing piece 23b that is fixed to the rotary block 23c and has a doglegged shape in side view. The pushing tool 23 is configured to align the shellfish C positioned at the aligning section S2 to the predetermined position in cooperation with the assist plate 22. The pushing tool 23 is provided on a side on which the pushing tool 23 can push the shellfish C, which has one side supported by the assist plate 22, from an opposite side of the assist plate 22. Specifically, in the pushing tool 23 on the near side of FIG. 11, the pushing piece 23b can be turned from the backward side in the rotating direction of the rotator 4 to the assist plate 22 side (forward side in the rotating direction of the rotator 4). In the pushing tool 23 on the deep side of FIG. 11, the pushing piece 23b can be turned from the forward side in the rotating direction of the rotator 4 to the assist plate 22 side (backward side in the rotating direction of the rotator 4).

Figure 9B:
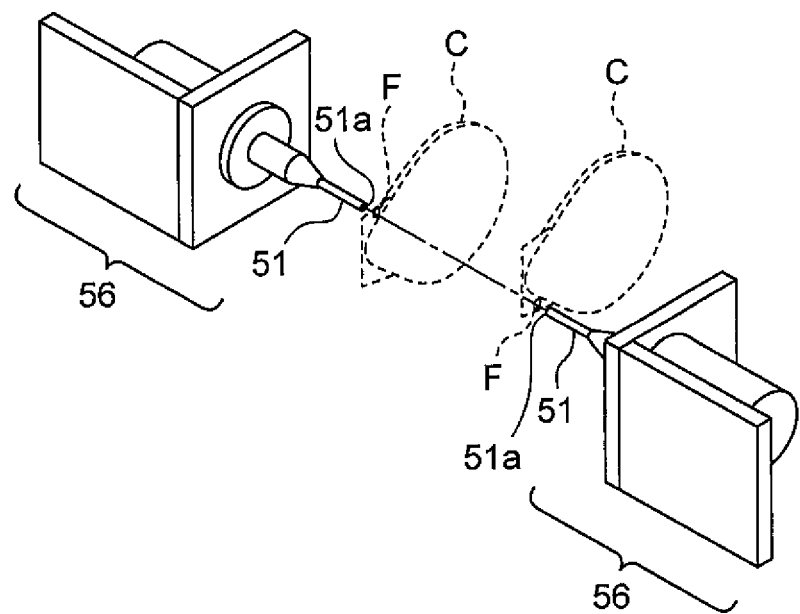
FIG. 9B is a perspective view of FIG. 9A.

When the aligning unit 2 aligns the ear J of the shellfish C to the hole forming position, the shellfish C is immovable under a state in which the grasping pieces 5a and 5b grasp the shellfish C. Accordingly, it is necessary to momentarily cancel grasping of the shellfish C by the grasping pieces 5*a* and 5*b*. As illustrated in FIG. 8, a second pulling mechanism 24 (grasping cancelling mechanism) configured to open and close the grasping pieces 5*a* and 5*b* of the shellfish grasping body 5 positioned at the aligning section S2 is provided on the outer side of the aligning section S2 (FIG. 1), and the second pulling mechanism 24 can open and close the grasping pieces 5*a* and 5*b* momentarily. The second pulling mechanism 24 has the same configuration as that of the first pulling mechanism 13. When the second pulling mechanism 24 pulls outward the locking flange 12 (FIG. 8) for the shellfish grasping body 5, the space S between both the grasping pieces 5*a* and 5*b* is increased. When pulling performed by the second pulling mechanism 24 is cancelled, the space S (FIG. 9) between both the grasping pieces 5*a* and 5*b* is reduced. Similarly to the first pulling mechanism 13, the second pulling mechanism 24 is also provided for shared use among all of the shellfish grasping bodies 5. Every time one of the shellfish grasping bodies 5 is shifted to the pulling position, the second pulling mechanism 24 can pull the locking flange 12 for the shifted shellfish grasping body 5.

[Hole Forming Unit]

Figure 7:
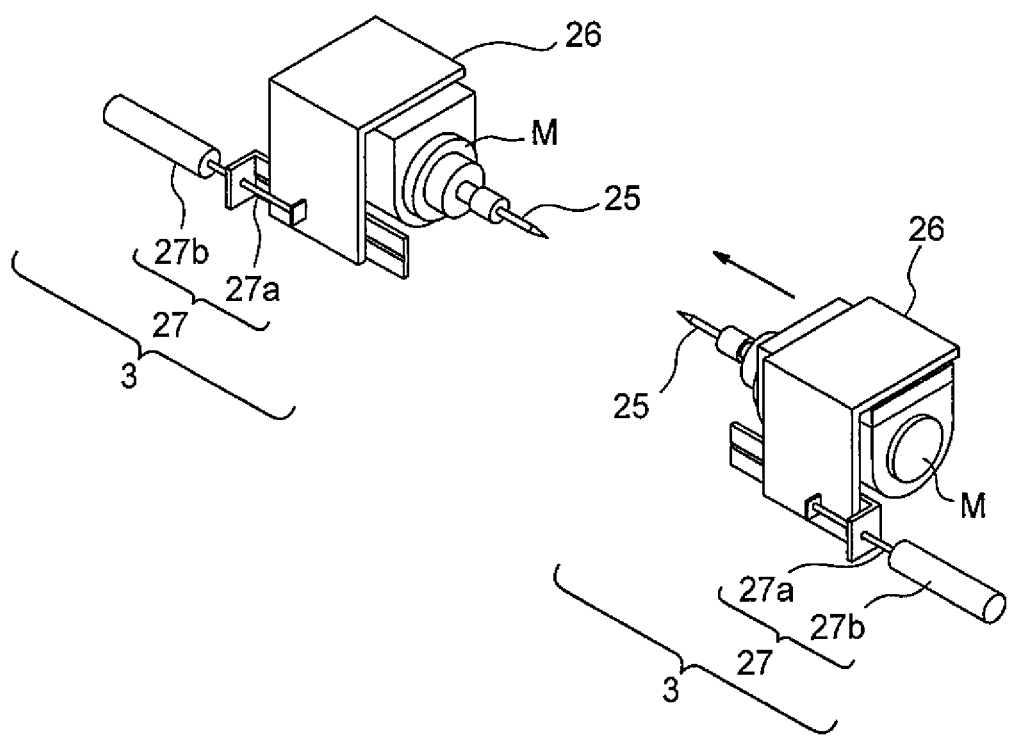
FIG. 7 is a perspective view for illustrating an example of each hole forming unit.

Each hole forming unit 3 illustrated in FIG. 7 is a unit configured to form the insertion hole F in the ear J (FIG. 4) of the shellfish C aligned by the aligning unit 2 (FIG. 1). As an example, the hole forming unit 3 illustrated in FIG. 7 includes a motor M, the drill blade 25 held by the motor M, a base body 26 to which the motor M is mounted, and an air cylinder 27 configured to advance or retreat the base body 26 that holds the drill blade 25. The base body 26 is advanced toward the shellfish C by pushing out a rod 27*a* of the air cylinder 27, and is retreated by returning the rod 27*a* into a cylinder tube 27*b*. The hole forming unit 3 can form the insertion hole F in the shellfish C having reached the hole forming section S3 by advancing the base body 26 while rotating the drill blade 25.

Figure 6A:
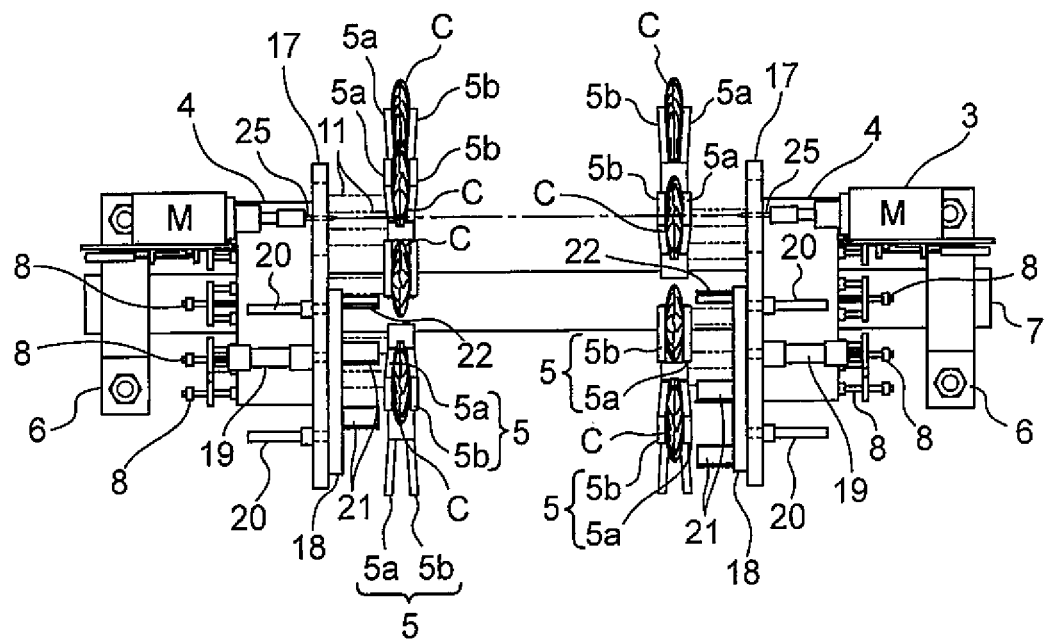
FIG. 6A is a side view of FIG. 5A.
Figure 6B:
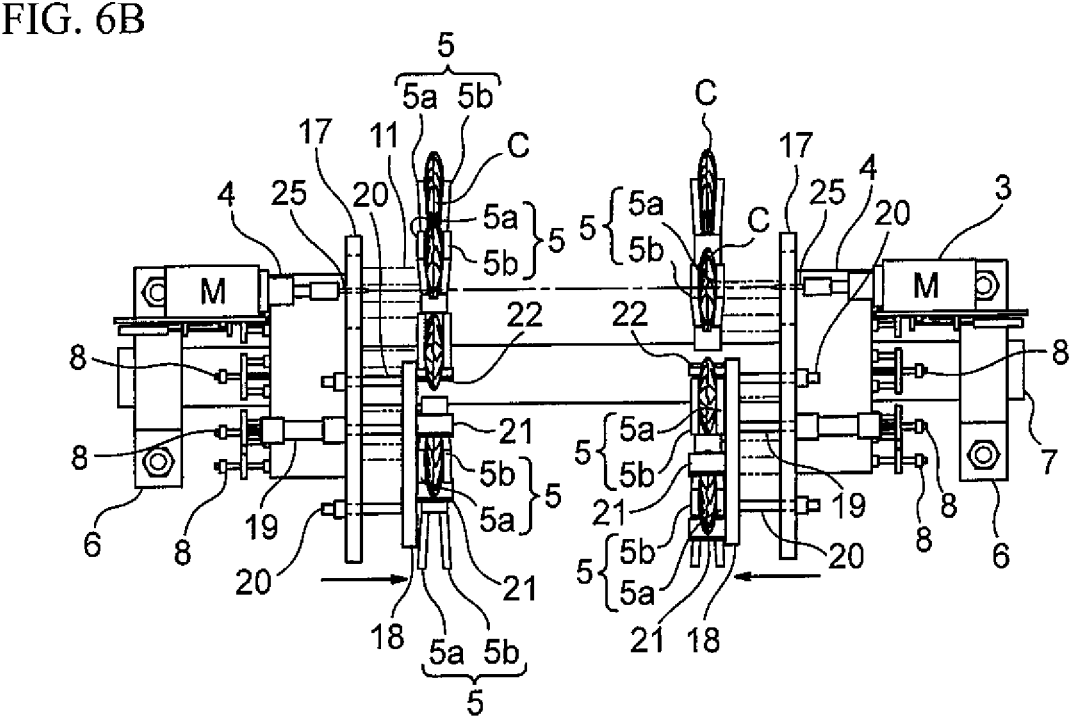
FIG. 6B is a side view of FIG. 5B.

As the hole forming unit 3, a scallop shell perforator disclosed in Japanese Patent Application Laid-open No. 2008-154405 and other drills may be used. When the hole forming unit 3 is not operated, the hole forming unit 3 waits at a position on the outer side of the partition body 17 (FIG. 6A and FIG. 6B). When the shellfish C reaches the hole forming section S3, the hole forming unit 3 is moved to the shellfish C side, and is restored to the original position after finish of forming the insertion hole F. A through-hole 17*b* (FIG. 5A and FIG. 5B) having a size large enough to allow passage of the hole forming unit is formed in the partition body 17. When the hole forming unit 3 is advanced or retreated, the hole forming unit 3 can pass through the through-hole 17*b*.

[Y. Pin Preparing Line]

The pin preparing line Y (FIG. 1) includes a rope conveying mechanism 102 configured to convey the vertical rope A forward, a pin inserting unit (hereinafter referred to as "pin setter") 29 configured to insert the pin B into the vertical rope A, a rope guide 31 (FIG. 16A) configured to guide the vertical rope A having the pin B inserted therein, an oscillation body 33 that is oscillated through contact with the pin B inserted in the vertical rope A, and a sensor 48 (FIG. 17A to FIG. 17C) configured to detect proximity of the oscillation body 33.

[Pin Setter]

[Pin Setter]

As the pin setter 29 (FIG. 1), for example, there may be used a pin setter disclosed in a webpage of product introduction of "pin inserting means" on the website of Mutsu Kaden Tokki Co., Ltd. The pin setter 29 includes a pin holder configured to hold a series of pins 91 (FIG. 2) obtained in such a manner that pins connected in parallel to one another at predetermined intervals are wound into a roll around a cylindrical core, a pin sending portion (not shown) configured to send the series of pins 91 forward while unwinding the series of pins 91 into a flat surface shape, a cutting portion (not shown) provided on the forward side of the pin sending portion, and an inserting unit (not shown) configured to insert, into the vertical rope A, the pin B cut out by the cutting portion. The series of pins 91 is sent forward by the pin sending portion, and is cut into pins one by one by the cutting portion. The pins are inserted into the vertical rope A at equal intervals or substantially equal intervals by the inserting unit.

[Pin Orientation Aligning Device]

Figure 19:
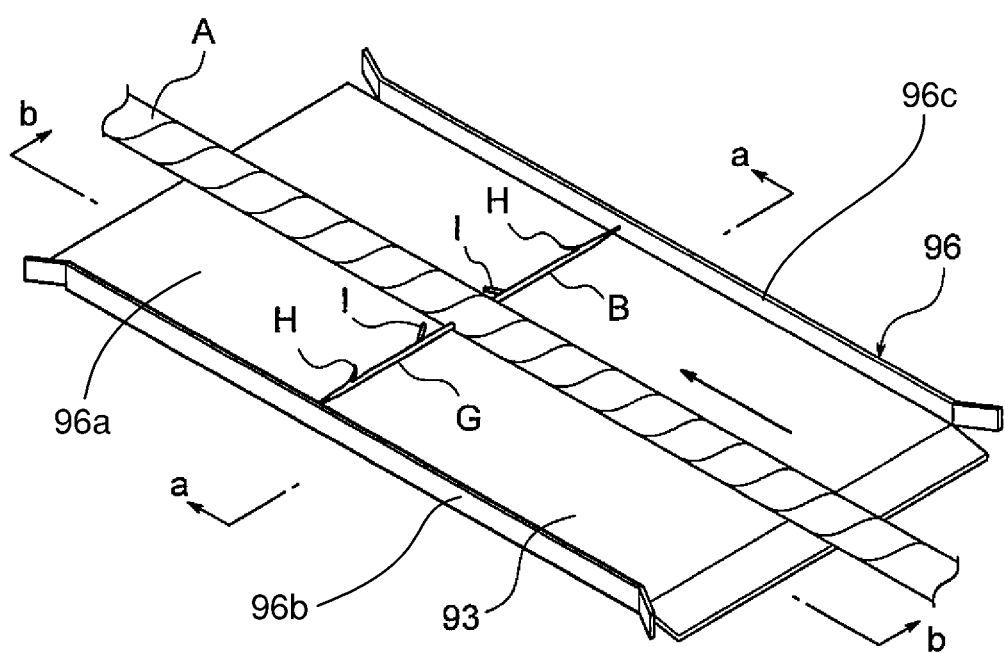
FIG. 19 is a perspective view for illustrating a pin aligning device according to the present invention.
Figure 20A:
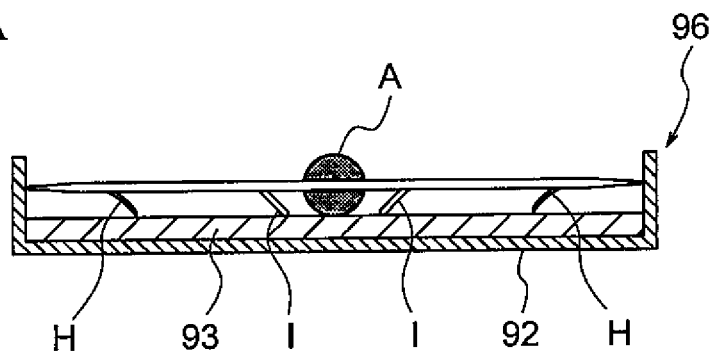
FIG. 20A is a sectional view taken along the line a-a of FIG. 19.
Figure 20B:
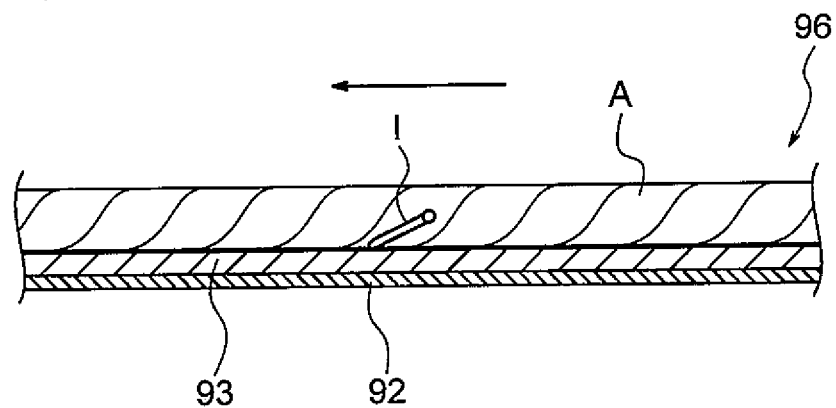
FIG. 20B is a sectional view taken along the line b-b of FIG. 19.

As illustrated in FIG. 19 and FIG. 20A, when the pin B is inserted in the vertical rope A, rope locking protrusions I and shellfish locking protrusions H are directed substantially in the same direction (directed downward in FIG. 20A and FIG. 20B). When the pin B is conveyed to the shellfish mounting section S4 under a state in which the rope locking protrusions I and the shellfish locking protrusions H are directed downward, the pin B can be smoothly inserted into the insertion hole F of the shellfish C. Accordingly, as illustrated in FIG. 2, a pin aligning device 96 is provided on a rope conveyance path along which the vertical rope A is conveyed horizontally. As illustrated in FIG. 19, the pin aligning device 96 includes a bottom surface 96*a* and two side walls 96*b*, 96*c*. As illustrated in FIG. 19, FIG. 20A, and FIG. 20B, a flat plate 93 is placed on a tray 92 in the pin aligning device 96. An upper surface of the flat plate 93 is smooth. When the vertical rope A is moved on the upper surface in a direction indicated by the arrow of FIG. 19, the rope locking protrusions I and the shellfish locking protrusions H are moved together while directed downward. A thickness of the tray 92 may be increased without providing the flat plate 93, and a surface of the tray 92 may be a smooth surface on which the vertical rope A, and the shellfish locking protrusions H and the rope locking protrusions I of the pin B are easily slid.

[Rope Conveying Mechanism]

Figure 21A:
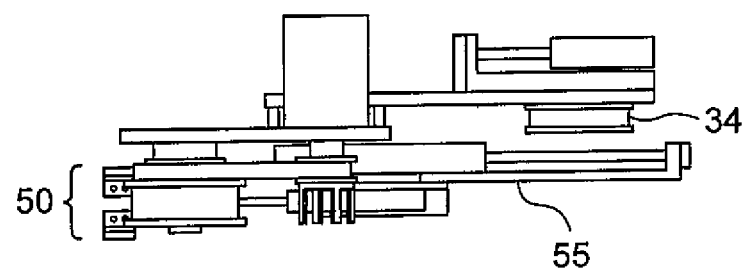
FIG. 21A is a plan view for illustrating a mechanism for conveying the vertical rope.
Figure 21B:
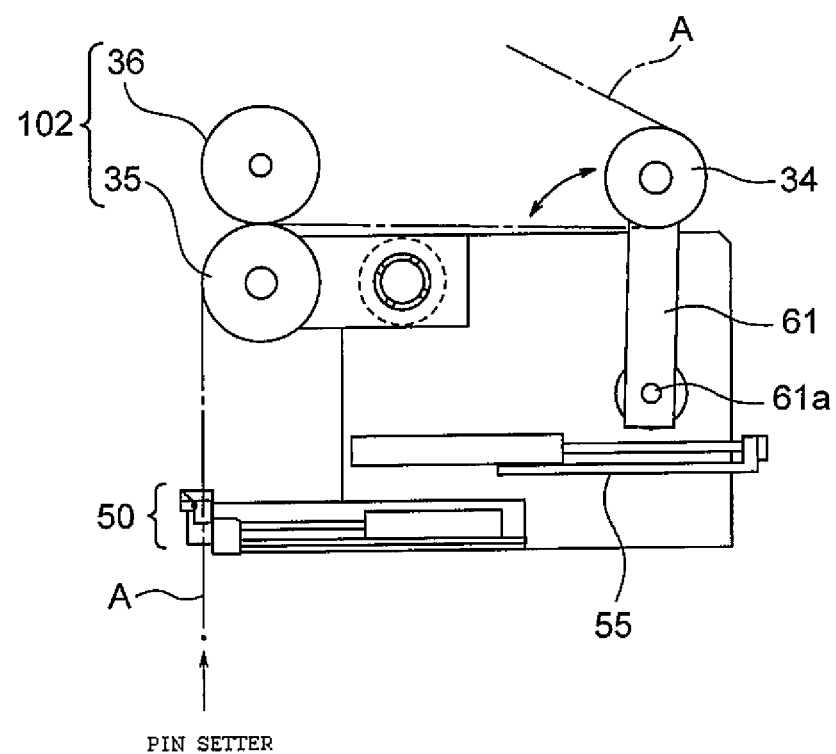
FIG. 21B is a side view of FIG. 21A.

The rope conveying mechanism 102 (FIG. 1 and FIG. 21B) is configured to convey, toward the merging line Z (FIG. 1), the vertical rope A having the pins B inserted therein. As illustrated in FIG. 1, FIG. 21A, and FIG. 21B, the rope conveying mechanism 102 includes a tension roller 34 configured to adjust tension of the vertical rope A, a driving roller 35 provided on the forward side of the tension roller 34 and configured to support the vertical rope A, and a retaining roller 36 arranged above the driving roller 35. The tension roller 34 is provided at a distal end of an arm 61. The arm 61 is mounted to a shaft 61*a* at a lower end side thereof so as to be rotatable about the shaft 61*a*. The arm 61 is moved right and left along with rotation of the arm 61. The arm 61 can be moved manually, and the tension of the vertical rope A can be adjusted by moving the arm 61 right and left. The vertical rope A, in which the pins B are inserted by the pin setter 29 (FIG. 1), is delivered to the rope conveying mechanism 102, and passes from the outer side of the tension roller 34 through a gap between the driving roller 35 and the retaining roller 36 to be delivered to the rope guide 31 side while directed vertically. Also at this time, both the rope locking protrusions I and the shellfish locking protrusions H are delivered to the merging line Z (FIG. 1) while directed downward.

Figure 15:
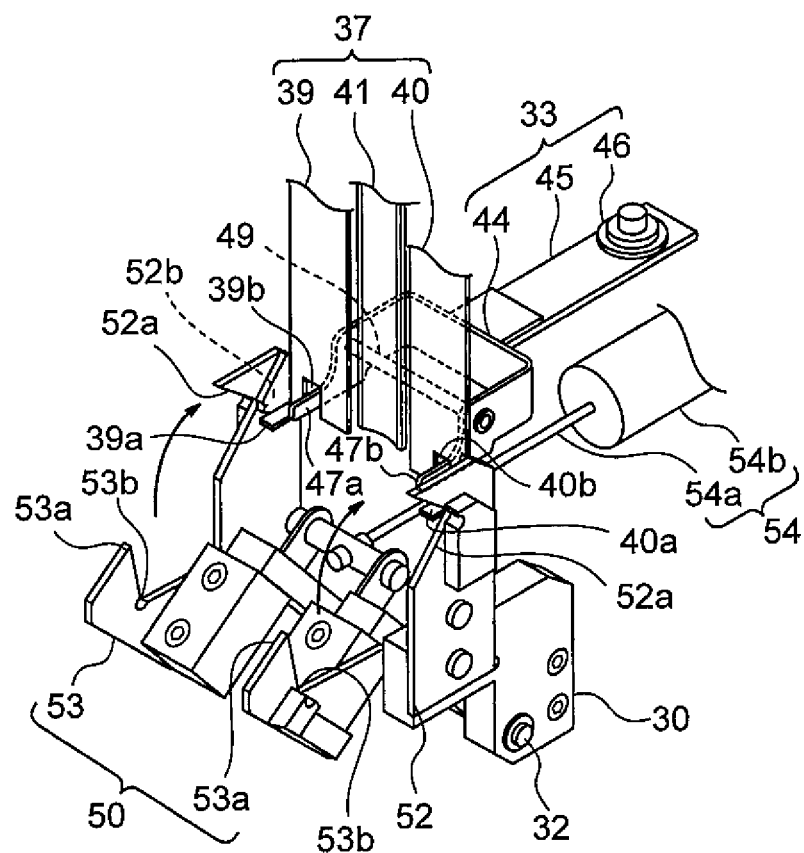
FIG. 15 is an explanatory view for illustrating a pin holding body and a mechanism for delivering a vertical rope.

The rope conveying mechanism 102 delivers the vertical rope A by the unit pitch at a time. The unit pitch described herein means an insertion distance between the pins B inserted in the vertical rope A. Specifically, the insertion distance is a distance by which, when the pin B having the shellfishes C mounted thereon is delivered, the subsequent pin B inserted in the same vertical rope A travels until the subsequent pin B reaches support claws 39a and 40a (FIG. 15).

[Rope Guide]

The rope guide 31 (FIG. 16A) is configured to guide the vertical rope A in a vertical orientation so as to prevent the vertical rope A from vibrating in a front-and-rear direction and a right-and-left direction. The rope guide 31 illustrated in FIG. 16A and FIG. 16B includes a back guide 37 provided on a back side of the vertical rope A, a front guide 38 provided on a front side of the vertical rope A, and side guides (not shown) positioned on a side of the back guide 37 and a side of the front guide 38. The back guide 37 includes two vertical plates 39 and 40 arranged at an interval, and a curved backrest 41 arranged between both the vertical plates.

Figure 16A:
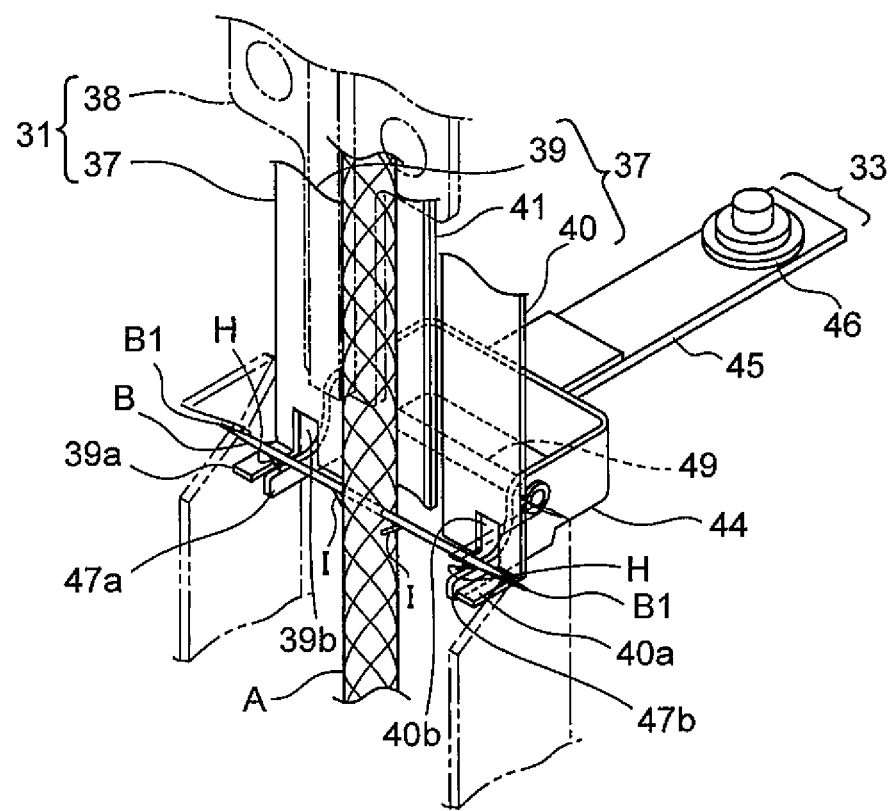
FIG. 16A is a perspective view for illustrating a mechanism for supporting the pin.
Figure 16B:
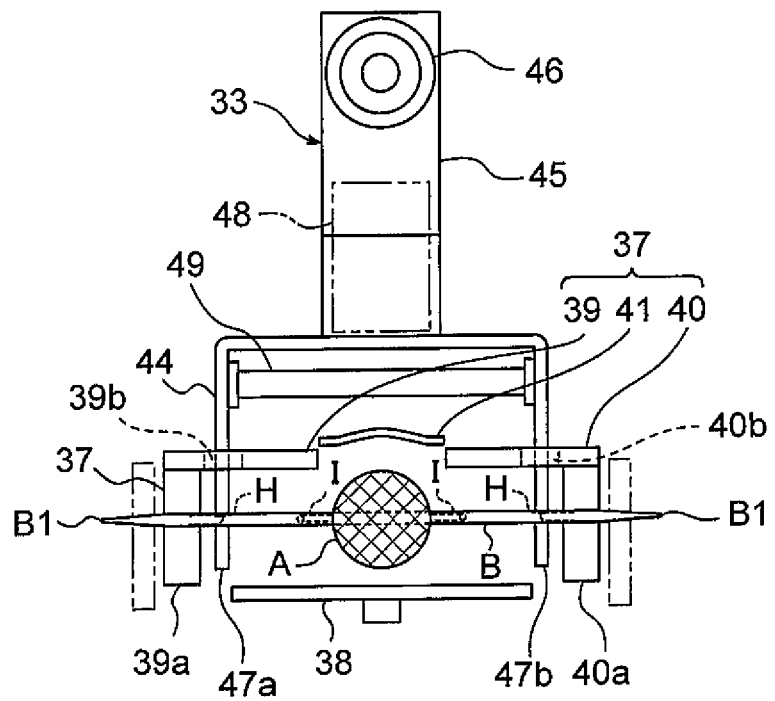
FIG. 16B is a plan view of FIG. 16A.
Figure 17A:
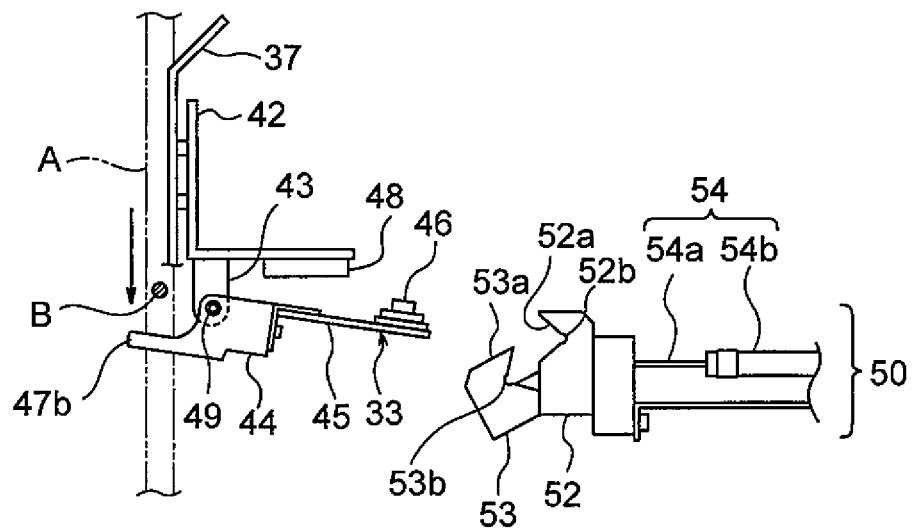
FIG. 17A to FIG. 17D are explanatory side views for illustrating a case of grasping a pin.
Figure 17B:
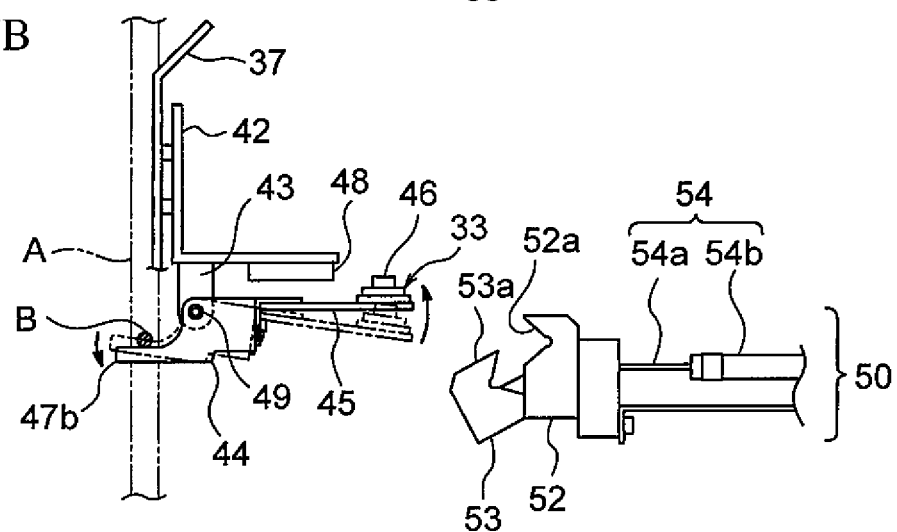
Figure 17C:
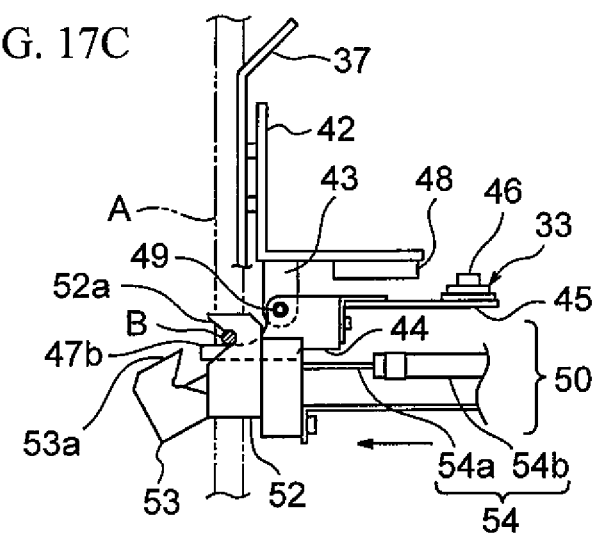

The support claws 39a and 40a capable of supporting the pin B inserted in the vertical rope A are respectively protruded forward from lower ends of the two vertical plates 39 and 40 illustrated in FIG. 16A and FIG. 16B, and are configured to support the pin B having reached the support claws 39a and 40a under a state in which the pin B is laid between and on both the support claws 39a and 40a. A mounting member 42 having an L shape in side view as illustrated in FIG. 17A to FIG. 17C is mounted to a back surface of the back guide 37. The oscillation body 33 is pivotally supported on a bracket 43 mounted to the mounting member 42.

[Oscillation Body]

The oscillation body 33 includes a movable body 44 having a substantially C shape in plan view, a balance plate 45, which is provided on the rear side of the movable body 44 and has a rectangular shape in plan view, and a weight 46 provided on a rear-side upper surface of the balance plate 45. The movable body 44 of the oscillation body 33 is pivotally supported on the bracket 43 by a shaft member 49, and front and rear portions of the balance plate 45 in a longitudinal direction seesaw about the shaft member 49. The sensor 48 is provided on a lower surface of the mounting member 42, and is configured to be able to detect that the balance plate 45 comes close to the sensor 48 within a predetermined distance.

The movable body 44 includes two detection claws 47a and 47b on the front side thereof. The detection claws 47a and 47b protrude to the front side with respect to the vertical plates 39 and 40 through cutout portions 39b and 40b formed in lower ends of the vertical plates 39 and 40. When the pin B is put on the detection claws 47a and 47b and reaches the support claws 39a and 40a, the detection claws 47a and 47b side is lowered, and the weight 46 side is raised, with the result that the balance plate 45 is brought into a horizontal state or a substantially horizontal state. When the balance plate 45 is brought into the horizontal state or the substantially horizontal state, the sensor 48 detects that the balance plate 45 comes close to the sensor 48 within the predetermined distance, that is, detects that the pin B is put on the detection claws 47a and 47b and reaches the support claws 39a and 40a. Under a state in which the pin B is not put on the detection claws 47a and 47b (state in which the pin B is not put on the support claws 39a and 40a), the rear side of the balance plate 45 is lowered, in other words, the weight 46 side is lowered, and the detection claws 47a and 47b side is raised.

[Z. Merging Line]

The merging line Z (FIG. 1) includes a pin holding body 50 (FIG. 15), which is configured to hold the pin B inserted in the vertical rope A and then deliver the pin B to the predetermined position, the elongate tubular guide 51 (FIG. 4), and the pusher 16 (FIG. 10) configured to slide the shellfish C, through which the guide 51 is inserted, along the guide 51 toward a center of the pin B.

The shellfish C is mounted to the pin B in the shellfish mounting section S4 (FIG. 1). The shellfish mounting section S4 is a region in each rotator 4 provided on the forward side of the hole forming section S3. The rotator 4 functions as the shellfish conveying unit 1 in both the shellfish preparing line X and the merging line Z.

[Pin Holding Body]

The pin holding body 50 illustrated in FIG. 15 includes a stationary holding tool 52, and a movable holding tool 53 configured to sandwich the pin B in cooperation with the stationary holding tool 52. The stationary holding tool 52 includes fitting recessed portions 52a each recessed into a doglegged shape in side view, and the movable holding tool 53 includes fitting projecting portions 53a. One part of the movable holding tool 53 is fixed to a support shaft 32 that is pivotally supported on a support block 30 so as to be rotatable. Another part of the movable holding tool 53 is connected to a rod 54a of an air cylinder 54. When the rod 54a is extended to protrude from a cylinder tube 54b, the movable holding tool 53 is rotated about the support shaft 32 in a direction of moving away from the stationary holding tool 52. When the rod 54a of the air cylinder 54 is pulled back to the cylinder tube 54b side, the movable holding tool 53 is turned about the support shaft 32 in a direction of moving close to the stationary holding tool 52.

Figure 17D:
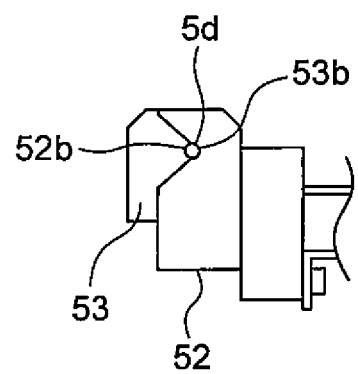

When the movable holding tool 53 is turned to the stationary holding tool 52 side, the fitting projecting portions 53a of the movable holding tool 53 are fitted into the fitting recessed portions 52a of the stationary holding tool 52, and the fitting projecting portions 53a and the fitting recessed portions 52a are opposed to each other. Thus, the pin B (FIG. 17C) is held in a circular holding space 5d (FIG. 17D) defined when each semicircular cavity 53b of the holding tool 53 and each semicircular cavity 52b of the holding tool 52 (FIG. 17A) are opposed to each other. A height of each of the fitting recessed portions 52a of the stationary holding tool 52 is equalized or substantially equalized with a height of each of the support claws 39a and 40a (FIG. 15). With this configuration, when the movable holding tool 53 is turned to the stationary holding tool 52 side and the fitting projecting portions 53a of the movable holding tool 53 are brought close to the fitting recessed portions 52a of the stationary holding tool 52, the pin B supported on the support claws 39a and 40a can be sandwiched.

Figure 18A:
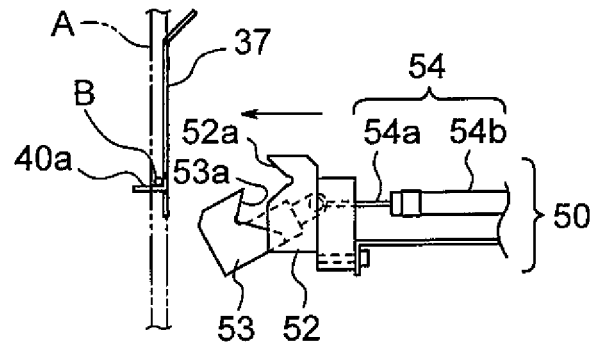
FIG. 18A to FIG. 18D are explanatory side views for illustrating a case of grasping the pin and then delivering the pin forward.
Figure 18B:
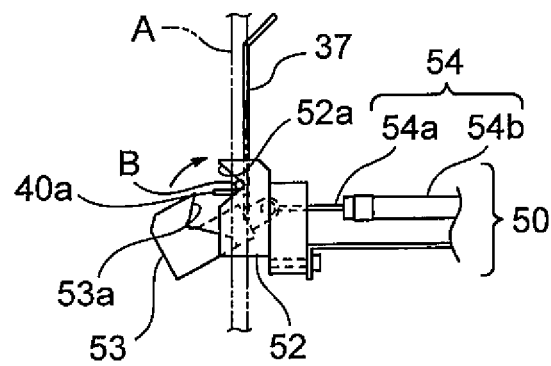

The pin holding body 50 (FIG. 15) is operated based on a detection signal of the sensor 48 (FIG. 17A). Specifically, when the sensor 48 detects that one of the pins B inserted in the vertical rope A is put on the support claws 39a and 40a, the pin holding body 50 (FIG. 18A) is advanced in a direction indicated by the arrow of FIG. 18A based on the detection signal, and then holds the pin B on the support claws 39a and 40a by the stationary holding tool 52 and the movable holding tool 53 as illustrated in FIG. 18D. The pin holding body 50 carries the pin B forward while holding the pin B, and delivers the pin B to the mounting section S4 of the merging line Z (FIG. 1).

[Adjustment of Position of Pin]

Figure 22A:
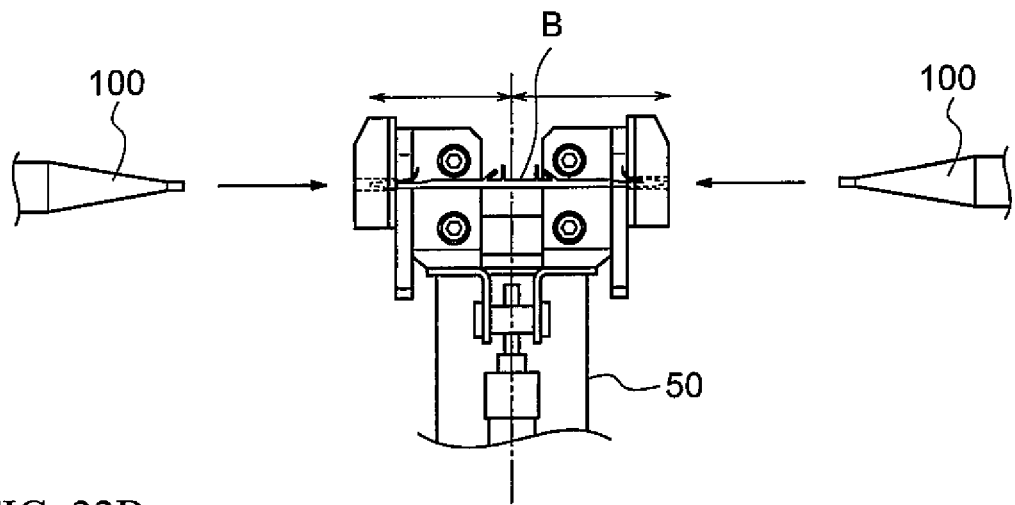
FIG. 22A to FIG. 22C are explanatory views for illustrating how to adjust a position of the pin.
Figure 22B:
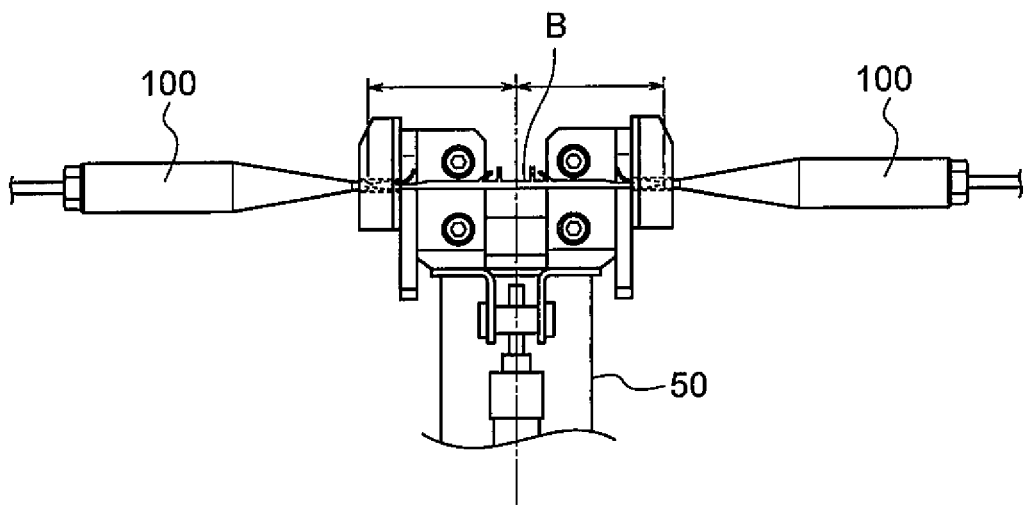
Figure 22C:
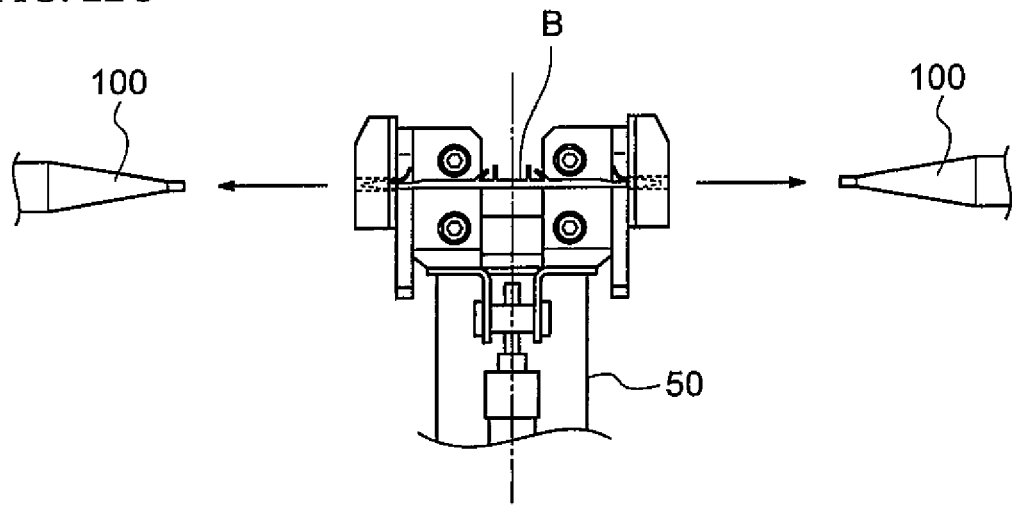

As described above, the shellfish C is mounted to each axial end of the pin B held by the pin holding body 50. Prior to mounting of the shellfish C, a position of the pin B held by the pin holding body 50 is adjusted. Pin position adjusting tools 100 (FIG. 22A to FIG. 24B) perform position adjustment. The pin position adjusting tools 100 are arranged on both right and left outer sides of the pin holding body 50 (FIG. 22A to FIG. 22C), that is, on both axial outer end sides of the pin B held by the pin holding body 50. The pin position adjusting tools 100 each have an elongate shape as illustrated in FIG. 24A, and have a recessed portion 101 (FIG. 24B) on an axial inner side thereof. An inner peripheral surface of the recessed portion 101 is formed into a surface flared axially outward. A pushing tool such as an air cylinder is coupled to an axial outer side of each of the pin position adjusting tools 100. The pushing tool can be advanced to the pin B side, and can be retreated to the opposite side. Along with the advance, the recessed portion 101 is brought into abutment against each end portion B1 of the pin B as illustrated in FIG. 23B, thereby being capable of moving the pin B in the advancing direction. At this time, as illustrated in FIG. 22A, the pin position adjusting tools 100 arranged on both the right and left outer sides of the pin holding body 50 are pushed against both ends of the pin B held by the pin holding body 50, and as illustrated in FIG. 22B, an axial center portion of the pin B is aligned with a widthwise center portion of the pin holding body 50 (position adjustment is performed). After the position adjustment, as illustrated in FIG. 22C, the pin position adjusting tools 100 are retreated (returned) in directions of moving away from the pin B. Thus, position adjustment for a subsequent pin can be prepared.

Figure 23A:
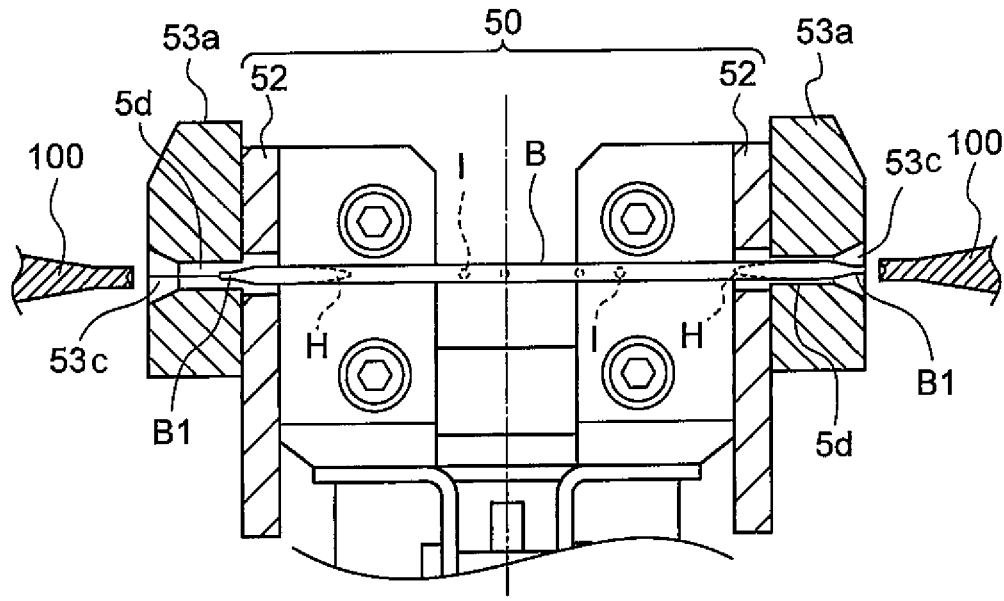
FIG. 23A and FIG. 23B are partial horizontal sectional views for illustrating adjustment of the position of the pin.
Figure 23B:
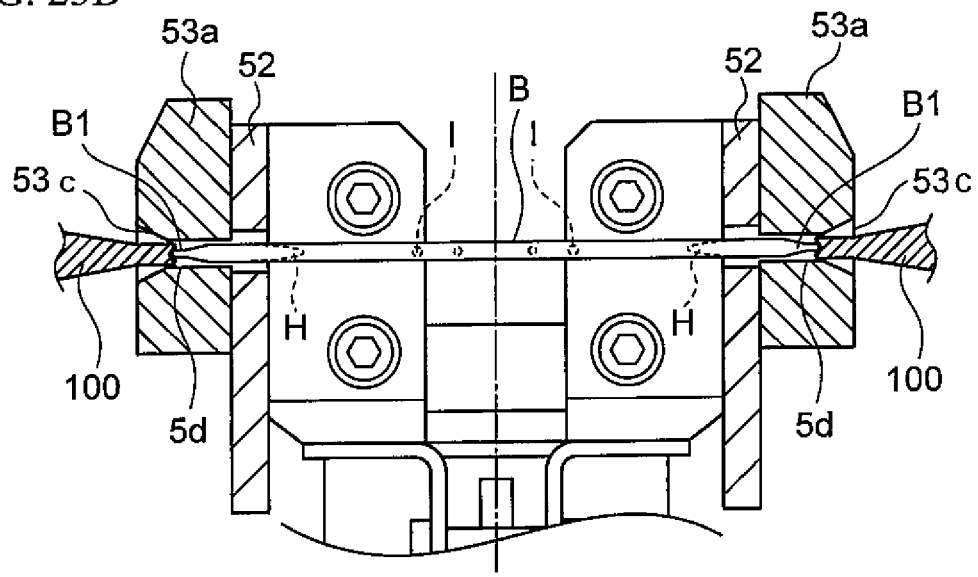
Figure 23C:
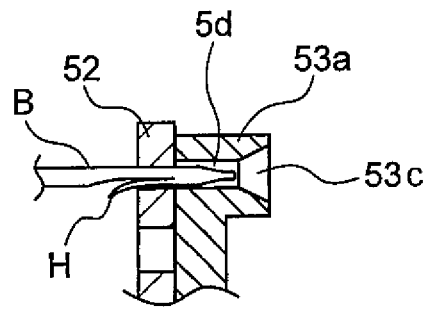
FIG. 23C is a partial vertical sectional view of FIG. 23B.

As illustrated in FIG. 23A and FIG. 23B, an insertion portion 53c flared axially outward is formed in the movable holding tool 53. The insertion portion 53c communicates to the holding space 5d (FIG. 17D and FIG. 23A to FIG. 23C). As illustrated in FIG. 22A and FIG. 22B, the insertion portion 53c is formed so as to allow the elongate tubular guide 51 to be easily put on each end portion of the pin B held in the holding space 5d.

When the pin B held by the pin holding body 50 is off-center on the right side and protrudes in the insertion portion 53c as illustrated in FIG. 23A, it is difficult to insert the elongate tubular guide 51 (FIG. 25A) from the insertion portion 53c into the holding space 5d, with the result that it is difficult to put the guide 51 on the outer periphery of the end portion of the pin B held in the holding space 5d. The position adjustment is performed for the guide 51 to be easily inserted from the insertion portion 53c into the holding space 5d so that the guide 51 is smoothly put on the outer periphery of the end portion of the pin B held in the holding space 5d. The holding space 5d has a size slightly larger than an outer diameter of a shank portion G of the pin B, for example, larger by approximately 0.1 mm. The pin B can be slid in the holding space 5d in the same direction as a direction of axially pushing the pin B. In general, the outer diameter of the shank portion G of the pin B is approximately from 1.5 mm to 1.6 mm.

[Guide]

The shellfishes C are mounted to the pin B that is subjected to the position adjustment as described above. At this time, the guides 51 (FIG. 25A) are used. Each of the guides 51 has a hollow elongate tubular shape. As illustrated in FIG. 4, the end portion 51a of the opening of each of the guides 51 is put on the outer periphery of the axial end portion B1 of the pin B. The guides 51 each have an outer diameter insertable into the insertion hole F of the shellfish C, and have an inner diameter enabling the end portion 51a of the opening to be put on the outer periphery of the tapered end portion B1 of the pin B. In general, a diameter of the shank portion G of the pin B is approximately from 1.5 mm to 1.6 mm, and a diameter of the insertion hole F of the shellfish C is approximately from 1.6 mm to 1.7 mm.

The guide 51 may be formed of various materials. It is preferred that the guide 51 be formed of SUS, in particular, hardened SUS. The hardened SUS has higher hardness than general SUS. Accordingly, even when an external force is applied in the axial direction to the guide 51 formed of the hardened SUS, the guide 51 is less likely to bend, and a difficulty in inserting the guide 51 into the insertion hole F of the shellfish C is avoided.

Figure 25A:
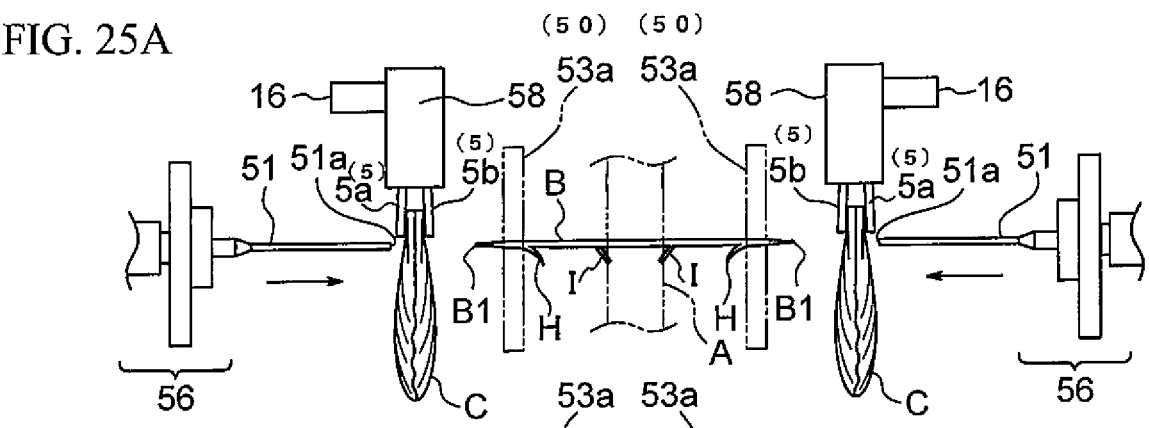
FIG. 25A to FIG. 25D are explanatory views for illustrating how to mount shellfishes to the pin.

The two guides 51 (FIG. 25A) are advanced inward and retreated outward by guide driving units 56 (FIG. 25A) that are coupled to the two guides 51, respectively. Each of the guides can be put on one end of the pin at the time of the advance, and each of the guides can be removed from one end of the pin at the time of the retreat. In FIG. 25A, each of the guides 51 is arranged to be aligned with the end portion B1 of the pin B and the insertion hole F of the shellfish C arranged on the outer side of the pin B in the longitudinal direction. A pressure sensor (not shown) is provided on each of the guides 51. Based on a pressure value measured by the pressure sensor, whether or not each of the guides 51 is reliably put on the outer periphery of the end portion B1 of the pin B can be determined.

[Sliding Mechanism]

The sliding mechanism (pusher) 16 (FIG. 10) is configured to push and slide the shellfish C along the guide 51 to the pin B side. The pusher 16 illustrated in FIG. 10 includes a pushing-out mechanism 57, a grasping piece support tool 58 provided on a distal end side of the pushing-out mechanism 57, and air cylinders 59a and 59b configured to operate the grasping piece support tool 58. The grasping piece support tool 58 includes a pair of two grasping piece support tools. One grasping piece support tool 58a is mounted to a lower end of the outer grasping piece 5a, and another grasping piece support tool 58b is mounted to a lower end of the inner grasping piece 5b. The air cylinders 59a and 59b are connected to the grasping piece support tools 58a and 58b, respectively. The grasping piece support tools 58a and 58b are slid to the pin B side by the air cylinders 59a and 59b. Along with movement of the grasping piece support tools 58a and 58b, both the grasping pieces 5a and 5b are slid in the same direction.

Figure 10:
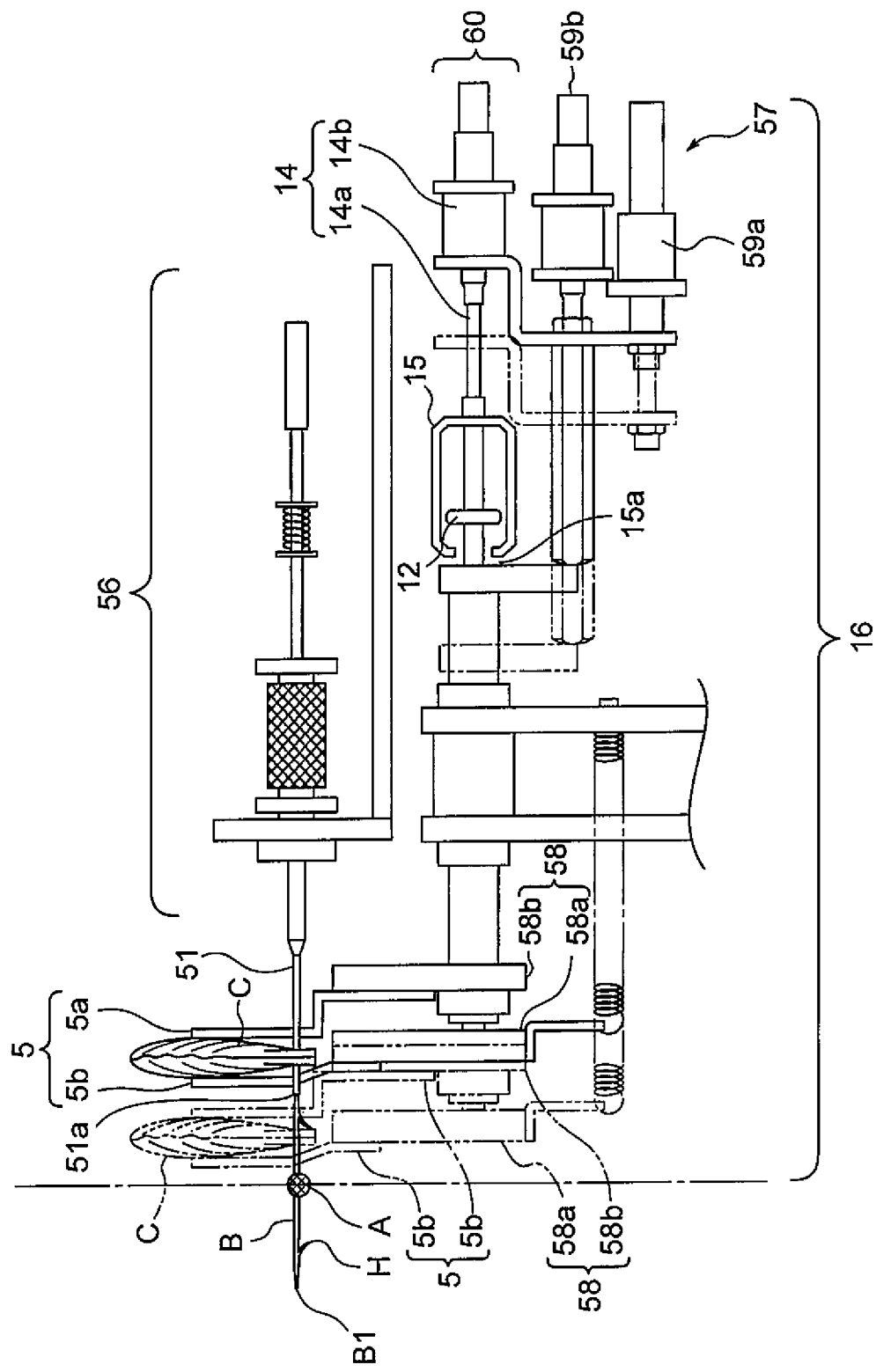
FIG. 10 is a plan view for illustrating the guide and an example of a pusher.

The shellfish C cannot be delivered to the pin B when the shellfish C remains grasped by the grasping pieces 5a and 5b of the shellfish grasping body 5 (FIG. 10). Accordingly, it is necessary to cancel grasping of the shellfish C by the grasping pieces 5a and 5b. In the first embodiment, a third pulling mechanism 60 (FIG. 10) configured to open and close the grasping pieces 5a and 5b is provided on a side of the mounting section S4 (FIG. 1), and the pulling mechanism 60 can cancel the grasping of the shellfish C by the grasping pieces 5a and 5b. The third pulling mechanism 60 has the same configuration as those of the first pulling mechanism 13 (FIG. 8) and the second pulling mechanism 24 (FIG. 8). Under a state in which the locking ring 15 (FIG. 8) of the third pulling mechanism 60 is locked to the locking flange 12 of the grasping body support unit 8, when the third pulling mechanism 60 pulls the locking flange 12 outward, the space between both the grasping pieces 5a and 5b is increased. When pulling performed by the third pulling mechanism 60 is cancelled, the space between both the grasping pieces 5*a* and 5*b* is reduced. Similarly to the first pulling mechanism 13 and the second pulling mechanism 24, the third pulling mechanism 60 is provided for shared use among all of the shellfish grasping bodies 5. Every time one of the shellfish grasping bodies 5 is shifted by the unit pitch to the pulling position along with intermittent rotation of the rotator 4 (FIG. 1), the third pulling mechanism 60 can pull the locking flange 12 (FIG. 8) for the shifted shellfish grasping body 5.

[Operations on Shellfish Preparing Line]

On the shellfish preparing line X, the insertion holes F are formed in the following procedures.

(1) Under a state in which the side support tools 21 are positioned on sides of each of the shellfish grasping bodies 5 after the moving bodies 18 are moved toward the shellfish grasping bodies 5 (state illustrated in FIG. 5B and FIG. 6B), the shellfish C is set in the shellfish grasping body 5 (FIG. 1) positioned in the shellfish setting section S1 in each of the two rotators 4. As illustrated in FIG. 4, the shellfishes C are set so that one side of the ear J of each of the shellfishes C is directed inward. Thus, one sides of the shellfishes C set in both the shellfish grasping bodies 5 are opposed to each other.

(2) When the shellfishes C are set in both the shellfish grasping bodies 5 and then the shellfishes C are grasped by the grasping pieces 5*a* and 5*b* of the shellfish grasping bodies 5, the moving bodies 18 are moved to positions (positions illustrated in FIG. 5A and FIG. 6A) at which the moving bodies 18 do not interfere with the shellfish grasping bodies 5.

(3) When the moving bodies 18 are moved away from the shellfish grasping bodies 5, the rotators 4 are rotated by the unit pitch. Along with this rotation, the shellfish grasping bodies 5 positioned in the shellfish setting section S1 are sent to the aligning section S2, and the subsequent shellfish grasping bodies 5 (positioned just before the shellfish setting section S1) are sent to the shellfish setting section S1.

(4) When the shellfishes C are sent to the aligning section S2, the moving bodies 18 are moved toward the shellfish grasping bodies 5, and the assist plates 22 (FIG. 11) provided on the moving bodies 18 are allocated to sides of the shellfish grasping bodies 5 positioned in the aligning section S2.

Figure 13A:
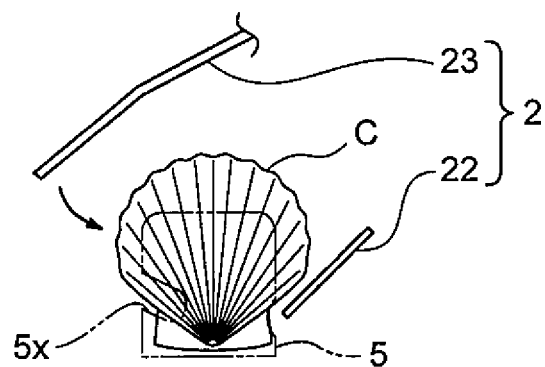
FIG. 13A to FIG. 13D are explanatory views for illustrating operations of the assist plate and the pushing tool.
Figure 13B:
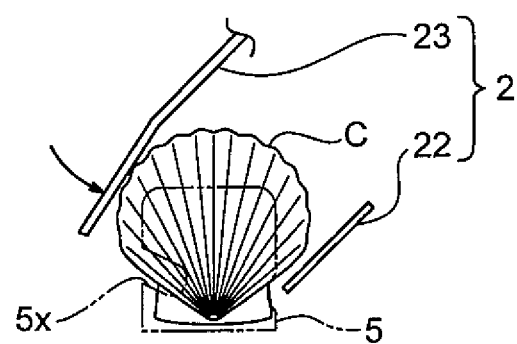
Figure 14A:
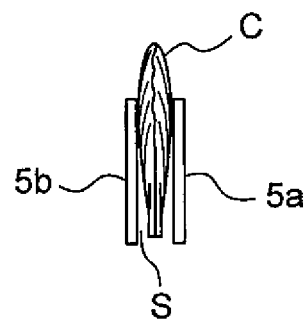
FIG. 14A to FIG. 14D are explanatory views for illustrating aligning operations.
Figure 14B:
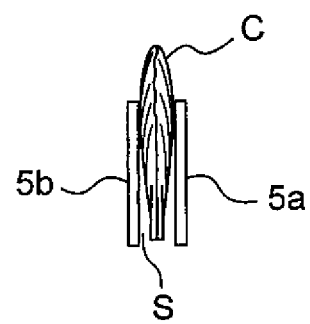

(5) When the assist plates 22 support the sides of the shellfish grasping bodies 5, the pushing tools 23 (FIG. 11) are rotated, and as illustrated in FIG. 13B and FIG. 14B, the pushing pieces 23*b* of the pushing tools 23 are allocated to opposite sides of the shellfishes C held in the shellfish grasping bodies 5 (sides opposite to the assist plates 22).

Figure 13C:
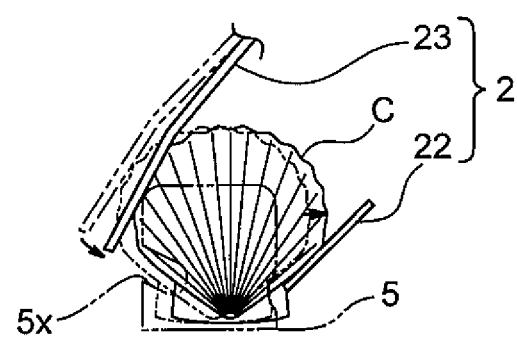
Figure 13D:
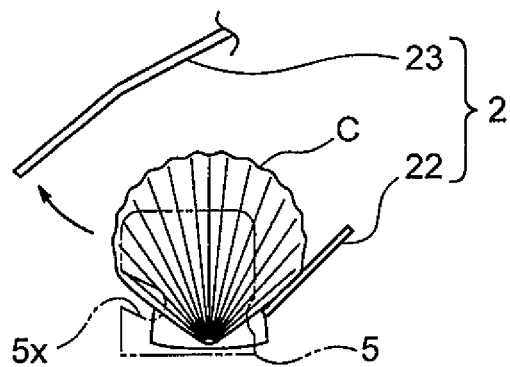
Figure 14C:
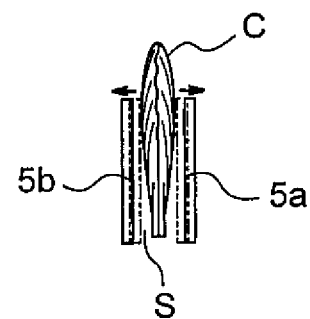
Figure 14D:
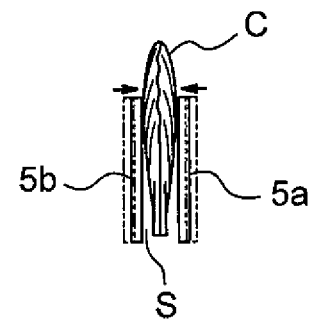

(6) Under a state described in the item (5), when the grasping pieces 5*a* and 5*b* of the shellfish grasping bodies 5 are momentarily opened to positions indicated by the imaginary lines of FIG. 13C or FIG. 14C, grasping of the shellfishes C by both the grasping pieces 5*a* and 5*b* is cancelled, and the shellfishes C pushed by the pushing tools 23 are moved to positions of abutting against the assist plates 22. Thus, the ears J of the shellfishes C are aligned to the hole forming positions. Cancel of the grasping of the shellfishes C by the grasping pieces 5*a* and 5*b* is momentarily performed. The shellfishes C are grasped at the moment when the alignment is finished.

(7) When the shellfishes C having been subjected to the alignment are grasped by the grasping pieces 5*a* and 5*b*, the pushing tools 23 (FIG. 11) are rotated and returned to the original positions.

(8) When the pushing tools 23 are returned to the original positions, the moving bodies 18 (FIG. 5A, FIG. 5B, FIG. 6A, and FIG. 6B) are moved away from the shellfish grasping bodies 5, and the rotators 4 are rotated. Along with this rotation, the shellfish grasping bodies 5 positioned in the aligning section S2 are sent to the hole forming section S3, and the shellfish grasping bodies 5 positioned in the shellfish setting section S1 are sent to the aligning section 52. Further, the subsequent shellfish grasping bodies 5 (positioned just before the shellfish setting section S1) are sent to the shellfish setting section S1.

(9) When the shellfishes C are sent to the hole forming section S3, the drill blades 25 (FIG. 7) are advanced toward the shellfishes C while rotating, and then penetrate portions of the ears J of the shellfishes C, thereby forming the insertion holes F.

(10) When the insertion holes F are formed, the drill blades 25 are returned to the original positions while rotating.

(11) When the drill blades 25 are returned to the original positions, the rotators 4 are rotated. Along with this rotation, the shellfish grasping bodies 5 positioned in the hole forming section S3 are sent to the shellfish mounting section S4 in the merging line Z, and the shellfish grasping bodies 5 positioned in the aligning section S2 are sent to the hole forming section S3. Further, the shellfish grasping bodies 5 positioned in the shellfish setting section S1 are sent to the aligning section S2, and the subsequent shellfish grasping bodies 5 (positioned just before the shellfish setting section S1) are sent to the shellfish setting section S1.

(12) The hole forming operation is performed on the shellfishes C through repetition of the above-mentioned operations.

[Operations on Pin Preparing Line]

On the pin preparing line Y, the pin B is inserted into the vertical rope A in the following procedures.

(1) In the pin setter 29 (FIG. 1), the pin B is cut out one by one from the series of pins 91 that is unwound horizontally. Every time the pin is cut out, the pin is inserted into the vertical rope A at an equal interval (encompassing a substantially equal interval) to another pin in the longitudinal direction of the vertical rope A.

(2) The tension is applied to the vertical rope A having the pins B inserted therein, and the vertical rope A is conveyed toward the rope guide 31 (FIG. 16A).

(3) As illustrated in FIG. 16A and FIG. 16B, when one of the pins B of the conveyed vertical rope A pushes down the detection claws 47*a* and 47*b* and reaches the support claws 39*a* and 40*a*, the weight 46 side of the balance plate 45 is raised (FIG. 17B and FIG. 17C).

(4) When the weight 46 side is raised, the sensor 48 (FIG. 17C) provided on the mounting member 42 detects that the balance plate 45 comes close to the sensor 48, that is, the pin B reaches the support claws 39*a* and 40*a*.

Figure 18C:
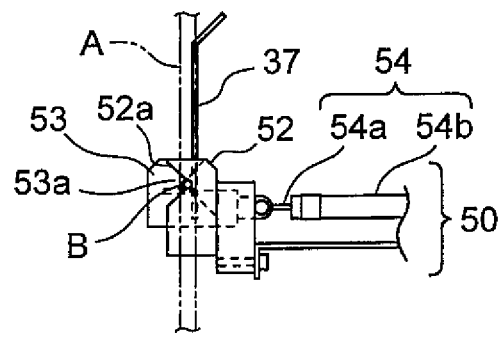
Figure 18D:
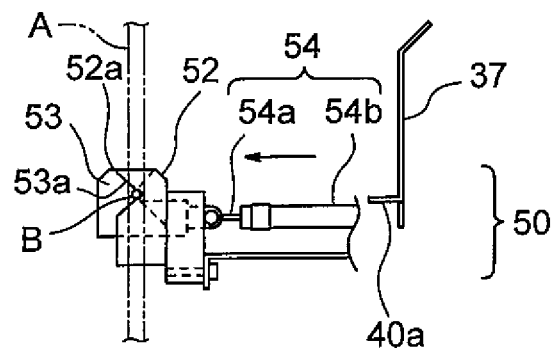

(5) When the sensor 48 detects that the balance plate 45 comes close to the sensor 48, the pin holding body 50 in the merging line Z is advanced toward the support claw 40*a* (FIG. 18C).

[Operations on Merging Line]

On the merging line Z, in the following procedures, the shellfishes C are mounted to the pin B inserted in the vertical rope A.

(1) On the pin preparing line Y, when the sensor 48 detects that the balance plate 45 comes close to the sensor 48, the pin holding body 50 (FIG. 17A and FIG. 18A) that waits on a back side of the back guide 37 is moved to a position of the pin B supported by the support claws 39*a* and 40*a*.

(2) When the pin holding body 50 is moved to the position of the pin B, the movable holding tool 53 is turned to the stationary holding tool 52 side, and the pin B is sandwiched between the fitting recessed portions 52a of the stationary holding tool 52 and the fitting projecting portions 53a of the movable holding tool 53 (FIG. 18C).

(3) When the pin B is sandwiched as described in the item (2), the pin holding body 50 is advanced to the shellfish mounting section S4, and then waits at the shellfish mounting section S4 (FIG. 18D).

(4) As illustrated in FIG. 22A to FIG. 22C and FIG. 23A to FIG. 23C, a position of the pin held by the pin holding body 50 is adjusted by the pin position adjusting tools 100.

Figure 25B:
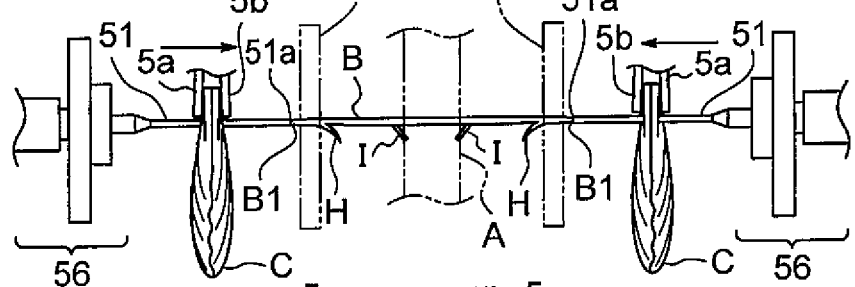

(5) When the position adjustment described in the item (4) is finished, the guides 51 are driven by the guide driving units 56 to be inserted through the insertion holes F of the shellfishes C positioned in the shellfish mounting section S4 (FIG. 25A), and the end portions 51a of the guides 51 protruded from the insertion holes F are put on the outer peripheries of both axial end portions of the pin B sent into the shellfish mounting section S4 (FIG. 1) (FIG. 25B). At this time, when the guides 51 are put inappropriately and when the guides 51 are dismounted from the pin B, an error is informed.

(6) When the guides 51 are put on the outer peripheries of both the axial end portions of the pin B, the movable holding tool 53 is turned reversely, with the result that holding of the pin B by the pin holding body 50 is cancelled.

(7) When the holding of the pin B is cancelled, the pin holding body 50 is retreated to the original position.

Figure 25C:
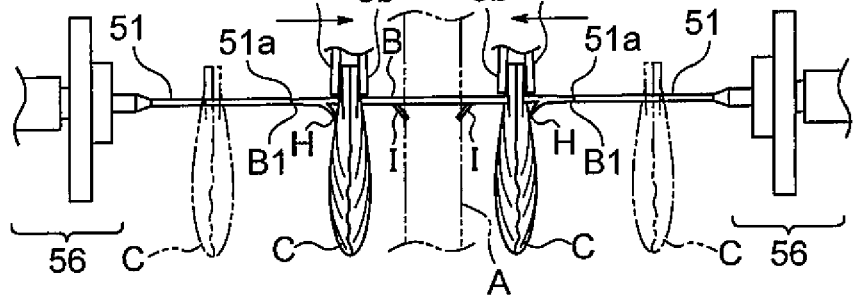

(8) When the pin holding body 50 is returned to the original position, the pushers 16 (FIG. 10) arranged on the sides of the shellfish mounting section S4 slide the shellfish grasping bodies 5, which are positioned in the shellfish mounting section S4 (FIG. 1), toward a center of the pin B (FIG. 25C), and then slide the shellfish grasping bodies 5 beyond the shellfish locking protrusions H of the pin B. Thus, the shellfishes C held by the shellfish grasping bodies 5 are moved (transferred) from the guides 51 onto the pin B.

Figure 25D:
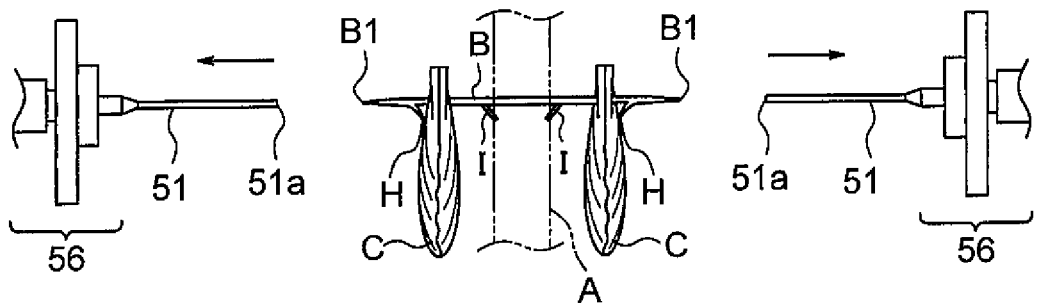

(9) When the shellfishes C are moved onto the pin B, the guides 51 are returned to the original positions, with the result that holding of the pin B by the guides 51 is cancelled (FIG. 25D). Thus, the grasping pieces 5a and 5b (FIG. 25A) of the shellfish grasping bodies 5 positioned in the shellfish mounting section S4 are opened, and grasping of the shellfishes C by the grasping pieces 5a and 5b is cancelled.

(10) When the grasping of the shellfishes C is cancelled, the vertical rope A having the shellfishes C mounted thereto is pulled out of the shellfish mounting section S4 toward the pin holding body 50 returned to the original position.

(11) After the vertical rope A is pulled out of the shellfish mounting section S4, when the vertical rope A is sent forward by the unit pitch, the subsequent pin B is supported by the support claws 39a and 40a. Thus, the operation of the pin holding body 50 is restarted.

(12) Through repetition of the operations described in the item (1) to the item (11), the shellfishes C can be automatically mounted to the plurality of pins B mounted in the vertical rope A at predetermined intervals.

Second Embodiment

A shellfish mounting method and a shellfish mounting apparatus according to another embodiment of the present application are described with reference to FIG. 26 and the drawings after FIG. 26. A basic configuration of the second embodiment is the same as that of the first embodiment. The second embodiment is different from the first embodiment in a configuration of the aligning unit 2 (FIG. 26) on the shellfish preparing line X, a configuration for holding shellfishes and provision of a chip eliminating unit in the hole forming section S3, provision of two oscillation bodies 33a and 33b (FIG. 33A and FIG. 33B), and a configuration of the rope conveying mechanism on the pin preparing line Y. In the following, description of the same matters as those of the first embodiment is omitted, and differences from the first embodiment are described.

[Aligning Unit]

The aligning unit 2 (FIG. 26) is configured to align the shellfishes to the hole forming positions, and can be used in place of the aligning unit 2 in the first embodiment. As illustrated in FIG. 27A, the aligning unit 2 includes two aligning units, that is, a near-side aligning unit and a deep-side aligning unit mounted to upper portions of both the two partition bodies 17 that are arranged at an interval in an opposed manner.

The near-side aligning unit 2 includes a stationary block 62 fixed to an upper surface of one of the partition bodies 17, and a movable block 63. A coupling shaft 64 having a round bar shape is provided on the stationary block 62. One end side (movable block 63 side) of the coupling shaft 64 passes through the movable block 63 to protrude from an end surface of the movable block 63 outward (to the near side of FIG. 27A and FIG. 27B). An L-shaped hook 65 is provided at a distal end of the coupling shaft 64 protruding outward from the end surface of the movable block 63, and one end of a coil spring 66 is fixed to the hook 65. Another end of the coil spring 66 is fixed to a fixing portion 67 provided on an outer side surface (near-side side surface in FIG. 27A and FIG. 27B) of the movable block 63.

Figure 27A:
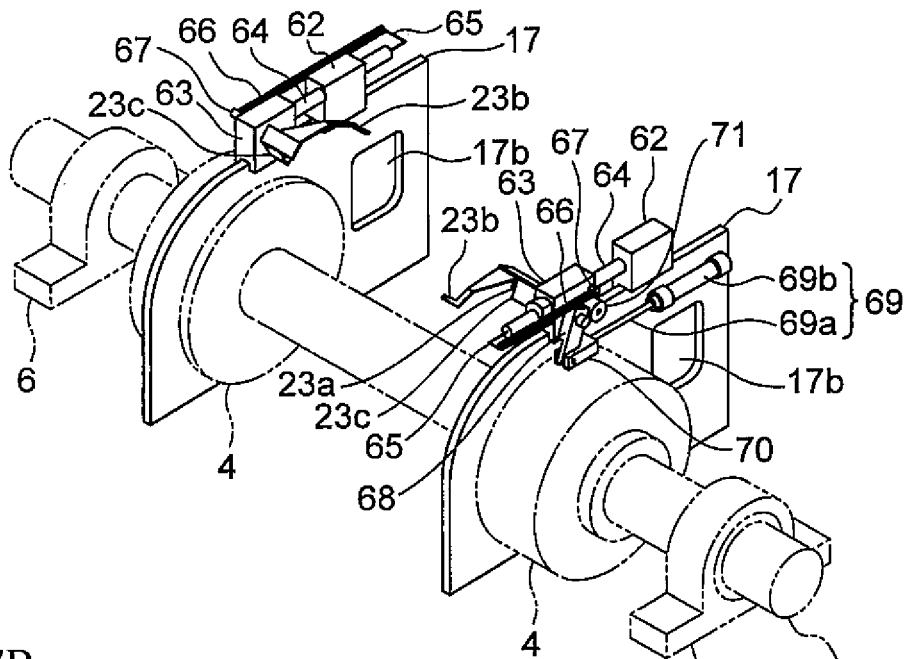
FIG. 27A is an explanatory schematic view for illustrating an aligning unit in the present invention.
Figure 27B:
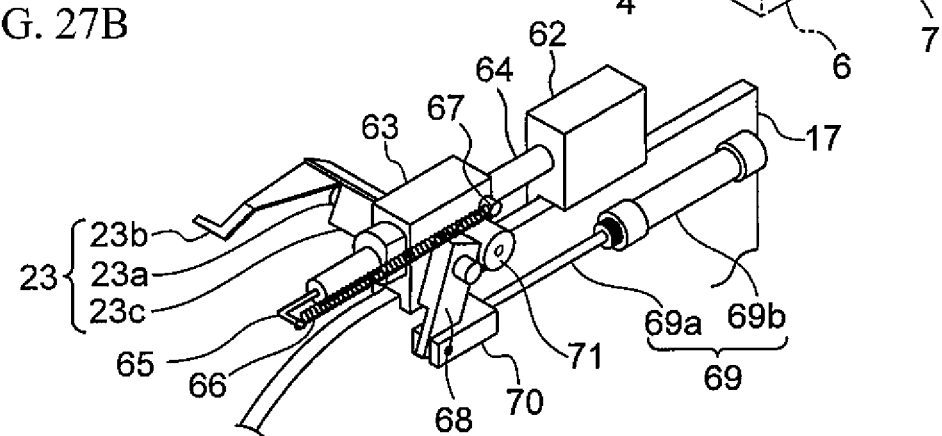
FIG. 27B is a detailed explanatory view for illustrating the near side of the drawing sheet of FIG. 27A.

As illustrated in FIG. 27A and FIG. 27B, the support shaft 23a passes through the movable block 63 in a thickness direction of the movable block 63, and the rotary block 23c is fixed to a portion of the support shaft 23a protruding to the inner side (deep side in FIG. 27A and FIG. 27B) of the movable block 63. The same pushing piece 23b as that in the first embodiment is provided on the rotary block 23c. On a portion of the support shaft 23a protruding to the outer side of the movable block 63, a turning body 68 is provided so as to be turnable. A holding body 70, which is fixed to a distal end of a rod 69a of an air cylinder 69 and has a U shape in plan view, holds a lower end side 68a of the turning body 68 so as to enable the turning body 68 to turn. The air cylinder 69 is fixed to the outer side of the partition body 17. A stopper 71 configured to restrict turning of the turning body 68 is provided on an outer side surface of the movable block 63.

Figure 27C:
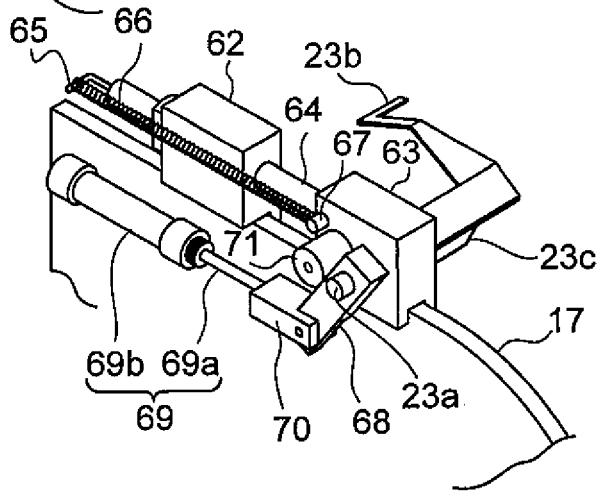
FIG. 27C is a detailed explanatory view for illustrating the deep side of the drawing sheet of FIG. 27A.

The deep-side aligning unit 2 of FIG. 27A includes the same stationary block 62 and movable block 63 as those in the near-side aligning unit 2. As illustrated in FIG. 27C, the coupling shaft 64 having a round bar shape is provided on the movable block 63. One end side (stationary block 62 side) of the coupling shaft 64 passes through the stationary block 62 to protrude from an end surface of the stationary block 62 outward (to the deep side of FIG. 27A and FIG. 27C). The L-shaped hook 65 is provided at a distal end of the coupling shaft 64 protruding outward from the end surface of the stationary block 62, and one end of the coil spring 66 is fixed to the hook 65. Another end of the coil spring 66 is fixed to the fixing portion 67 provided on an outer side surface (deep-side side surface in FIG. 27A or near-side side surface in FIG. 27C) of the movable block 63.

As illustrated in FIG. 27C, the support shaft 23a passes through the movable block 63 in the thickness direction of the movable block 63, and the rotary block 23c is fixed to a portion of the support shaft 23a protruding to the inner side (near side in FIG. 27A) of the movable block 63. The same pushing piece 23b as that in the first embodiment is provided on the rotary block 23c. On a portion of the support shaft 23a protruding to the outer side of the movable block 63, the turning body 68 is provided so as to be turnable. The holding body 70, which is fixed to a distal end of the rod 69a of the air cylinder 69 and has a U shape in plan view, holds the lower end side 68a of the turning body 68 so as to enable the turning body 68 to turn. The air cylinder 69 is fixed to the outer side of the partition body 17. The stopper 71 configured to restrict turning of the turning body 68 is provided on an outer side surface of the movable block 63. Although description is omitted, each aligning unit 2 in the second embodiment also includes the same assist plate 22 as that in the first embodiment. Further, although description is omitted, operations of the grasping pieces 5a and 5b during alignment performed by each aligning unit 2 in the second embodiment (for example, operations of cancelling grasping of the shellfish C) are performed in the same procedures as those in the first embodiment.

In each aligning unit 2 in the second embodiment, the turning body 68, the air cylinder 69, and the holding body 70 construct a rotation mechanism, and the stationary block 62, the movable block 63, the coupling shaft 64, the hook 65, the coil spring 66, the fixing portion 67, the turning body 68, the air cylinder 69, the holding body 70, and the stopper 71 construct a horizontal movement mechanism. However, the rotation mechanism or the horizontal movement mechanism may have a configuration other than the above-mentioned configuration.

Operations of the aligning unit 2 illustrated in FIG. 27A and FIG. 27B (near-side aligning unit 2 illustrated in FIG. 27A) are described with reference to FIG. 28A to FIG. 28D, and operations of the aligning unit 2 illustrated in FIG. 27A and FIG. 27C (deep-side aligning unit 2 illustrated in FIG. 27A) are described with reference to FIG. 29A to FIG. 29D.

Figure 28A:
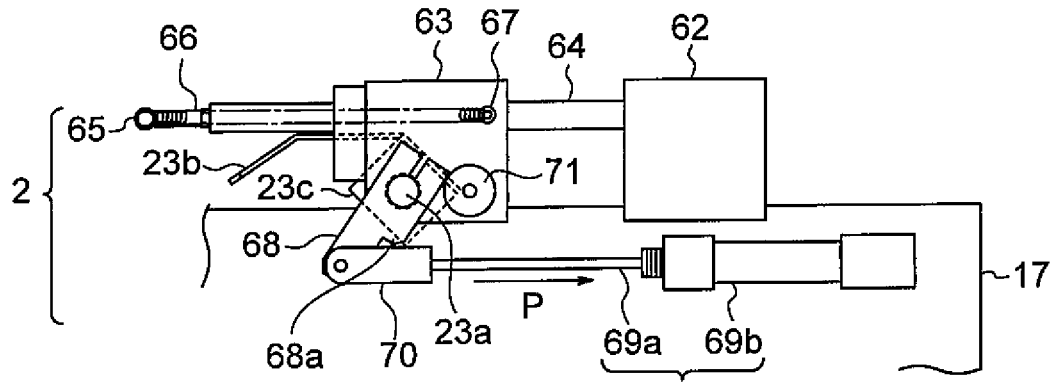
Figure 28B:
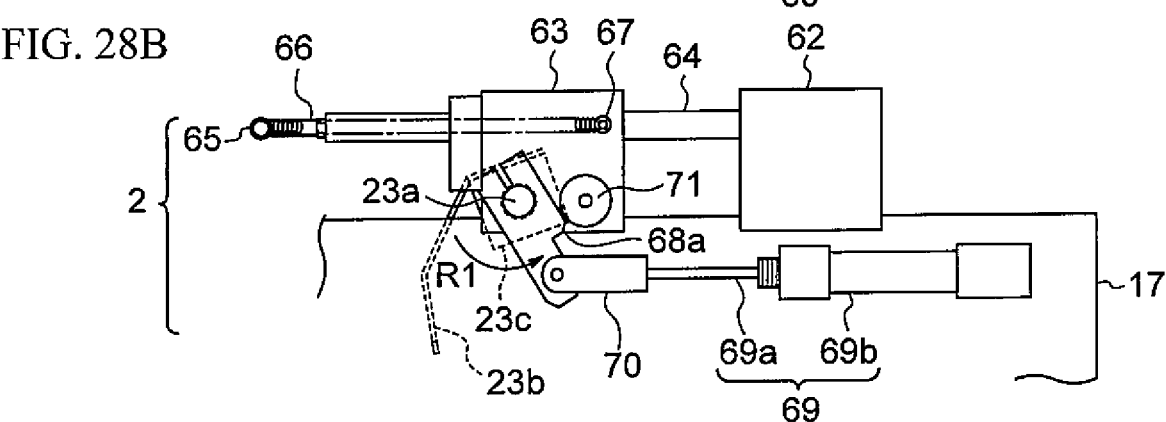
Figure 28C:
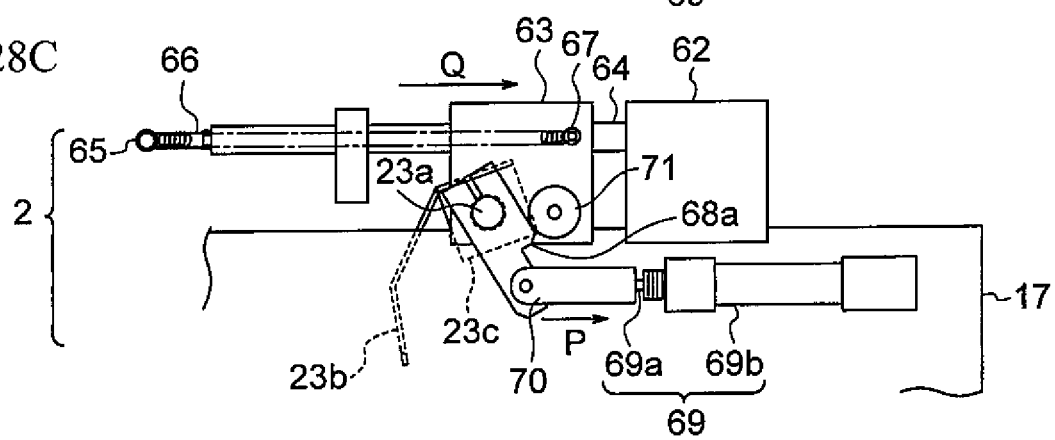
Figure 28D:
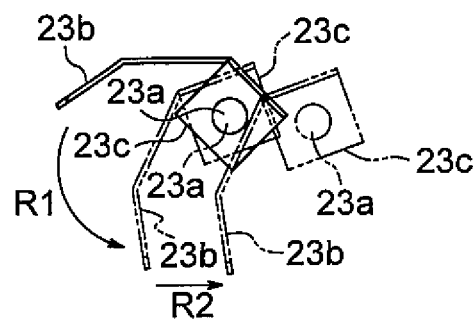

As illustrated in FIG. 28A to FIG. 28D, when the rod 69a of the air cylinder 69 is retreated into a cylinder tube 69b in a direction indicated by the arrow P of FIG. 28A from a state of being pushed out from the cylinder tube 69b, the near-side aligning unit is turned in a direction indicated by the arrow R1 of FIG. 28B until the lower end side 68a of the turning body 68 is brought into abutment against the stopper 71. Along with this turning, the support shaft 23a, the rotary block 23c, and the pushing piece 23b are rotated, and the pushing piece 23b is brought into contact with the shellfish C. Under this state, when the rod 69a of the air cylinder 69 is further retreated to the cylinder tube 69b side (in a direction indicated by the arrow P of FIG. 28C), the movable block 63 is moved horizontally in a direction indicated by the arrow Q of FIG. 28C, and the pushing piece 23b, which is rotated and brought into contact with the shellfish C, is moved horizontally while remaining in contact with the shellfish C. Owing to the horizontal movements, the shellfish C is aligned to the predetermined position.

Figure 29A:
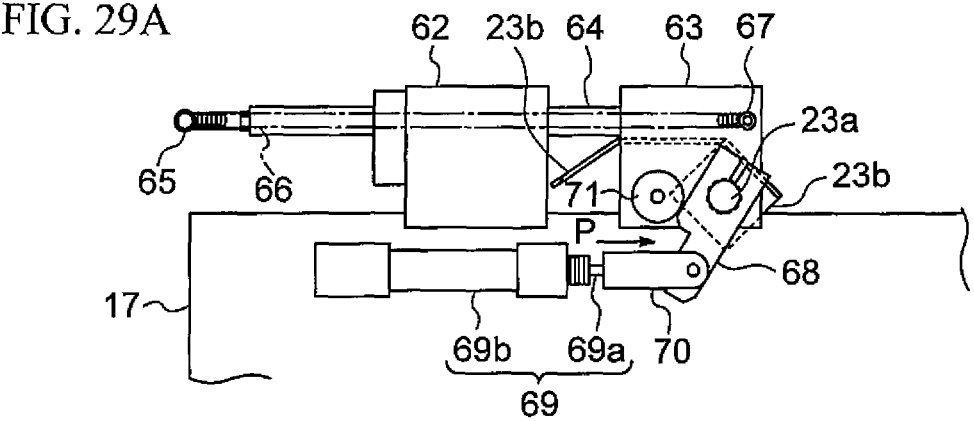
Figure 29B:
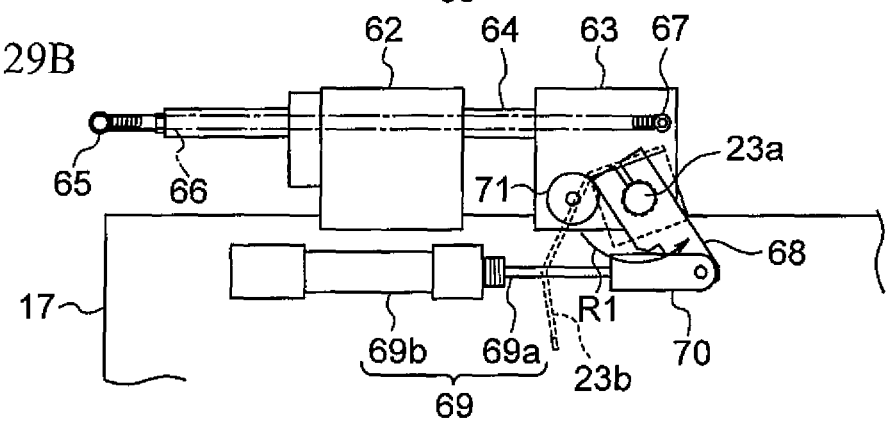
Figure 29C:
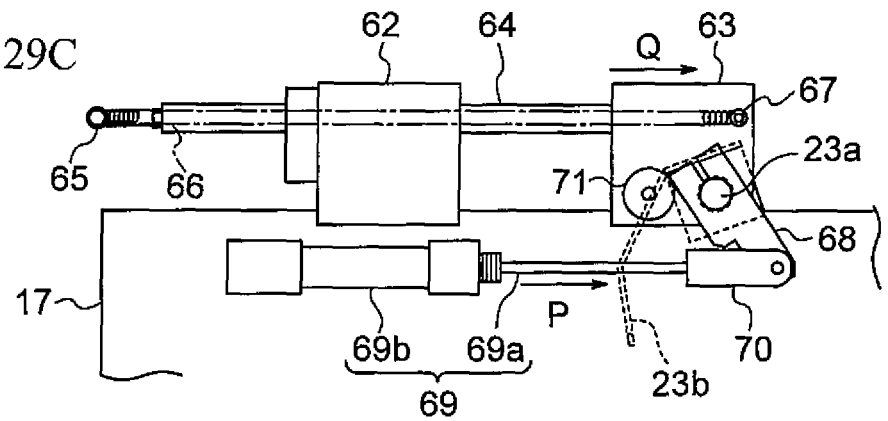
Figure 29D:
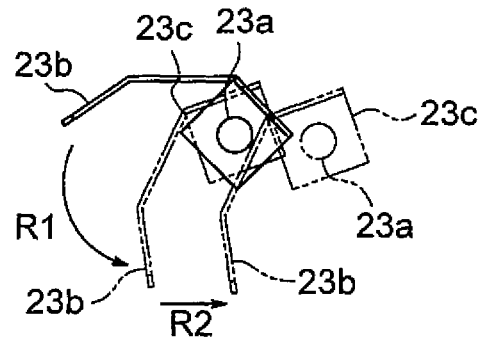

As illustrated in FIG. 29A to FIG. 29D, when the rod 69a of the air cylinder 69 is pushed out in the direction indicated by the arrow P of FIG. 29A from a state of being retreated into the cylinder tube 69b, the deep-side aligning unit is turned in the direction indicated by the arrow R1 of FIG. 29B until an upper end side 68b of the turning body 68 is brought into abutment against the stopper 71. Along with this turning, the support shaft 23a, the rotary block 23c, and the pushing piece 23b are rotated, and the pushing piece 23b is brought into contact with the shellfish C. Under this state, when the rod 69a of the air cylinder 69 is further pushed out forward (in a direction indicated by the arrow P of FIG. 29C), the movable block 63 is moved horizontally in a direction indicated by the arrow Q of FIG. 29C, and the pushing piece 23b, which is rotated and brought into contact with the shellfish C, is moved horizontally while remaining in contact with the shellfish C. Owing to the horizontal movements, the shellfish C is aligned to the predetermined position.

In addition to turning the pushing piece 23b to cause the pushing piece 23b to push the side of the shellfish C, by moving horizontally or substantially horizontally the pushing piece 23b that is turned and brought into contact with the side of the shellfish C, there is prevented a problem that may arise in a case of only turning the pushing piece 23b, specifically, such a problem that the shellfish C is pushed up and inclined by the pushing piece 23b in the turning direction. Thus, accurate alignment can be performed.

[Structure for Holding Shellfish]

Figure 30A:
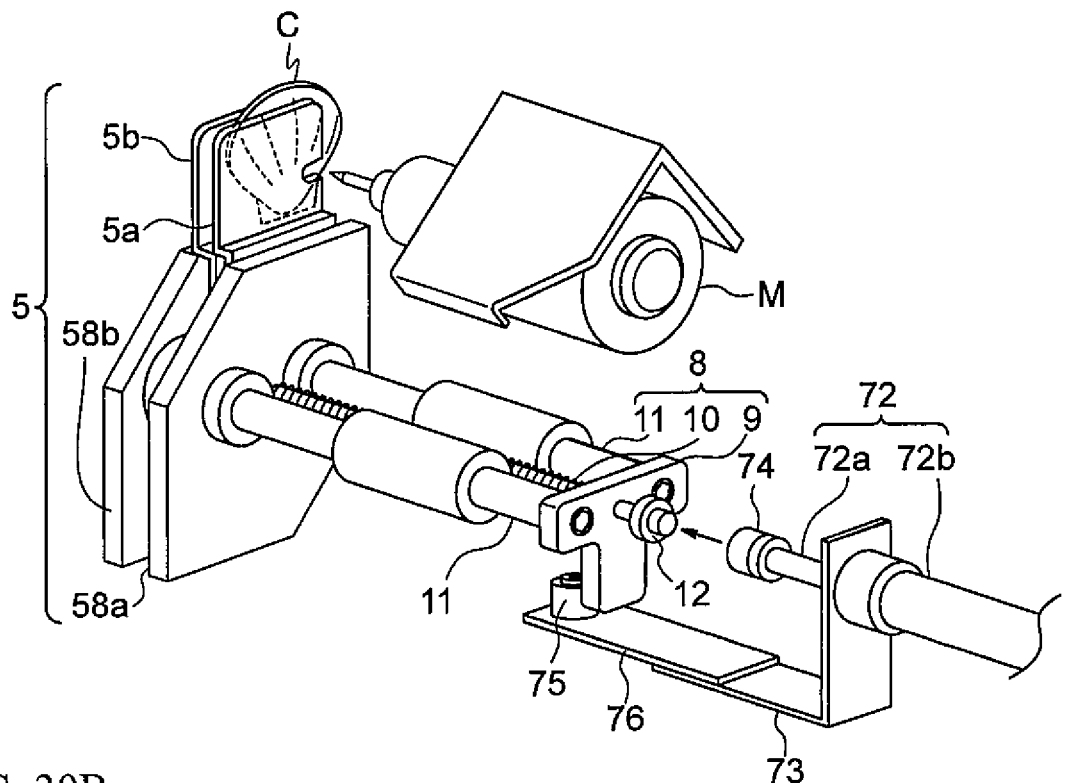
Figure 30B:
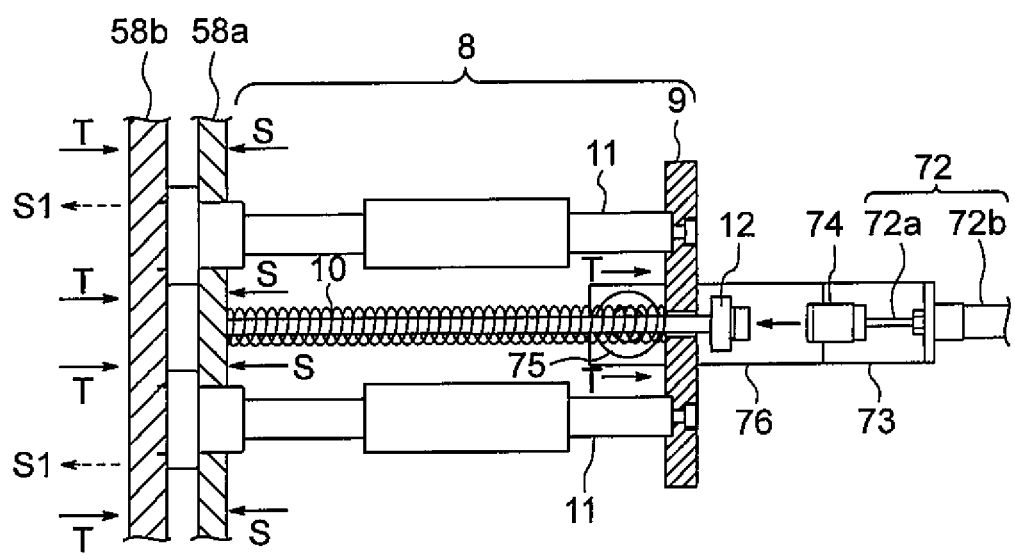

The structure for holding the shellfish in the hole forming section S3 in the second embodiment (FIG. 30A, FIG. 30B, FIG. 31A, and FIG. 31B) can be used by being added to the structure for holding the shellfish C in the first embodiment. FIG. 30A and FIG. 30B are explanatory schematic views for illustrating the hole forming section S3. On the inner side of the rotator 4 (not shown in FIG. 30A and FIG. 30B), the shellfish grasping body 5 holding the shellfish C, and the grasping piece support tools 58a and 58b configured to support the grasping pieces 5a and 5b of the shellfish grasping body 5 are arranged. One grasping piece support tool 58a is coupled to distal end sides of the two push bars 11 of the grasping body support unit 8 provided on the outer side of the rotator 4. Another grasping piece support tool 58b is coupled to a distal end side of the support bar 10 of the grasping body support unit 8. Another ends of the two push bars 11 are fixed to the base 9 having a T-shape. When an inward force is applied to the base 9, the push bars 11 are moved inward. Another end side of the support bar 10 protrudes outward from an outer surface of the base 9 through the base 9, and the locking flange 12 is provided on the protruding portion of the support bar 10.

Figure 31A:
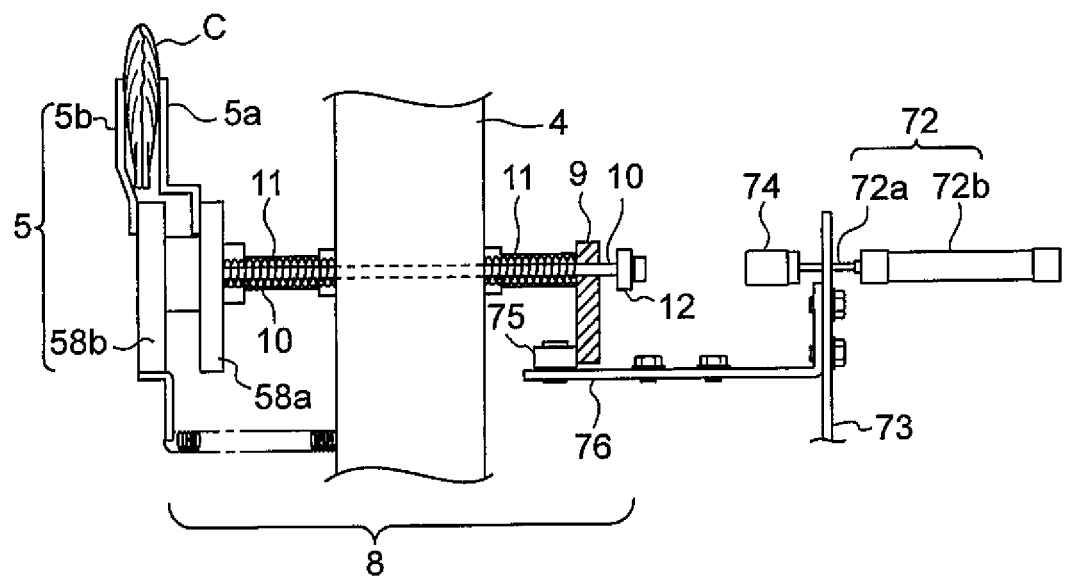
FIG. 31A is an explanatory view for illustrating a state before a pushing tool head pushes a support bar.
Figure 31B:
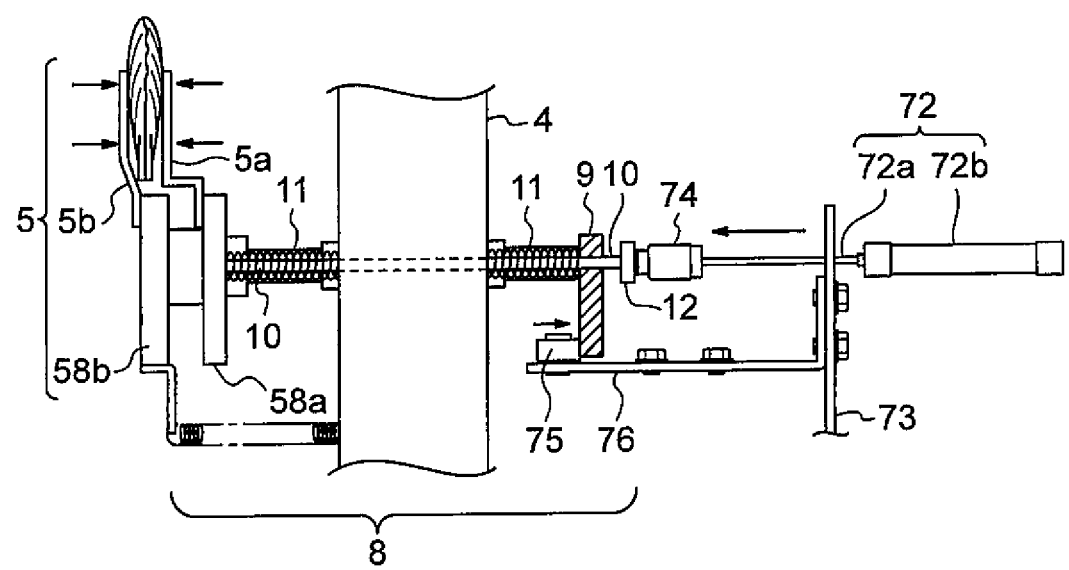
FIG. 31B is an explanatory view for illustrating a state in which the pushing tool head pushes the support bar and applies a force to the shellfish grasping body in a direction of pressing the shellfish.

As illustrated in FIG. 30A, FIG. 30B, FIG. 31A, and FIG. 31B, in the second embodiment, an air cylinder 72 is provided on an extension line of the support bar 10. The air cylinder 72 is fixed to a bracket 73. A pushing tool head 74 formed of a resin is provided at a distal end of a rod 72a of the air cylinder 72. The rod 72a of the air cylinder 72 protrudes from a cylinder tube 72b, and thus, as illustrated in FIG. 31B, the pushing tool head 74 can press the distal end of the support bar 10. A regulating roller 75 configured to prevent the base 9 from moving inward is provided between the base 9 and the rotator 4. The regulating roller 75 is pivotally supported on another bracket 76, which is coupled to the bracket 73, so as to be rotatable.

When the pushing tool head 74 provided at the distal end of the air cylinder 72 presses the grasping piece support tool 58b inward, the pressing force pushes the grasping piece 5a inward (in a direction indicated by the arrows S of FIG. 30B). At this time, along with the pushing of the grasping piece 5a, the grasping piece 5b and the shellfish C supported by the grasping piece 5a are pushed inward (in a direction indicated by the arrows S1 of FIG. 30B). However, from the inner side, the regulating roller 75 retains the two push bars 11 coupled to the grasping piece support tool 58b, and the grasping piece support tool 58b configured to support the grasping piece 5b, and retains the base 9 to which the two push bars 11 are fixed, with the result that a force is applied to the grasping piece 5b and the grasping piece support tool 58b supporting the grasping piece 5b in an outward direction (direction indicated by the arrows T of FIG. 30B). Consequently, the force is applied to move the grasping pieces 5*a* and 5*b* close to each other, thereby firmly grasping the shellfish C. Thus, even when a rotating force and the pressing force of the drill blade 25 are applied to the shellfish C, the shellfish C is not inclined, and a hole can be formed accurately.

[Chip Eliminating Unit]

A chip eliminating unit in the second embodiment (FIG. 32A and FIG. 32B) can be used by being added to the hole forming section S3 in the first embodiment. The chip eliminating unit is configured to suck and eliminate chips generated when the insertion hole is formed in the ear of each shellfish by the drill blade. Through elimination of the chips, it is possible to prevent a failure of hole formation due to the chips adhering to the drill blade, malfunction of the motor M configured to rotate the drill blade, a failure of pin insertion due to the chips remaining on the shellfish, and the like.

The chip eliminating unit in the second embodiment includes a discharge passage 77 obtained by coupling square pipes together, a discharge hose 78 coupled to a forward side of the discharge passage 77, and a suction unit (suction fan in the example illustrated in FIG. 32B) 79 coupled to a distal end of the discharge hose 78. Two intake ports 80, through which the chips are to be taken in, are formed on an upper end side of the discharge passage 77. In the second embodiment, the intake ports 80 of the discharge passage 77 are arranged between the two partition bodies 17 so as to be opposed to the through-holes 17*b* formed in the partition bodies 17.

Figure 32A:
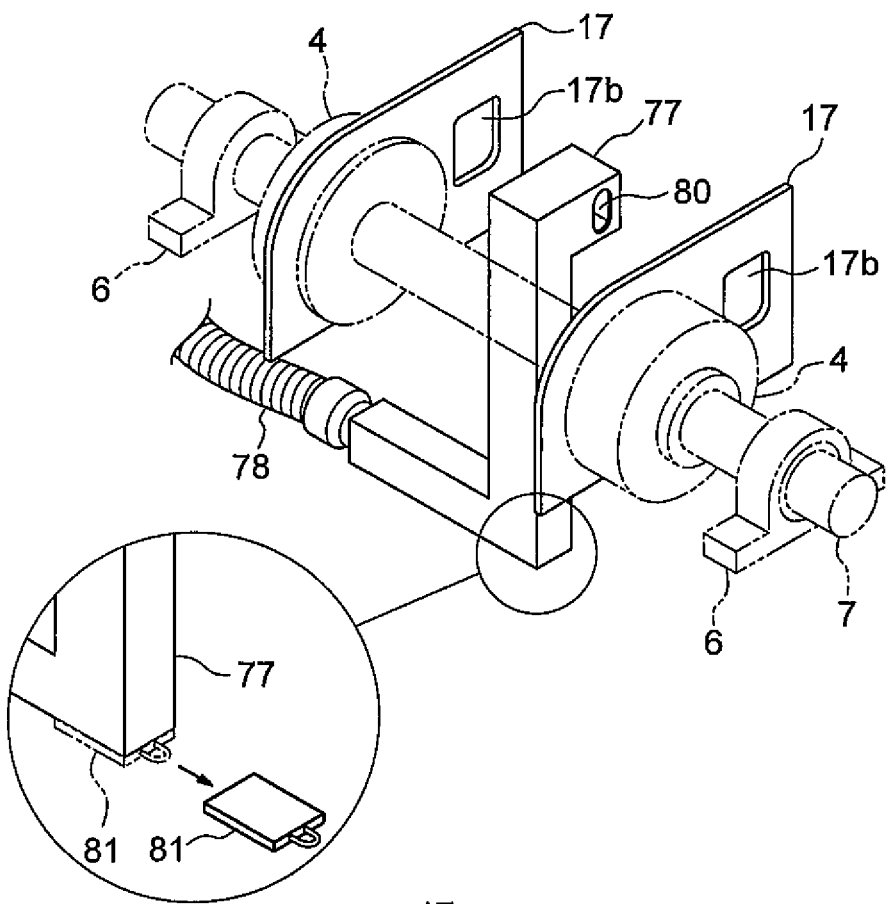
FIG. 32A is a perspective view for illustrating a front side of a chip eliminating unit.

The discharge passage 77 in the second embodiment may include a cover 81 as illustrated in FIG. 32A. When the cover 81 is provided, the chips in the discharge passage 77 can be eliminated by washing away the chips with water under a state in which the cover 81 is dismounted during washing. The discharge passage 77 may have a shape and a configuration other than the shape and the configuration described above as long as the discharge passage 77 can take in the chips and send the chips to the discharge hose 78 side coupled to the forward side of the discharge passage 77. It is preferred that the discharge passage 77 have a shape allowing the chips to pass without accumulating.

It is preferred that the discharge hose 78 coupled to the discharge passage 77 be also formed of a washable material similarly to the discharge passage 77. Any one of the discharge passage 77 and the discharge hose 78 can be omitted. The discharge passage 77 can be omitted when the intake ports 80 are formed in the discharge hose 78. The discharge hose 78 can be omitted when the suction unit 79 is mounted to the discharge passage 77.

Figure 32B:
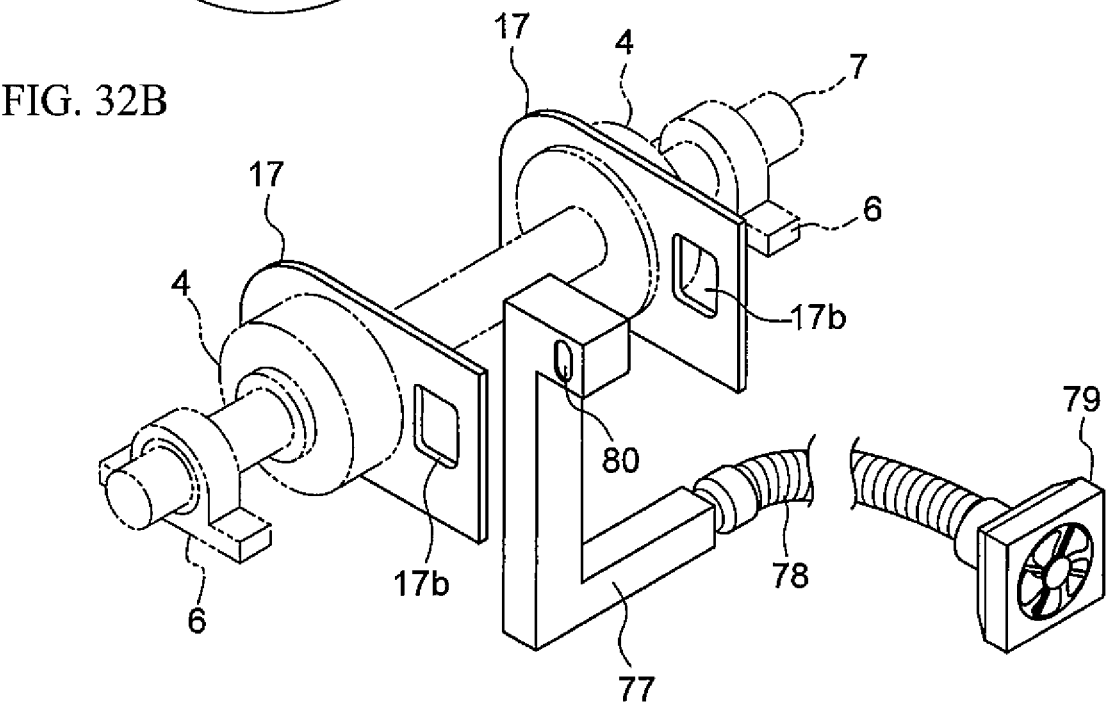
FIG. 32B is a perspective view for illustrating a back side of the chip eliminating unit.

The suction unit 79 is configured to suck the chips generated by cutting the shellfish with a cutting blade. An existing AC propeller fan can be used as the suction fan. As illustrated in FIG. 32B, the discharge hose 78 is drawn out to a back side of the apparatus, and the suction unit 79 is mounted to a distal end side of the discharge hose 78 so as to be directed outward. With this configuration, the chips can be discharged to the back side of the apparatus.

[Oscillation Bodies]

The oscillation bodies 33*a* and 33*b* in the second embodiment (FIG. 33A and FIG. 33B) can be used in place of the oscillation body 33 in the first embodiment. The oscillation bodies 33*a* and 33*b* each have the same basic configuration as that of the oscillation body 33 in the first embodiment. The second embodiment is different from the first embodiment in that the two oscillation bodies 33*a* and 33*b* are provided as the oscillation body, and that the detection claws 47*a* and 47*b* are provided for the oscillation bodies 33*a* and 33*b*, respectively. The right and left detection claws 47*a* and 47*b* are operated independently of each other, thereby being capable of performing detection with higher accuracy than the case of the first embodiment.

The oscillation body 33*a* includes a balance plate 45*a* including an upright portion 82*a* on a front side thereof, the detection claw 47*a* provided on a front surface side of the balance plate 45*a*, and a weight 46*a* provided on a rear-side upper surface of the balance plate 45*a*. The oscillation body 33*b* includes a balance plate 45*b* including an upright portion 82*b* on a front side thereof, the detection claw 47*b* provided on a front surface side of the balance plate 45*b*, and a weight 46*b* provided on a rear-side upper surface of the balance plate 45*b*. The detection claw 47*a* is pivotally supported by a shaft member 49*a* provided in a bracket 43*a* protruded to the lower surface side of the mounting member 42, and front and rear portions of the balance plate 45*a* in a longitudinal direction seesaw about the shaft member 49*a*. The detection claw 47*b* is pivotally supported by a shaft member 49*b* provided in a bracket 43*b* protruded to the lower surface side of the mounting member 42, and front and rear portions of the balance plate 45*b* in the longitudinal direction seesaw about the shaft member 49*b*. A sensor 48*a* similar to the sensor in the first embodiment is provided below the balance plate 45*a* on the weight 46*a* side. A sensor 48*b* similar to the sensor in the first embodiment is provided below the balance plate 45*b* on the weight 46*b* side.

The detection claws 47*a* and 47*b* protrude to the front side with respect to the vertical plates 39 and 40 through the cutout portions 39*b* and 40*b* formed in the lower ends of the vertical plates 39 and 40. When the pin B is put on the detection claws 47*a* and 47*b* and reaches the support claws 39*a* and 40*a*, the detection claws 47*a* and 47*b* side is lowered, and the weights 46*a* and 46*b* side is raised, with the result that the balance plates 45*a* and 45*b* are each brought into a horizontal state or a substantially horizontal state. When the balance plate 45 is brought into the horizontal state or the substantially horizontal state, each of the sensors 48*a* and 48*b* detects that the balance plate 45 is at more than a predetermined distance from each of the sensors 48*a* and 48*b*, that is, detects that the pin B is put on the detection claws 47*a* and 47*b* and reaches the support claws 39*a* and 40*a*. Under a state in which the pin B is not put on the detection claws 47*a* and 47*b* (state in which the pin B is not put on the support claws 39*a* and 40*a*), the rear side of each of the balance plates 45*a* and 45*b* in the second embodiment is also lowered, in other words, the weight 46 side is lowered, and the detection claws 47*a* and 47*b* side is raised.

Figure 33A:
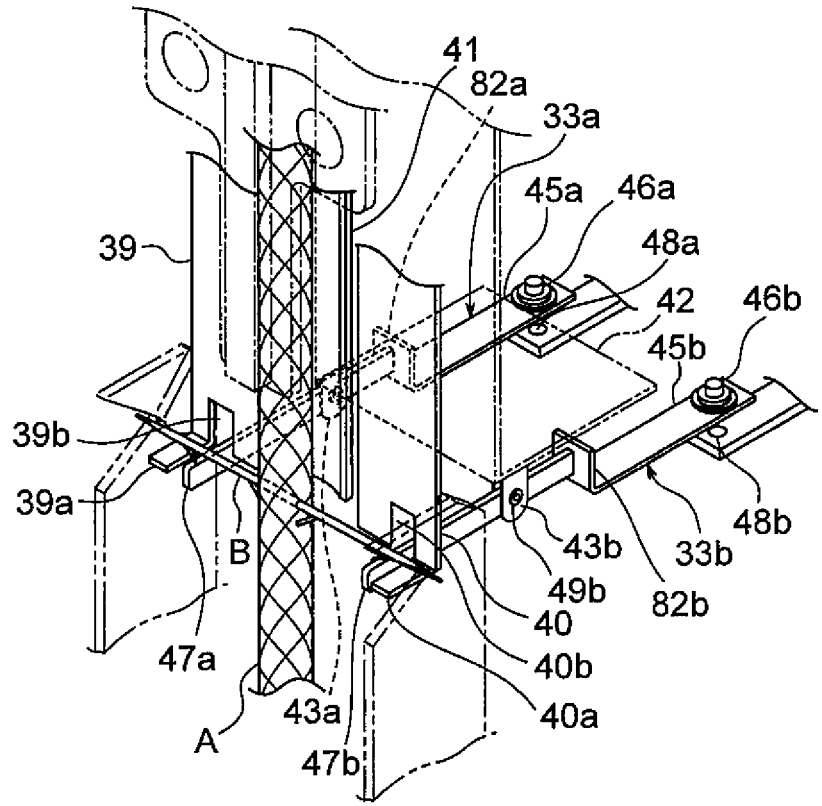
FIG. 33A is a perspective view for illustrating a pin detection device including two oscillation bodies.
Figure 33B:
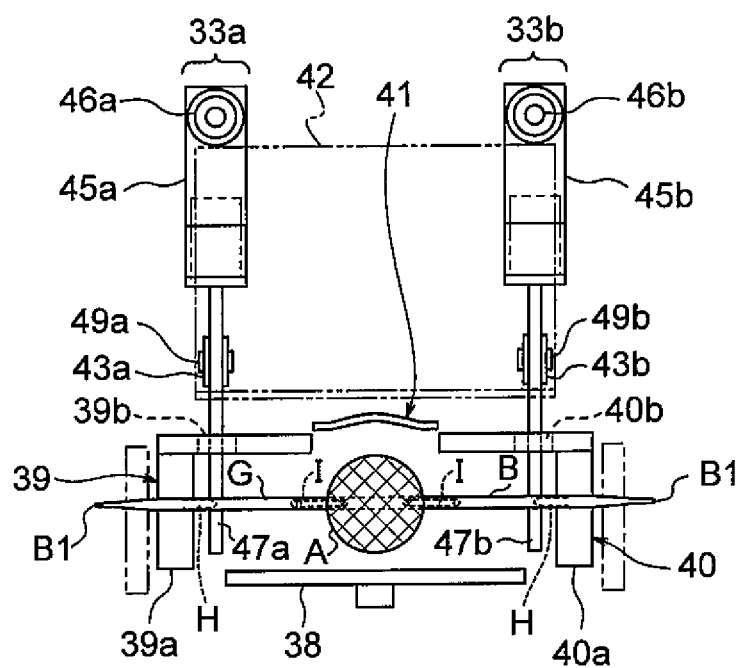
FIG. 33B is a plan view for illustrating the pin detection device.

In FIG. 33A, when not one of the sensors 48*a* and 48*b* but both of the sensors 48*a* and 48*b* detect that the balance plate 45 is at more than the predetermined distance from each of the sensors 48*a* and 48*b*, that is, detect that the pin B is put on the detection claws 47*a* and 47*b* and reaches the support claws 39*a* and 40*a*, the pin holding body 50 (FIG. 15, FIG. 17A to FIG. 17C, and FIG. 18A to FIG. 18D) is operated. The pin holding body 50 is operated in the same manner as that in the first embodiment. With the configuration of operating the pin holding body 50 based on an AND signal of both the sensors 48*a* and 48*b*, when only one of the sensors 48*a* and 48*b* issues the detection signal, it is possible to determine that the pin B is failed, that is, the pin B is inclined or misaligned forward or rearward. The apparatus can also be designed so as to stop all operations of the apparatus or to inform a failure when the failure occurs. Although not shown, similarly to the first embodiment, the sensors 48*a* and 48*b* may be provided on the upper sides of the oscillation bodies 33*a* and 33*b*.

[Rope Conveying Mechanism]

Figure 26:
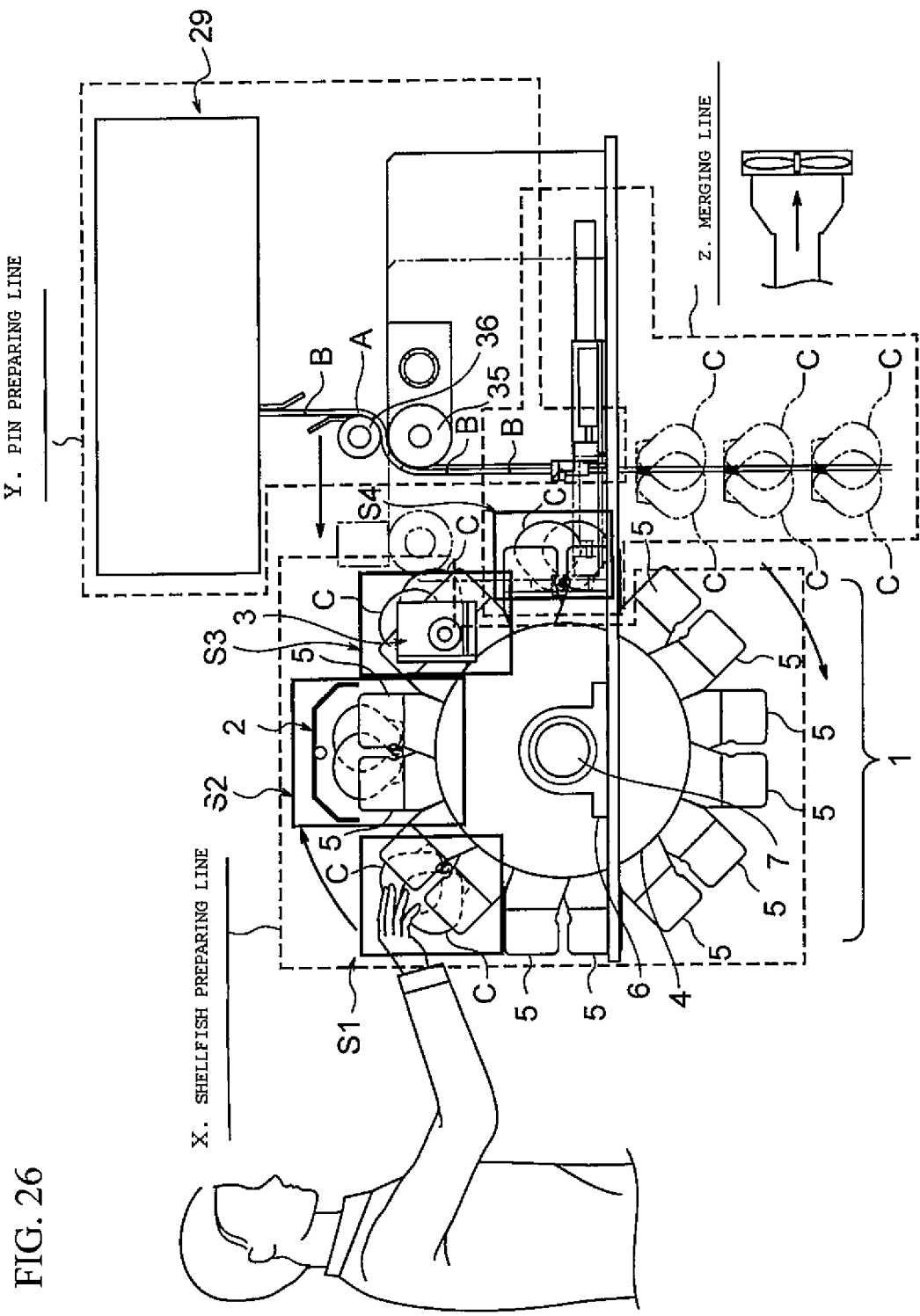
FIG. 26 is a schematic view for illustrating another example of the shellfish mounting apparatus according to the present invention.

A rope conveying mechanism on the pin preparing line Y illustrated in FIG. 26 is an improvement of the rope conveying mechanism in the first embodiment, and can be used in place of the rope conveying mechanism in the first embodiment. In the second embodiment, the tension roller 34 and the arm 61 in the first embodiment illustrated in FIG. 1 are omitted. As illustrated in FIG. 26, the vertical rope A having the pins B inserted therein is directly fed between the driving roller 35 and the retaining roller 36. The vertical rope A can be fed (led) between both the rollers 35 and 36 by a motor configured to rotate the driving roller 35. With this configuration, as compared to the case of the first embodiment, the number of the pins B to be fed into the merging line Z per unit time is increased so that the number of the shellfishes C to be mounted to the pins B is increased. Accordingly, working efficiency is improved as compared to the case of the first embodiment.

[Method and Device for Putting Pin on Support Claws]

In the present invention, in a case where the vertical rope A is lowered and the pin B inserted in the vertical rope A is put in a laid posture on the support claws 39*a* and 40*a*, when the pin is put on the support claws 39*a* and 40*a* and the vertical rope A is stopped after moving speed of the vertical rope A is reduced just before the support claws 39*a* and 40*a*, the pin B can be put under a state in which the shellfish locking protrusions H and the rope locking protrusions I of the pin B are kept directed downward. In order to achieve this, the following configuration may be adopted. Specifically, two or more position sensors are arranged at vertically shifted positions in a vicinity of a movement passage of the vertical rope and above the support claws 39*a* and 40*a*. When the moving vertical rope A is moved by a predetermined length, the upper sensor is operated to reduce the moving speed of the vertical rope A. Before or at the same time the pin is brought into contact with the support claws 39*a* and 40*a* after the vertical rope A is further moved, the lower sensor is operated to stop movement of the vertical rope A. In this case, three or more sensors may be provided, and the moving speed of the vertical rope A may be reduced in two or more steps.

[Pin Holding Body and Setting of Position of Pin]

Figure 34A:
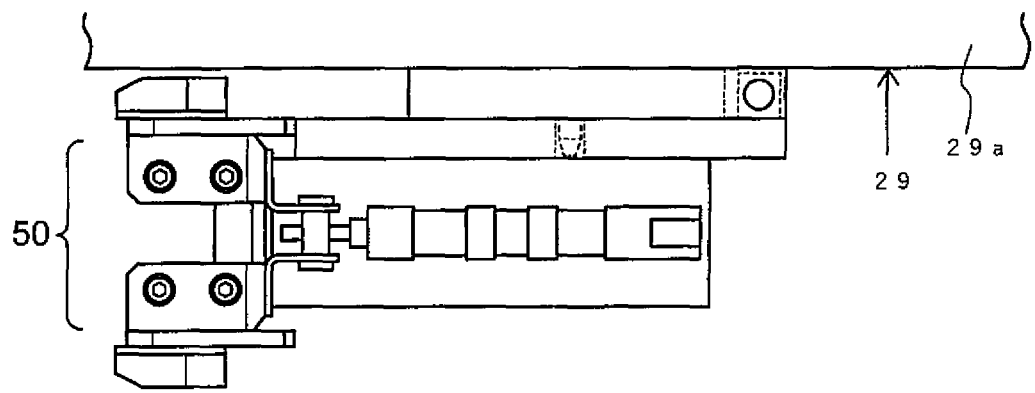
FIG. 34A is a plan view for illustrating a state in which the pin holding body is closed on a main body side.
Figure 34B:
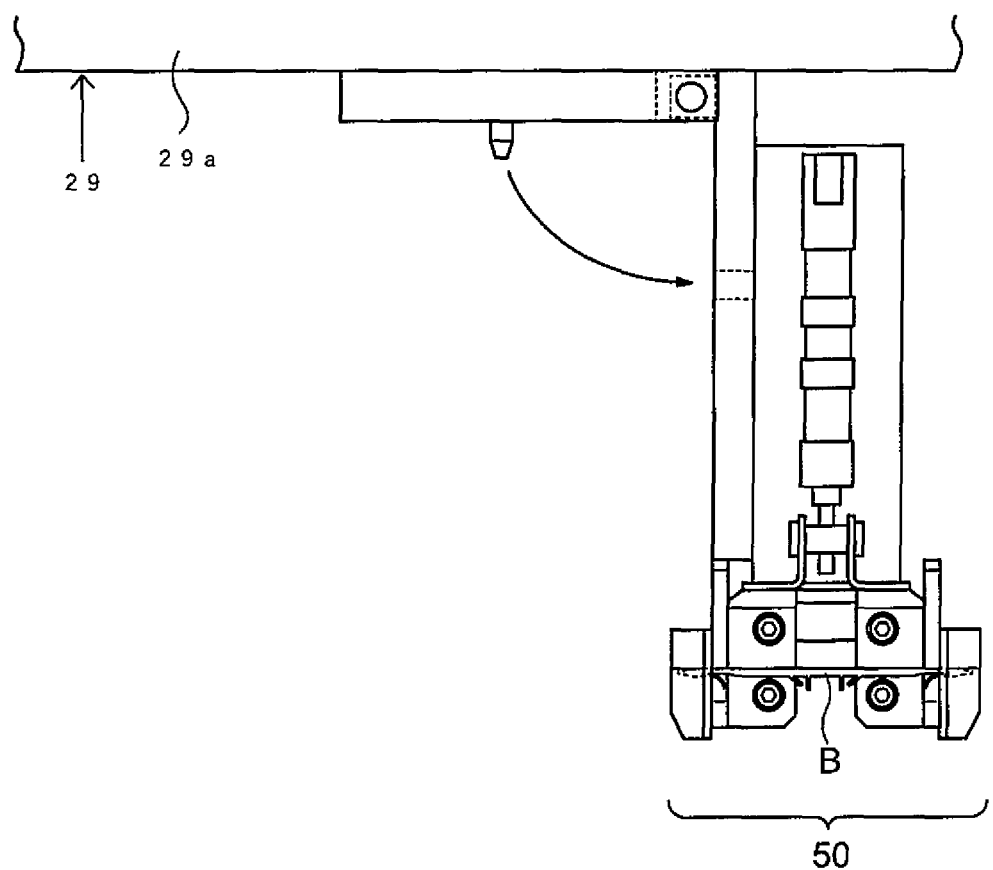
FIG. 34B is a plan view for illustrating a state in which the pin holding body is opened to an outer side with respect to the main body.
Figure 35A:
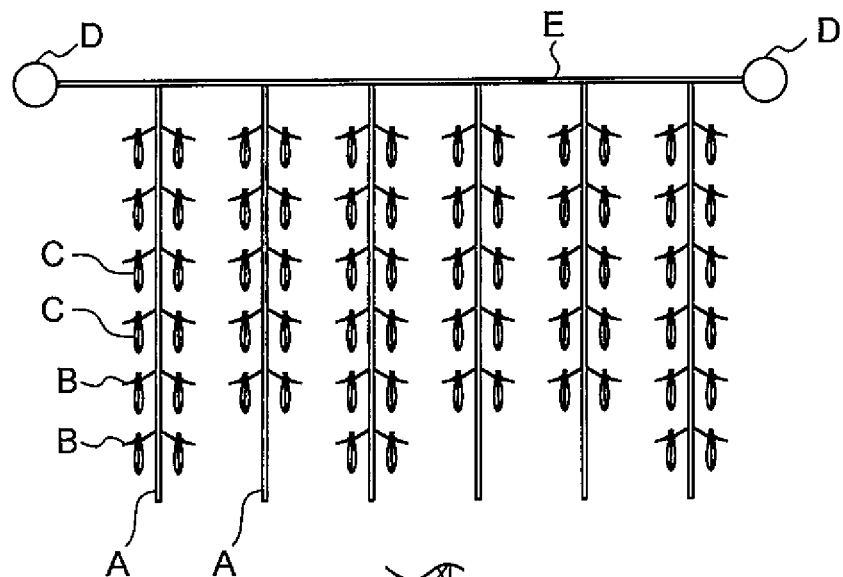
FIG. 35A is an explanatory view for illustrating ear hanging aquaculture of scallops.
Figure 35B:
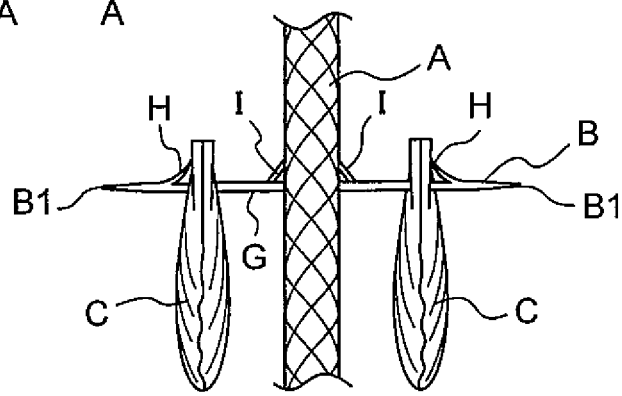
FIG. 35B is an explanatory view for illustrating a state in which the scallops are mounted to a pin inserted in a vertical rope.
Figure 35C:
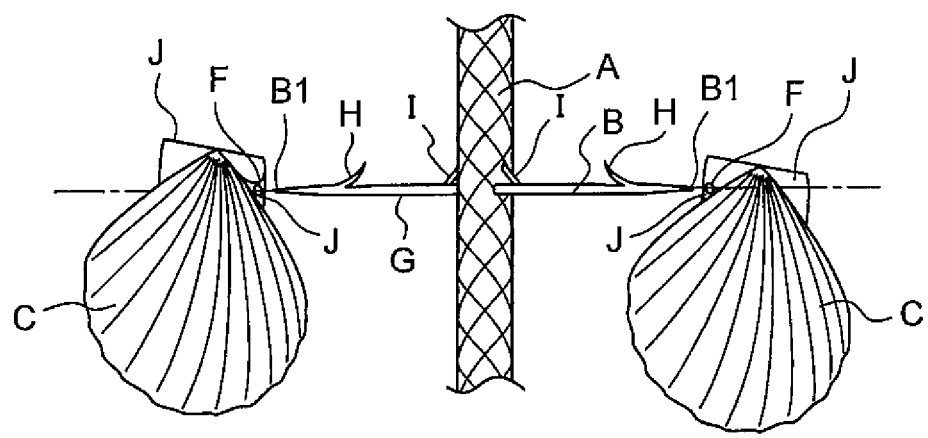
FIG. 35C is an explanatory view for illustrating an operation of mounting the scallops to the pin inserted in the vertical rope.
Figure 36:
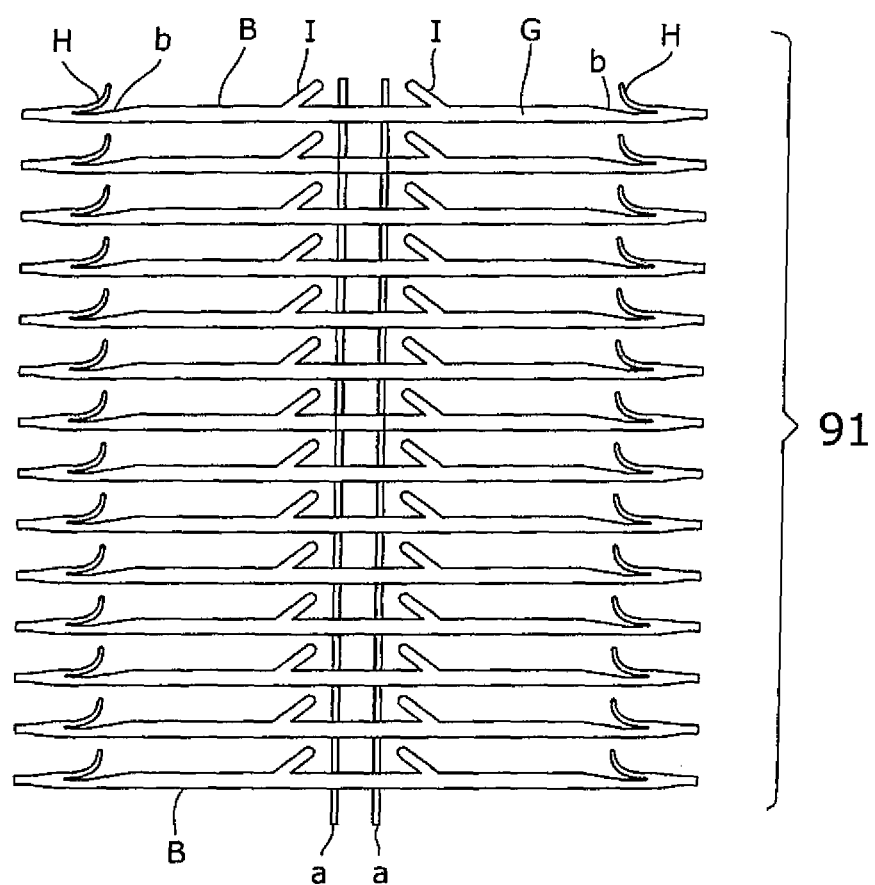
FIG. 36 is a plan view for illustrating an example of a series of pins.

In the present invention, prior to operations of the shellfish mounting apparatus according to the present invention, a position of the pin B to be held by the pin holding body 50 can be set. A mechanism for setting the position of the pin B is illustrated in FIG. 34A and FIG. 34B. In FIG. 34A, the pin holding body 50 is mounted to a case 29*a* of the pin setter 29. As illustrated in FIG. 34B, the pin holding body 50 is opened to the outer side of the case 29*a*. When the pin holding body 50 is opened as illustrated in FIG. 34B, the pin B can be put on the pin holding body 50, and the position of the pin B held by the pin holding body 50 can be checked. As illustrated in FIG. 34B, after an axial center portion of the pin B is set (centered) at a widthwise center portion of the pin holding body 50 and then the series of pins 91 (FIG. 2) is set at the position, the apparatus is brought into operation. Thus, when the pin holding body 50 holds the pin B that is inserted into the vertical rope A after being drawn and cut out from the series of pins 91 one by one, the pin B can be held at the set position prior to operations of the apparatus to the extent possible. During operations of the apparatus, the pin holding body 50 illustrated in FIG. 34A is kept on the case 29*a* side of the main body as illustrated in FIG. 34A.

When the pin holding body 50 is opened sideways as illustrated in FIG. 34B, a centering operation can be easily performed on the pin B.

[Method of Handling Failure to Mount Shellfish]

In the second embodiment, similarly to the first embodiment, the shellfishes C are mounted to the pin B inserted in the vertical rope A. Specifically, under a state illustrated in FIG. 25A, the guides 51 are inserted through the insertion holes F of the shellfishes C, and the guides 51 are put on both ends of the pin B, thereby arranging the two guides 51 and one pin B in a straight line. After that, the shellfishes C are slid horizontally along the guides 51, and end portions of the pin B are covered with the insertion holes F of the shellfishes C, thereby transferring the shellfishes C onto the pin B. After the shellfishes C are transferred onto the pin B, the guides 51 are pulled back and removed from the pin B. While the shellfishes are mounted automatically and repeatedly, the shellfishes C are mounted to each of a large number of pins B inserted in the vertical rope A.

In the second embodiment, when the insertion holes F of the shellfishes C cannot be fitted to the pin B inserted in the vertical rope A (a failure to mount the shellfishes occurs), mounting of the shellfishes C is failed. Under this state, mounting of the shellfishes C cannot be restarted until the failure is recovered. Therefore, in the second embodiment, the sensors can detect occurrence of the failure, and an alarm can inform the failure. When a worker is informed of the failure, the worker sends (passes) the pin B and the shellfish C, which is not inserted in the pin B, to the forward side of the shellfish mounting section through manual manipulation or automatically, and then sends the subsequent shellfishes C and the subsequent pin B into the shellfish mounting section to allow the insertion holes F of the subsequent shellfishes C to be fitted to the subsequent pin B. When the sensors detect occurrence of the failure, without informing the failure, the pin B and the shellfish C that is not inserted in the pin B may be automatically sent (passed) to the forward side of the shellfish mounting section, and the subsequent shellfishes C and the subsequent pin B may be sent into the shellfish mounting section to allow the insertion holes F of the subsequent shellfishes C to be fitted to the subsequent pin B. When the subsequent pin B and the subsequent shellfishes C are sent into the shellfish mounting section, the shellfishes C are automatically mounted in the same manner as that during normal operation.

[Device for Handling Failure to Mount Shellfish]

In the present invention, there may be provided a failure control device configured to handle the above-mentioned mounting failure when the failure occurs. As the failure control device, for example, there may be used a device including a sensor configured to detect a failure, an alarm configured to issue an alarm when the sensor detects the failure, and a sending device configured to send the failed pin B and the failed shellfish C to the forward side of the shellfish mounting section S4 and then send the subsequent pin B and the subsequent shellfishes C into the shellfish mounting section S4. After this failure control device sends the failed pin B and the failed shellfish C to the forward side of the shellfish mounting section and then sends the subsequent pin B and the subsequent shellfishes C into the shellfish mounting section S4, in the same manner as that during normal insertion, the shellfishes C are moved toward the pin B inserted in the vertical rope A, and the insertion holes F of the shellfishes C are fitted to the pin B. Through repetition of those operations, fitting of the insertion holes F of the shellfishes C to the pin B is repeated.

Various sensors may be adopted for detection of the failure, and various failure control devices may be adopted for control at the time of occurrence of the failure. A situation that the shellfish C cannot be mounted to the pin B is caused, for example, when the guide 51 is not inserted into the insertion hole F of the shellfish C, when the guide 51 is not put on the distal end of the pin B, when the shellfish C cannot be slid along the guide 51, or when, although the shellfish C is slid along the guide 51, the shellfish C cannot be fitted to the outer periphery of the pin B. The failure to mount the shellfish C can be detected by detecting a change in pressure of pushing the guide 51 when the guide 51 is not inserted into the insertion hole F of the shellfish C, by detecting the change in pressure of pushing the guide 51 also when the guide 51 is not put on the distal end of the pin B, by detecting a change in load of the sliding mechanism configured to slide the shellfish C when the shellfish C cannot be slid along the guide 51, or by detecting a curvature or the like of the pin B when, although the shellfish C is slid along the guide 51, the shellfish C cannot be fitted to the outer periphery of the pin B.

[Separate Actuation Device]

In the present invention, there may be provided a switching control unit capable of switching a pin inserting apparatus, a hole forming apparatus, and the shellfish mounting apparatus between an interlocking mode in which the apparatus are interlocked with one another, and a separate mode in which the apparatus are actuated separately from one another. When the switching control unit switches the apparatus to the interlocking mode, insertion of the pin B into the vertical rope A by the pin inserting apparatus, hole formation in the shellfishes C by the hole forming apparatus, and fitting of the insertion holes F of the shellfishes C to the pin B by the shellfish mounting apparatus are sequentially and automatically performed. When the switching control unit switches the apparatus to the separate mode, the pin inserting apparatus, the hole forming apparatus, and the shellfish mounting apparatus are actuated separately from one another. The pin inserting apparatus, the hole forming apparatus, and the shellfish mounting apparatus can be used separately and respectively as a dedicated apparatus (pin setter) capable of inserting the pin B into the vertical rope A, a dedicated apparatus configured to form the insertion holes F in the shellfishes C, and a dedicated apparatus configured to mount the shellfishes to the pin.

Another Embodiment

In the above-mentioned first and second embodiments, description is made of the example in which the two shellfish preparing lines X are provided and the shellfishes C are mounted to both longitudinal ends of the pin B at a time. However, some pins B have a shellfish locking protrusion H formed at only one longitudinal end of the shank portion G. In this case, it is only necessary to provide one shellfish preparing line X. Further, when the hole forming operation and the inserting operation are completed, it is possible to omit hole formation and insertion of the pin B, which are to be performed on the shellfish preparing line X and the pin preparing line Y.

Various apparatus of the present application may be exposed to seawater or water during use or maintenance in terms of their characteristics. Accordingly, it is preferred that a rustproof material or a material resistant to rust, such as SUS, be used for components of the apparatus. Further, it is preferred that replaceable components be used as the components of the apparatus to the extent possible.

REFERENCE SIGNS LIST 1 shellfish conveying unit
2 aligning unit
3 hole forming unit
4 rotator
5 shellfish grasping body
5a grasping piece
5b grasping piece
5d holding space
5x cutout portion
6 bearing
7 long shaft
8 grasping body support unit
9 base
10 support bar
11 push bar
12 locking flange
13 first pulling mechanism
14 air cylinder
14a rod
14b cylinder tube
15 locking ring
16 pusher
17 partition body
17a opening portion
17b thorough-hole
18 moving body
19 air cylinder
20 guide bar
21 side support tool
22 assist plate
23 pushing tool
23a support shaft
23b pushing piece
23c rotary block
24 second pulling mechanism
25 drill blade
26 base body
27 air cylinder
27a rod
27b cylinder tube
28 support plate
29 pin inserting unit (pin setter)
29a case (of pin setter)
30 support block
31 rope guide
32 support shaft
33, 33a, 33b oscillation body
34 tension roller
35 driving roller
36 retaining roller
37 back guide
38 front guide
39 vertical plate
39a support claw
39b cutout portion
40 vertical plate
40a support claw
40b cutout portion
41 curved backrest
42 mounting member
43 43a, 43b bracket
44 movable body 45, 45a, 45b balance plate
46, 46a, 46b weight
47a, 47b detection claw
48, 48a, 48b sensor
49, 49a, 49b shaft member
50 pin holding body
51 guide
51a end portion (of guide)
52 stationary holding tool
52a fitting recessed portion
52b semicircular cavity
53 movable holding tool
53a fitting projecting portion
53b semicircular cavity
53c insertion portion
54 air cylinder
54a rod
54b cylinder tube
56 guide driving units
57 pushing-out mechanism
58, 58a, 58b grasping piece support tool
59a, 59b air cylinder
60 third pulling mechanism
61 arm
61a shaft
62 stationary block
63 movable block
64 coupling shaft
65 hook
66 coil spring
67 fixing portion
68 turning body
68a lower end side (of turning body)
69 air cylinder
69a rod (of air cylinder)
69b cylinder tube (of air cylinder)
70 holding body
71 stopper
72 air cylinder
72a rod (of air cylinder)
72b cylinder tube (of air cylinder)
73 bracket
74 pushing tool head
75 regulating roller
76 bracket
77 discharge passage
78 discharge horse
79 suction unit (suction fan)
80 intake port
81 cover
82a, 82b upright portion
90 drum
91 series of pins
92 tray
93 flat plate
96 pin aligning device
100 pin position adjusting tool
101 recessed portion (of pin position adjusting tool)
102 rope conveying mechanism
A vertical rope
B pin
B1 end portion (of pin)
C scallop (shellfish)
D buoys
E horizontal rope
F insertion hole
G shank portion
H shellfish locking protrusion
I rope locking protrusion
J ear
M motor
S interval between both of the grasping pieces 5a and 5b
S1 shellfish setting section
S2 aligning section
S3 hole forming section
S4 shellfish mounting section
X shellfish preparing line
Y pin preparing line
Z merging line
a flexible coupling cord
b recessed portion

What is claimed is:

1. A shellfish mounting apparatus configured to form an insertion hole in an ear of each shellfish among a plurality of shellfishes, to insert a resin pin into a vertical rope, and to insert axial ends of the pin into the insertion holes of respective ones of the shellfishes, thereby mounting the shellfishes to respective ones of the axial ends of the pin, the shellfish mounting apparatus comprising:
a shellfish conveying unit, which is configured to convey the shellfishes;
a hole forming apparatus, which is configured to form the insertion holes in the shellfishes conveyed by the shellfish conveying unit;
a pin inserting apparatus, which is configured to insert the pin through the vertical rope;
a pin holding body, which is capable of holding both of the axial ends of the pin inserted through the vertical rope;
a pin aligning device, which is configured to make shellfish locking protrusions and rope locking protrusions of a large number of pins inserted in the vertical rope be oriented in the same direction;
a pin position adjusting tool, which is capable of adjusting a holding position of the pin held by the pin holding body;
a guide driving unit, which is capable of inserting guides into the insertion holes of the shellfishes and putting the inserted guides on respective ones of the axial ends of the pin inserted in the vertical rope so as to arrange the guides and the pin in a straight line; and
a sliding mechanism, which is configured to transfer the shellfishes, through which the guides are inserted, onto the pin by sliding the shellfishes along the respective guides,
wherein the shellfish conveying unit includes pairs of shellfish grasping bodies, each pair of shellfish grasping bodies being configured to grasp a respective one of the shellfishes, the pairs of shellfish grasping bodies being arranged on a rotator which rotates intermittently, and being configured to convey the shellfishes through intermittent rotation of the rotator,
wherein the hole forming apparatus is capable of forming the insertion holes in ears of the respective shellfishes that are grasped by the paired two shellfish grasping bodies, respectively, and conveyed,
wherein the pin inserting apparatus is capable of cutting out one pin from a pin continuum with the large number of pins, and inserting the one cut-out pin into the vertical rope,
wherein the pin aligning device includes a bottom surface which is flat plate shaped, and the shellfish locking protrusions and the rope locking protrusions of the large number of pins inserted in the vertical rope are in contact with the bottom surface, to thereby allow the shellfish locking protrusions and the rope locking protrusions of the large number of pins inserted in the vertical rope to be oriented in the same direction when the vertical rope slides on the bottom surface, wherein the pin holding body is capable of sandwiching and holding both axial ends of the pin whose shellfish locking protrusions and rope locking protrusions are oriented in the same direction, wherein the pin position adjusting tool is capable of performing position adjustment by pushing the pin held by the pin holding body after the pin has been inserted in the vertical rope and sliding the pin in an axial direction of the pin, wherein the guide driving unit is capable of inserting the guides through the insertion holes of the respective shellfishes, and putting the guides, which are inserted through the two shellfishes, on respective ones of the axial ends of the pin held by the pin holding body so as to arrange the guides and the pin in the straight line, and wherein the sliding mechanism is capable of transferring the shellfishes onto respective ones of the axial ends of the pin by sliding the shellfishes beyond the shellfish locking protrusions of the pin along the respective guides put on respective ones of the axial ends of the pin, and removing the guides from respective ones of the axial ends of the pin through the insertion holes of the shellfishes after transferring the shellfishes.

2. The shellfish mounting apparatus according to claim 1, further comprising:
- a sensor, which is configured to detect occurrence of a failure to transfer the shellfishes onto the pin;
- an alarm, which is configured to issue an alarm when the failure is detected; and
- a failure control device, which is configured to perform control so as to deliver a failed pin and a failed shellfish to a forward side of the sliding mechanism, and to thereby allow a subsequent pin and subsequent shellfishes to be sent into a sliding spot of the sliding mechanism.

3. The shellfish mounting apparatus according to claim 1, wherein the pin aligning device further includes two side walls that contact the axial ends of each pin.

* * * * *